(12) United States Patent
Mochizuki et al.

(10) Patent No.: US 9,036,566 B2
(45) Date of Patent: May 19, 2015

(54) COMMUNICATIONS METHOD, BASE STATION, AND MOBILE TERMINAL

(75) Inventors: Mitsuru Mochizuki, Tokyo (JP); Miho Maeda, Tokyo (JP); Yasushi Iwane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1246 days.

(21) Appl. No.: 12/664,113

(22) PCT Filed: Mar. 25, 2008

(86) PCT No.: PCT/JP2008/055528
§ 371 (c)(1),
(2), (4) Date: Feb. 19, 2010

(87) PCT Pub. No.: WO2009/001594
PCT Pub. Date: Dec. 31, 2008

(65) Prior Publication Data
US 2010/0157927 A1 Jun. 24, 2010

(30) Foreign Application Priority Data

Jun. 22, 2007 (JP) ................................. 2007-164923

(51) Int. Cl.
*H04W 4/00* (2009.01)
*H04L 1/18* (2006.01)
(Continued)

(52) U.S. Cl.
CPC ............ *H04L 1/1812* (2013.01); *H04L 1/1685* (2013.01); *H04L 5/0053* (2013.01); *H04L 27/0006* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2003/0224731 A1 | 12/2003 | Yamaura et al. | |
| 2008/0298224 A1* | 12/2008 | Pi et al. | 370/204 |
| 2010/0238870 A1* | 9/2010 | Mitra et al. | 370/329 |

FOREIGN PATENT DOCUMENTS

| | | |
|---|---|---|
| JP | 2001-274767 | 10/2001 |
| JP | 2003 249908 | 9/2003 |

(Continued)

OTHER PUBLICATIONS

Kawamura et al, Layer 1 / Layer 2 Control Channel Structure in Single-Carrier FDMA Based Evolved UTRA Uplink, IEEE, 5 pages, 2007.*

(Continued)

*Primary Examiner* — Ayaz Sheikh
*Assistant Examiner* — Sori Aga
(74) *Attorney, Agent, or Firm* — Oblon, McClelland, Maier & Neustadt, L.L.P.

(57) ABSTRACT

A communications method and a mobile terminal that constructs a communications system which transmits data by using an OFDM (Orthogonal Frequency Division Multiplexing) method as a downlink access method, and also transmits data by using an SC-FDMA (Single Career Frequency Division Multiple Access) method as an uplink access method. The mobile terminal includes a processor that determines a candidate set including CCEs (Control Channel Elements), each of which is one of regions to which one frequency bandwidth is divided, for delivery of an L1/L2 control signal which is control information transmitted and received between a base station and the mobile terminal. In addition, the processor, which is at the mobile terminal, determines the candidate set based on the frequency bandwidth.

6 Claims, 46 Drawing Sheets

(51) Int. Cl.
*H04L 1/16* (2006.01)
*H04L 5/00* (2006.01)
*H04L 27/00* (2006.01)

(56) References Cited

FOREIGN PATENT DOCUMENTS

| JP | 2006 352381 | 12/2006 |
|---|---|---|
| WO | WO 2008/157692 A2 | 12/2008 |
| WO | WO 2008/157692 A3 | 12/2008 |

OTHER PUBLICATIONS

Extended European Search Report issued May 29, 2013, in European Patent Application No. 08738823.7.
"Search Space Definition for L1/L2 Control Channels", Motorola, 3GPP TSG RAN1#49bis, R1-072691-PDCCH Candidate Search Space (3GPP), vol. RAN WG1, No. Orlando, XP-050596415, Jun. 20, 2007, 11 pages.
"Optimized L1/L2 Control Channel Formats", Sharp, 3GPP TSG-RAN WG2#57,R2-070514, (3GPP), vol. RAN WG2, No. St. Louis, XP-050133568, Feb. 9, 2007, 6 pages.
"E-UTRA DL L1/L2 Control Channel Design", Motorola, 3GPP TSG RAN1 #48BIS, R1-071353, p. 1-5, Mar. 26-30, 2007.
"Signaling optimized DL Scheduling for LTE", NTT DoCoMo, Inc., 3GPP TSG-RAN WG2 Meeting #56bis, R2-070272, p. 1-4, Jan. 15-19, 2007.
"Mapping to Physical Channels," 3GPP TS 36.212 V1.2.0, R1-072635, pp. 6 and 7, May 2007.
3GPP TS 36.211 V1.1.0, R1-072633 p. 14, May 2007.
"Way Forward on Downlink Control Signaling", 3GPP contributions R1-071223, p. 1-3, Feb. 14, 2007.
"Restriction on PDCCH monitoring set", Samsung, 3GPP TSG RAN WG1 #49, R1-072220, p. 1-7, May 7-11, 2007.
"Way forward on CCE-to-RE mapping", R1-072613, p. 1-4, May 8, 2007.
"Mapping of PDCCH, ACK/NACK and Cat0", Panasonic, 3GPP TSG-RAN WG1 Meeting #49, R1-072088, p. 1-4, May 2007.
"Downlink ACK/NACK signaling for E-UTRA", NEC Group, TSG-RAN WG1#49, R1-072120, p. 1-6, May 7-11, 2007.
"Configuration of semi-persistent scheduling", Ericsson, TSG-RAN WG2 Meeting #60bis, Tdoc R2-080088, p. 1-4, Jan. 14-18, 2008.
"Regaurding Persistant Resource Signaling", Samsung, 3GPP TSG-RAN2 Meeting #60bis, Tdoc R2-080163, p. 1-2, Jan. 14-18, 2008.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300 V8.2.0 , Sep. 2007.
Japanese Office Action issued Jul. 23, 2013, in Japan Patent Application No. 2012-041717 (with partial English translation).

* cited by examiner

FIG. 6
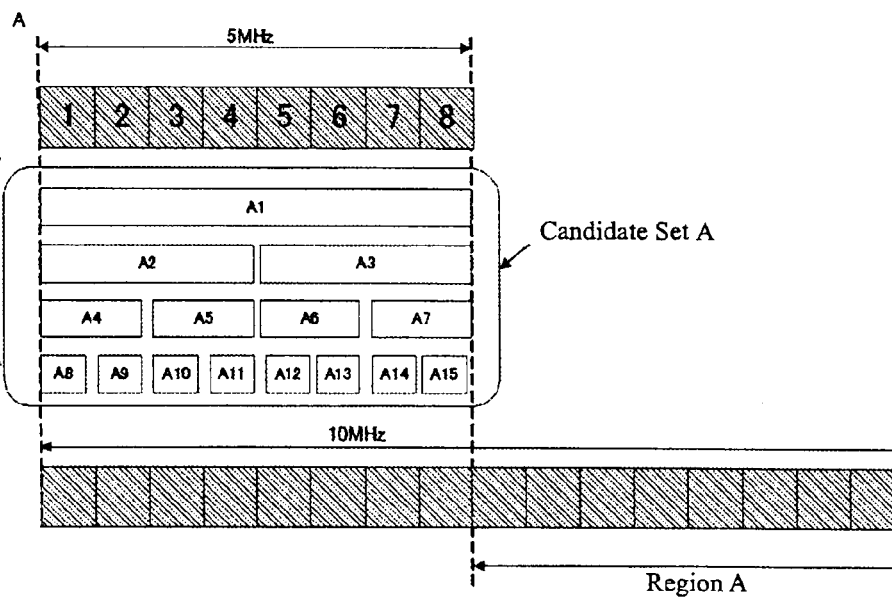
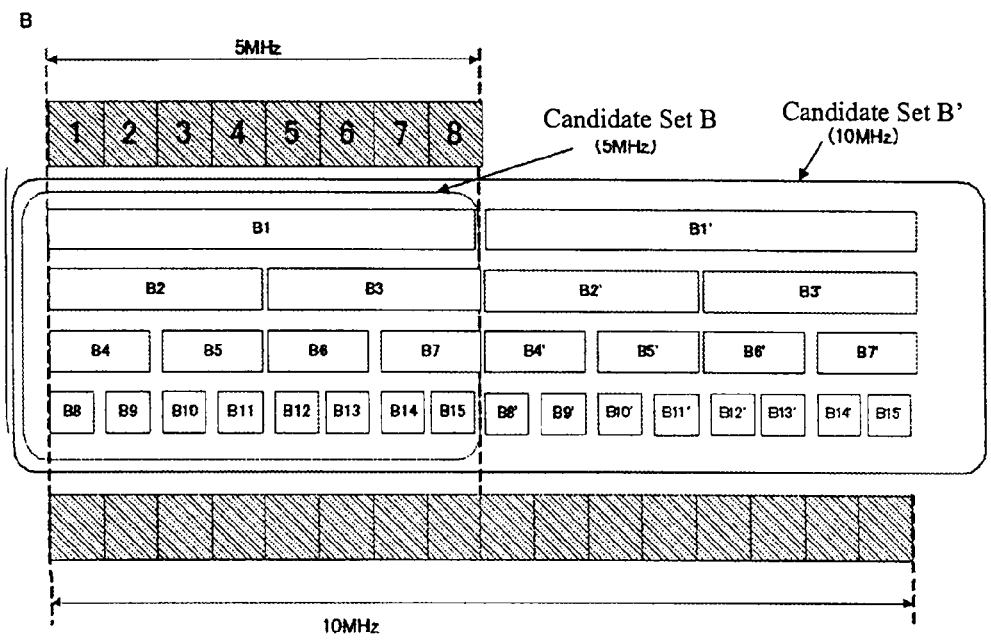

FIG. 9

| System Bandwidth [MHz] | Candidate Set |
|---|---|
| 1.25 | Set 1 |
| 2.5 | Set 2 |
| 5 | Set 3 |
| 10 | Set 4 |
| 15 | Set 5 |
| 20 | Set 6 |

FIG. 23
(a)
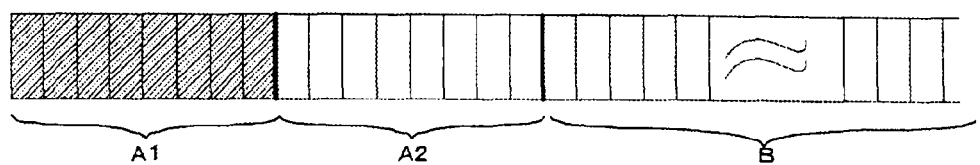
A1  A2  B
(b)
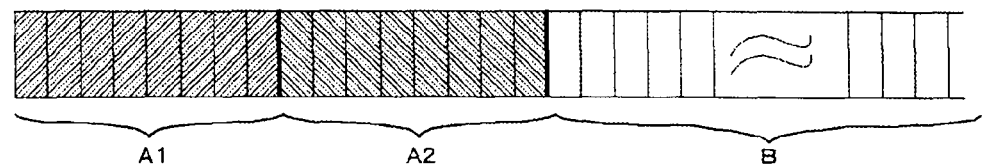
A1  A2  B

COMMUNICATIONS METHOD, BASE STATION, AND MOBILE TERMINAL

FIELD OF THE INVENTION

The present invention relates to a communications method for use in a communications system according to a "long term evolution" ("Long Term Evolution" LTE) method which has been developed as specifications of a mobile phone system based on a third generation mobile phone system which adopts a W-CDMA method.

BACKGROUND OF THE INVENTION

In the 3GPP (3rd Generation Partnership Project) which is the standardization organization for mobile communications systems, the specifications of a new communications method which is provided as a communications method different from W-CDMA, and which is referred to as long term evolution (LTE, E-UTRAN), as to a wireless section, and is also referred to as "system architecture evolution" ("System Architecture Evolution" SAE), as to a whole system structure including a core network have been developed. In the case of LTE, an access method, a radio channel configuration and protocols different from those of the current W-CDMA (HS-DPA/HSUPA) are provided. For example, as the access method, the W-CDMA uses code division multiple access (Code Division Multiple Access), whereas the LTE uses OFDM (Orthogonal Frequency Division Multiplexing) for a downlink direction and uses SC-FDMA (Single Career Frequency Division Multiple Access) for an uplink direction. Furthermore, W-CDMA has a bandwidth of 5 MHz, whereas the LTE can adopt bandwidths of 1.25/2.5/5/10/15/20 MHz. In addition, LTE adopts only a packet switching method, instead of circuit switching as used in the W-CDMA.

In the case of LTE, because a communications system is configured using a new core network different from a core network (referred to as General Packet Radio System GPRS) for use in the case of W-CDMA, the LTE is defined as a radio access network independent from a W-CDMA network. Therefore, in order to distinguish from a W-CDMA communications system, in an LTE communications system, a base station (Base station) which communicates with a mobile terminal (UE User Equipment) is called eNB (E-UTRAN NodeB, which is also referred to as eNodeB), a base station control apparatus (Radio Network Controller) which performs an exchange of control data and user data with a plurality of base stations is called aGW (Access Gateway, which is also referred to as Mobility Management Entity: MME or Serving Gateway: S-GW). In this LTE communications system, point-to-multipoint (Point to Multipoint) communications, such as a multicast and broadcast type multimedia service which is referred to as an E-MBMS (Evolved Multimedia Broadcast Multicast Service), are carried out, and a communications service, such as a unicast (Unicast) service for each mobile terminal among a plurality of mobile terminals, is also provided. In the case of LTE, because no dedicated channels (Dedicated Channel or Dedicated Physical Channel) destined for each mobile terminal exists in transport channels and physical channels, unlike in the case of W-CDMA, transmission of data to each mobile terminal is carried out via a shared channel (Shared Channel).

When data transmission has occurred in either an uplink or a downlink, scheduling for enabling communications between the base station and the mobile terminal is carried out for either the uplink or the downlink. For example, in the downlink scheduling, the base station allocates radio resources according to the size of data which have occurred or the channel quality to the mobile terminal, and sets up a modulation method and an error correcting code method (MCS: Modulation and Coding scheme) according to target quality and data speed. In the uplink scheduling, when data to be transmitted to the base station have occurred in the mobile terminal, the mobile terminal transmits a signal (uplink scheduling request SR: Scheduling Request) for making a request for allocation of uplink radio resources, and, in response to the request, the base station allocates uplink radio resources to the mobile terminal. Control signals used for such scheduling control for enabling communications between the mobile terminal and the base station via a radio link include an upper layer signal, such as an "L3 control signal (information)" (Layer3 control signaling or an L3 message), and a signal which is referred to as an "L1/L2 control signal (information)" (Layer1/Layer2 control signaling). An L3 control signal is mainly notified from, for example, an upper layer, such as an RRC layer, at the time of initial transmission including the time of occurrence of a call connection (RRC Connect), and is used to, via a downlink, perform a setup of uplink channels or downlink channels, or allocation of radio resources. On the other hand, an L1/L2 control signal is frequently exchanged between the mobile terminal and the base station via both an uplink and a downlink. An uplink scheduling request signal with which the mobile terminal makes a request of the base station for allocation of radio resources via an uplink is an L1/L2 control signal. Also at the time when changing the radio resources irregularly according to change in the data size or requirements on the quality of a channel, including the time of occurrence of a call connection and the time of continuation of a call connection, an L1/L2 control signal is used. As L1/L2 control signals, there are a response signal (Ack/Nack) which, when, for example, receiving data, the base station or the mobile terminal uses in order to notify the reception results to the communications partner, and quality information CQI (Channel Quality Indicator) showing the quality of received data or the quality of a channel. Furthermore, in the case of LTE, a support of MIMO (Multiple Input Multiple Output) has been studied. In a case in which MIMO is supported, L1/L2 control signals also include MIMO related information.

Ack/Nack included in L1/L2 control signals is a signal for HARQ (Hybrid Automatic Repeat Request) which causes the receive side to decode data, which the receive side has failed in demodulating, without discarding the data and by combination with data retransmitted thereto. When an Ack signal is notified from the receive side to the transmit side, new packet data are transmitted from the transmit side to the receive side. In contrast, when a Nack signal is notified from the receive side to the transmit side, packet data are retransmitted from the transmit side to the receive side. Within this specification, a simple expression of Ack/Nack denotes above-mentioned Ack/Nack for HARQ.

In Chapter 4.2 of nonpatent reference 1, mapping of downlink control channel information (Downlink Control Channel Information) onto a PDCCH (Physical Downlink Control Channel) which is a physical channel is described.

Furthermore, in Chapter 4.1 of nonpatent reference 2, a frame structure in a downlink, as shown in FIG. 1 is described. One sub-frame is formed of two slots (refer to FIG. 1). In FIG. 1, each hatched portion shows a PDCCH mapping region. In Chapter 5.5.4 of nonpatent reference 2, mapping of a PDCCH onto the first three OFDM symbols (refer to each hatched portion shown in FIG. 1) of the first slot of each sub-frame is described. In this specification, downlink control channel information which is mapped onto a PDCCH is referred to as L1/L2 control information (signal). In addition, as information included in L1/L2 control information, there are (1) Ack/Nack, (2) L1/L2 control information for uplink communications control (UL-related L1/L2 control information, uplink grant (ULGRANT), etc.), and (3) L1/L2 control information for downlink communications control (DL-related L1/L2 control information, downlink allocation information (DL Allocation)).

Furthermore, nonpatent reference 3 describes that downlink control channels (downlink control channel information) are configured of an aggregation (Aggregation) of control channel elements (Control Channel Elements: CCEs). In addition, nonpatent reference 3 describes that when receiving a downlink control channel, a mobile terminal monitors a candidate set (Candidate Set) of downlink control channels. Nonpatent reference 3 further describes that the number of candidates included in the candidate set determines the maximum number of times that the mobile terminal performs a detecting operation (Blind Detect). As to this candidate set, nonpatent reference 4 discloses a method of enabling a base station and a mobile terminal to determine the candidate set without using explicit signaling from the base station to the mobile terminal. In nonpatent reference 5, a mapping method of mapping CCEs onto a physical resource is described. Concretely, a method of performing cell (base station)-specific scrambling and then performing common interleave is described.

On the other hand, in nonpatent reference 6, a method of interleaving (interleave) a plurality of PDCCHs into resource blocks (RB Resource Blocks) on which different power control operations are performed respectively, and performing mapping of the plurality of PDCCHs distributedly for every determined RBs is disclosed. Nonpatent reference 6 further discloses that each RB is configured of all of the region of the first three OFDM symbols of one sub-frame, and a mobile terminal carries out a decoding process without using information (the value of Cat.0, Cat: Category) showing how many symbols (OFDM symbols) in the head region of the first slot of one sub-frame are used. The purpose of the method is to make it easy to perform power control in order to reduce the amount of interference with adjacent base stations, and is further to make it possible for the mobile terminal to start a receiving process of receiving the PDCCHs regardless of the value of Cat.0. Furthermore, in nonpatent reference 7, a method of inserting an index (index) of Ack/Nack into downlink control channel information (UL GRANT) which is used for allocation of uplink resources is described.

An LTE core network is a network via which a packet connection is established, and user data, including real time data, such as voice data, are all packetized in an LTE core network. In a case of transmission of general packet data, real time performance is not required of the general packet data, and the data speed at which the general packet data are transmitted and received varies irregularly according to the description of the data. In contrast, because real time data, such as voice data, have to be reproduced in real time by the communications partner even if the real time data are packetized, real time data having a predetermined size are produced at fixed time intervals. Therefore, at the time of communications of general packet data and at the time of communications of real time data, such as voice data, different scheduling methods are needed for allocation of radio resources with scheduling.

For data, such as general packet data, which are transmitted at a speed which changes according to the description of the data, and which need to be subjected to high speed communications, a dynamic scheduling (dynamic scheduling) method of being able to dynamically change the settings of radio resources for every sub-frame according to channel quality and data speed (data size) is used. When carrying out dynamic scheduling, a base station notifies information about allocation of uplink and downlink radio resources to a mobile terminal by using an L1/L2 control signal.

In contrast, because communications in which data requiring real-time performance, such as voice data, having a predetermined size are produced at fixed time intervals are carried out at a low speed and the size of the data is determined from one or more predetermined sizes, a persistent scheduling (Persistent scheduling) method of being able to allocate radio resources at regular intervals and continuously is used for such communications.

In the 3GPP, as to the persistent scheduling (also referred to as semi-persistent scheduling (semi-persistent scheduling)), a setup of periodicity and so on from a base station to a mobile terminal by using RRC (Radio Resource Control) has been discussed (nonpatent reference 8). It can be considered that a base station allocates a frequency domain to a mobile terminal by using a PDCCH (an L1/L2 control signal) at intervals (in a cycle) set up by using RRC (referred to as persistent intervals (a persistent cycle) from here on). Furthermore, allocation of radio resources only during a talk (Talk spurt) (also referred to active (active)) even if persistent scheduling is being carried out, and release of radio resources during a silent period (Silent Period) (also referred to as de-active (de-active)) have been discussed. The use of a PDCCH (an L1/L2 control signal) for a base station to notify that there is a transition to active or de-active as mentioned above to a mobile terminal has been discussed (nonpatent reference 9).

Nonpatent reference 1: TS36.212 V1.2.0 (R1-072635)
Nonpatent reference 2: TS36.211 V1.1.0 (R1-072633)
Nonpatent reference 3: 3GPP contributions R1-071223
Nonpatent reference 4: 3GPP contributions R1-072220
Nonpatent reference 5: 3GPP contributions R1-072613
Nonpatent reference 6: 3GPP contributions R1-072088
Nonpatent reference 7: 3GPP contributions R1-072120
Nonpatent reference 8: 3GPP contributions R2-080088
Nonpatent reference 9: 3GPP contributions R2-080163
Nonpatent reference 10: 3GPP TS36.300 V8.2.0

DISCLOSURE OF THE INVENTION

Problems to be Solved by the Invention

A first problem to be solved by the invention will be explained. Nonpatent reference 3 describes that a mobile terminal monitors a candidate set (Candidate Set) of downlink control channels (L1/L2 control information). However, when a base station carries out signaling of a candidate set to all the mobile terminals being served thereby, the load on the base station from the viewpoint of radio resources becomes large. As one solution of this problem, nonpatent reference 4 discloses the method of enabling a base station and a mobile terminal to determine a candidate set without carrying out signaling of the candidate set from the base station to the mobile terminal.

A second problem to be solved by the invention will be explained. Nonpatent reference 3 describes that there can be a situation in which, when receiving a downlink control channel, a mobile terminal monitors a candidate set in order to extract L1/L2 control information which is downlink control channel information, and the mobile terminal performs a detecting operation of detecting the downlink control channel only a number of times corresponding to the number of candidates included in the candidate set. When the number of times that the mobile terminal performs this detecting operation of detecting L1/L2 control information increases, the processing load on the mobile terminal increases and this results in increase in the power consumption of the mobile terminal. Furthermore, with increase in the number of times that the mobile terminal performs this detecting operation of detecting a downlink control channel, the average length of time required for the mobile terminal to detect a downlink control channel destined for itself or detect that there exists no downlink control channel destined for itself increases and this results in an increase in delay occurring in the processing carried out in the mobile communications system. This problem is not described in nonpatent references 3 and 6, and therefore no solution of the problem is described in these nonpatent references. It is therefore an object of the present invention to reduce the increase in the power consumption of the mobile terminal and the increase in delay occurring in the processing carried out in the mobile communications system due to the increase in the number of times that the mobile terminal performs the detecting operation of detecting a downlink control channel.

A third problem to be solved by the invention will be explained. Downlink Ack/Nack is one downlink control channel information (L1/L2 control information), and is therefore notified from a base station to a mobile terminal by using a region of L1/L2 control information. Nonpatent reference 5 describes a mapping method of mapping CCEs onto a physical resource, but states clearly that it is not a document showing handling of Ack/Nack. A problem is therefore that any method of mapping Ack/Nack and other L1/L2 control information onto the same physical region (refer to an L1/L2 control information region and the hatched portions shown in FIG. 1) has not been established.

A fourth problem to be solved by the invention will be explained. An L1/L2 control information region is a region limited to the first three OFDM symbols or less (refer to the hatched portions shown in FIG. 1) of the first slot of a subframe, as shown in nonpatent reference 2. Within this limited region, the base station has to transmit L1/L2 control information to all the mobile terminals being served thereby. For example, when the uplink traffic from the mobile terminals to the base station increases, the transmission of downlink Ack/Nacks each of which is one L1/L2 control information also increases, and there will be a situation in which the capacity (capacity) of the physical region of L1/L2 control information of the base station becomes insufficient. Accordingly, there arises a problem of an increase in delay occurring in the processing carried out by the mobile communications system, and reduction in the uplink and/or downlink data throughput. It is therefore an object of the present invention to enable a notification of L1/L2 control information to a larger number of mobile terminals by using a limited physical region.

A fifth problem to be solved by the invention will be explained. A required number of Ack/Nacks included in L1/L2 control information varies according to the number of mobile terminals which are transmitting uplink data. Even in a case in which a variation occurs in this required number of Ack/Nacks, it is necessary to map Ack/Nacks and other downlink control information appropriately by using a method imposing a small processing load on the whole of the mobile communications system. It is therefore an object of the present invention to map Ack/Nacks and other downlink control information appropriately by using a method imposing a small processing load on the whole of the mobile communications system even in a case in which a variation occurs in the required number of Ack/Nacks.

Nonpatent reference 7 describes that an index of Ack/Nack is inserted into UL GRANT, but does not describe any mapping method of mapping UL GRANT and Ack/Nack onto a concrete physical region. Nonpatent reference 6 describes a method of mapping Ack/Nacks onto CCEs to map Ack/Nacks onto a physical region by using the same method as that used for mapping of other L1/L2 control information. However, these nonpatent references do not provide any suggestion about the fourth and fifth problems.

Next, a sixth problem to be solved by the invention will be explained. For example, there can be considered a case in which in above-mentioned persistent scheduling, the same candidate set for L1/L2 control signal is provided at persistent intervals (in a persistent cycle), and the radio resources (particularly, the frequency to which the radio resources are allocated) to which the candidates included in the candidate set are allocated are the same. When the radio resources to which the candidates included in the candidate set are allocated at certain time intervals are the same, like in this example, if the radio environment of a mobile terminal becomes worse in the frequency domain to which the candidate set for the mobile terminal is allocated at the time intervals, this bad situation continues unless the environment changes (for example, unless the mobile terminal moves). As a result, a problem is that retransmission and so on continue in communications between the mobile terminal in question and the base station, and the effective use of radio resources cannot be achieved.

Means for Solving the Problems

In accordance with the present invention, there is provided a communications method which is implemented by a communications system including a base station that carries out communications using a plurality of frequency bandwidths, and a mobile terminal that carries out a blind detection of a candidate set including control channel elements (Control Channel Elements CCEs) which are used for transmission of an L1/L2 control signal which is control information transmitted from the base station, and each of which is one of regions to which one frequency bandwidth is divided, so as to receive the L1/L2 control signal, the communications method including: a process of grouping the mobile terminal which is a destination of transmission of the L1/L2 control signal on a basis of attribution information of the mobile terminal; a process of allocating an L1/L2 control signal to be transmitted to a predetermined mobile terminal to control channel elements included in a group to which the predetermined mobile terminal is belonging, and transmitting the L1/L2 control signal by using a downlink physical control channel disposed in a downlink from the base station to the mobile terminal; and a process of receiving the downlink physical control channel, performing a blind detection process on the candidate set corresponding to the group to which the mobile terminal is belonging, and reading the L1/L2 control signal from the control channel elements included in the candidate set.

In accordance with the present invention, there is provided a base station that configures a communications system which transmits data by using an OFDM (Orthogonal Frequency Division Multiplexing) method as a downlink access method, and also transmits data by using an SC-FDMA (Single Career Frequency Division Multiple Access) method as an uplink access method, and that transmits an L1/L2 control signal which is control information to a mobile terminal by using a plurality of frequency bandwidths, in which the base station carries out a process of grouping a mobile terminal which is a destination of transmission of the L1/L2 control signal on a basis of attribution information of the mobile terminal, and a process of allocating an L1/L2 control signal to be transmitted to a predetermined mobile terminal to control channel elements included in a group to which the predetermined mobile terminal is belonging, and transmitting the L1/L2 control signal by using a downlink physical control channel disposed in a downlink to the mobile terminal.

In accordance with the present invention, there is provided a mobile terminal that configures a communications system which transmits data by using an OFDM (Orthogonal Frequency Division Multiplexing) method as a downlink access method, and also transmits data by using an SC-FDMA (Single Career Frequency Division Multiple Access) method as an uplink access method, and that receives an L1/L2 control signal which is control information transmitted from a base station using a plurality of frequency bandwidths, in which grouping of the mobile terminal is performed by the base station on a basis of attribution information of the mobile terminal which is a destination of transmission of the L1/L2 control signal, and the mobile terminal receives a downlink control signal which is allocated to control channel elements included in a group to which the predetermined mobile terminal is belonging, and which is transmitted thereto by using a downlink physical control channel, and performs a blind detection process on the candidate set corresponding to the group to which the mobile terminal is belonging so as to read the L1/L2 control signal from the control channel elements included in the candidate set.

In accordance with the present invention, there is provided a communications method which is implemented by a communications system including a base station that transmits data by using an OFDM (Orthogonal Frequency Division Multiplexing) method as a downlink access method and a mobile terminal that transmits data by using an SC-FDMA (Single Career Frequency Division Multiple Access) method as an uplink access method, the base station and the mobile terminal transmitting and receiving data by using a plurality of frequency bands, the communications method including: a process of determining a candidate set including CCEs (Control Channel Elements), each of which is one of regions to which one frequency bandwidth is divided, for transmission of an L1/L2 control signal which is control information transmitted and received between the base station and the mobile terminal by using the frequency bandwidth; and a process of extracting the L1/L2 control signal from the candidate set determined in the process.

Advantages of the Invention

Because the communications method in accordance with the present invention which is implemented by a communications system including a base station that carries out communications using a plurality of frequency bandwidths, and a mobile terminal that carries out a blind detection of a candidate set including control channel elements (Control Channel Elements CCEs) which are used for transmission of an L1/L2 control signal which is control information transmitted from the base station, and each of which is one of regions to which one frequency bandwidth is divided, so as to receive the L1/L2 control signal includes: the process of grouping the mobile terminal which is a destination of transmission of the L1/L2 control signal on a basis of attribution information of the mobile terminal; the process of allocating an L1/L2 control signal to be transmitted to a predetermined mobile terminal to control channel elements included in a group to which the predetermined mobile terminal is belonging, and transmitting the L1/L2 control signal by using a downlink physical control channel disposed in a downlink from the base station to the mobile terminal; and the process of receiving the downlink physical control channel, performing a blind detection process on the candidate set corresponding to the group to which the mobile terminal is belonging, and reading the L1/L2 control signal from the control channel elements included in the candidate set, the amount of processing carried out by the mobile terminal when performing a blind detection can be reduced, and reduction in power consumption and reduction in processing delay can be achieved in the mobile terminal.

Because the base station in accordance with the present invention that configures a communications system which transmits data by using an OFDM (Orthogonal Frequency Division Multiplexing) method as a downlink access method, and also transmits data by using an SC-FDMA (Single Career Frequency Division Multiple Access) method as an uplink access method, and that transmits an L1/L2 control signal which is control information to a mobile terminal by using a plurality of frequency bandwidths carries out the process of grouping a mobile terminal which is a destination of transmission of the L1/L2 control signal on a basis of attribution information of the mobile terminal, and the process of allocating an L1/L2 control signal to be transmitted to a predetermined mobile terminal to control channel elements included in a group to which the predetermined mobile terminal is belonging, and transmitting the L1/L2 control signal by using a downlink physical control channel disposed in a downlink to the mobile terminal, the base station does not have to carry out signaling of the candidate set to the mobile terminal being served thereby, and therefore can use radio resources effectively.

Because the mobile terminal in accordance with the present invention that configures a communications system which transmits data by using an OFDM (Orthogonal Frequency Division Multiplexing) method as a downlink access method, and also transmits data by using an SC-FDMA (Single Career Frequency Division Multiple Access) method as an uplink access method, and that receives an L1/L2 control signal which is control information transmitted from a base station using a plurality of frequency bandwidths, grouping of the mobile terminal being performed by the base station on a basis of attribution information of the mobile terminal which is a destination of transmission of the L1/L2 control signal, receives a downlink control signal which is allocated to control channel elements included in a group to which the predetermined mobile terminal is belonging, and which is transmitted thereto by using a downlink physical control channel, and performs a blind detection process on the candidate set corresponding to the group to which the mobile terminal is belonging so as to read the L1/L2 control signal from the control channel elements included in the candidate set, the amount of processing carried out by the mobile terminal when performing a blind detection can be reduced, and reduction in power consumption and reduction in processing delay can be achieved in the mobile terminal.

Because the communications method in accordance with the present invention which is implemented by a communications system including a base station that transmits data by using an OFDM (Orthogonal Frequency Division Multiplexing) method as a downlink access method and a mobile terminal that transmits data by using an SC-FDMA (Single Career Frequency Division Multiple Access) method as an uplink access method, the base station and the mobile terminal transmitting and receiving data by using a plurality of frequency bands, includes: the process of determining a candidate set including CCEs (Control Channel Elements), each of which is one of regions to which one frequency bandwidth is divided, for transmission of an L1/L2 control signal which is control information transmitted and received between the base station and the mobile terminal by using the frequency bandwidth; and the process of extracting the L1/L2 control signal from the candidate set determined in the process, the base station does not have to carry out signaling of the candidate set to the mobile terminal being served thereby, and therefore can use radio resources effectively.

BRIEF DESCRIPTION OF THE FIGURES

FIG. 6 is an explanatory drawing explaining radio resources used for transmitting L1/L2 control information;

FIG. 9 is a table showing an example of combinations each having a system bandwidth of a base station and a candidate set of L1/L2 control information;

FIG. 23 is an explanatory drawing showing an example of allocation of Ack/Nacks;

Figure 1:
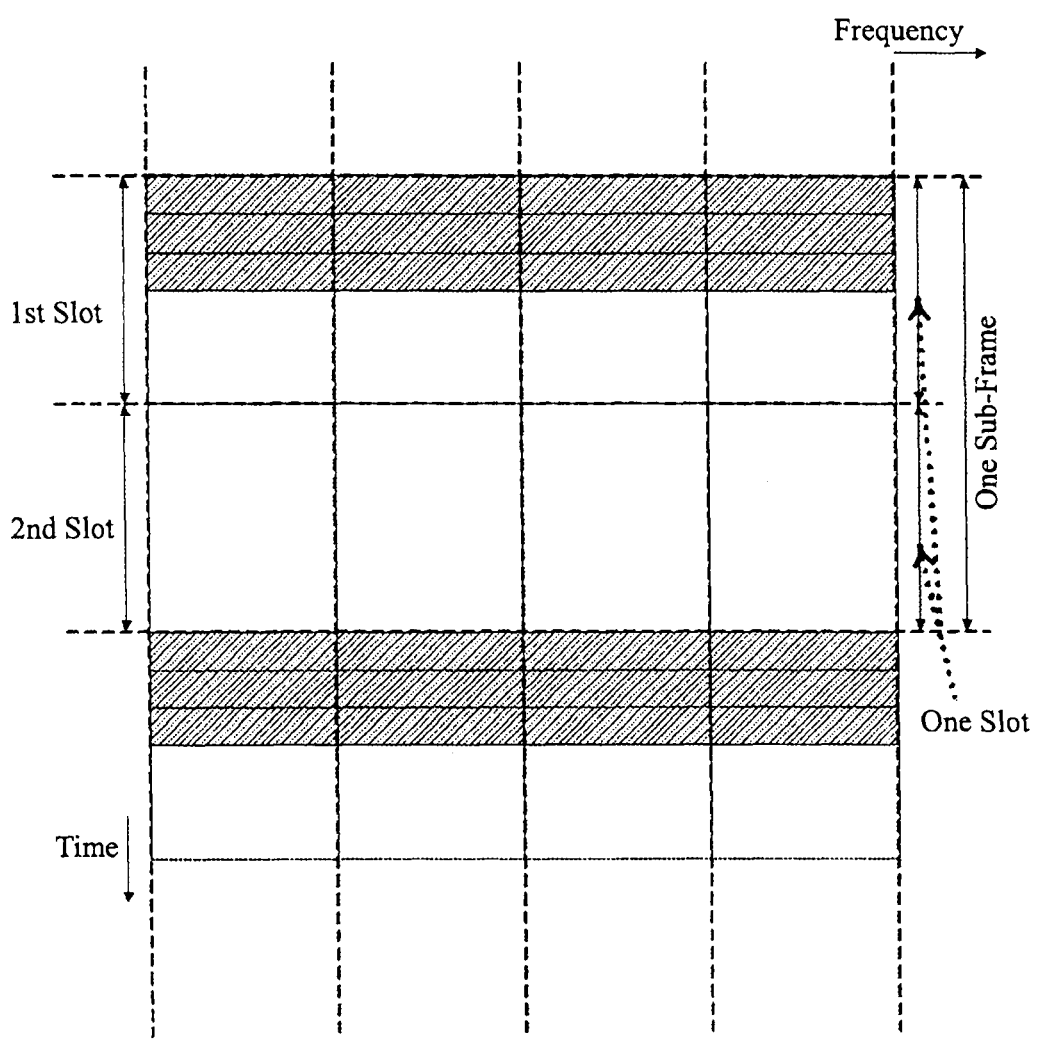
FIG. 1 is an explanatory drawing of a frame structure in the downlink.

EXPLANATION OF REFERENCE NUMERALS 1 aGW, 2 base station, 3 mobile terminal, 4 PDN, 5 service center, protocol processing unit, 7 application unit, 8 transmission data buffer unit, 9 encoder unit, 10 transmission data buffer unit, 10 modulating unit, frequency converting unit, 12 antenna, 13 demodulating unit, 14 decoder unit, 15 control unit, 16 aGW communication unit, 17 other base station communication unit, 18 protocol processing unit, 19 transmission data buffer unit, 20 encoder unit, 21 modulating unit 21, 22 frequency converting unit, 23 antenna, 24 demodulating unit, 25 decoder unit, 26 Control unit

PREFERRED EMBODIMENTS OF THE INVENTION

Embodiment 1

Figure 2:
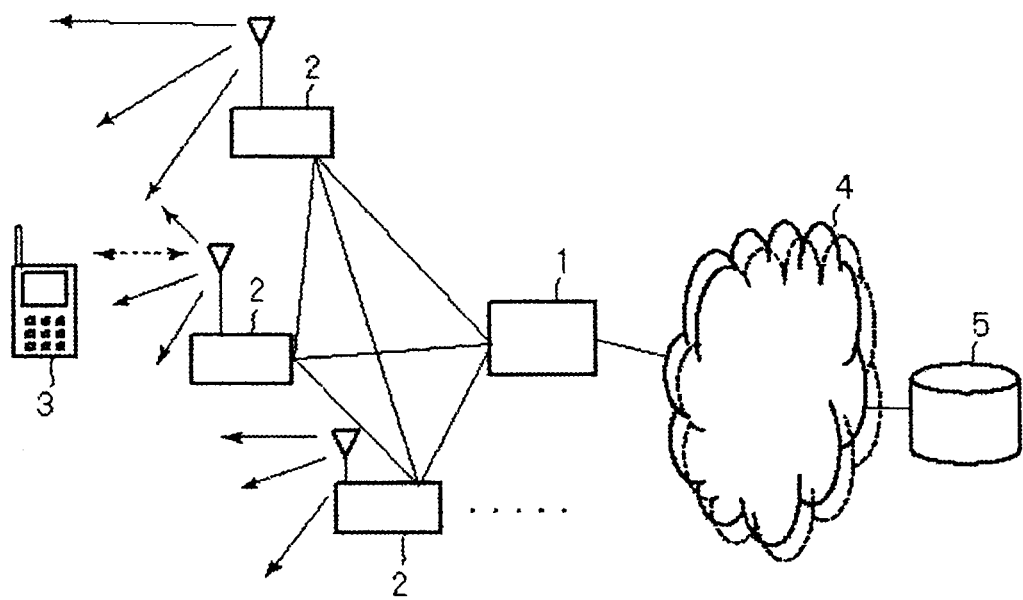
FIG. 2 is an explanatory drawing showing the structure of a mobile communications system in LTE.

FIG. 2 is an explanatory drawing showing the structure of a mobile communications system in LTE. In FIG. 2, an aGW (Mobility Management Entity: MME or Serving Gateway: S-GW) 1 carries out transmission and reception of control data and user data with a plurality of base stations (eNB) 2, and a base station 2 transmits and receives data to and from a plurality of mobile terminals (UE) 3. Between a base station 2 and each mobile terminal 3, broadcast information, information used for call receiving processing, individual control data, individual user data, control data for E-MBMS, or user data for E-MBMS, etc. are transmitted. Base stations 2 also carry out communications between them. Each base station 2 has an uplink scheduler and a downlink scheduler. The schedulers enable transmission and reception of data between the base station 2 and each mobile terminal 3, and perform scheduling to provide improvements in the throughput of each mobile terminal 3 and the whole of the mobile communications system.

An E-MBMS provides a broadcast-type point-to-multi-point (Point to Multipoint) communications service for transmitting data all at once from a certain base station to a plurality of mobile terminals. Concretely, an information service, such as a news service or a weather forecast service, and a large-amount broadcast service, such as a mobile TV service, have been studied. The aGW 1 communicates with a service center 5 via a PDN (Packet Data Network) 4. The service center 5 stores and delivers a content in order to provide a service with users. A content provider transmits E-MBMS data, such as mobile TV broadcast data, to the service center 5. The service center 5 stores the E-MBMS data therein, and also transmits the E-MBMS data to the base station 2 via the PDN 4 and the aGW 1.

Figure 3:
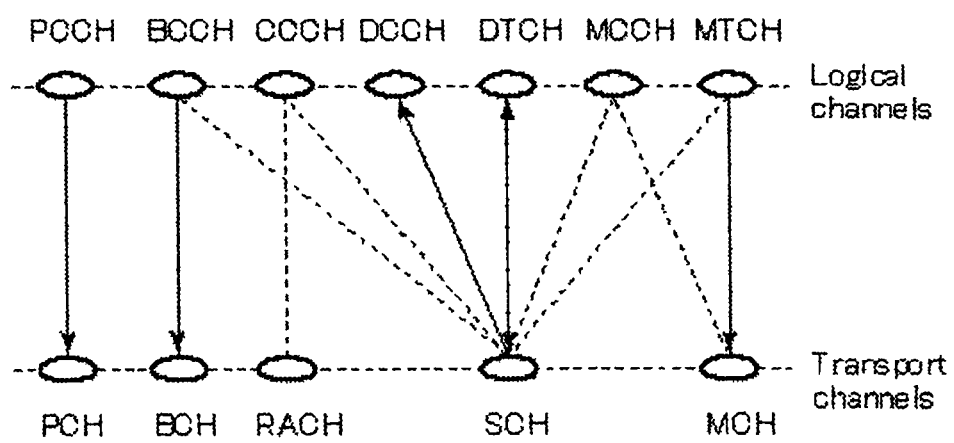
FIG. 3 is an explanatory drawing showing the configuration of channels for use in an LTE communications system.

FIG. 3 is an explanatory drawing showing the configuration of channels. In FIG. 3, mapping between logical channels (Logical Channel) and transport channels (Transport Channel) is shown. The logical channels are classified according to the functions and the logical characteristics of transmission signals. The transport channels are classified according to transmission forms. Broadcast information is carried on a BCCH (Broadcast Control Channel). The BCCH is mapped onto a BCH (Broadcast Channel) or a DL-SCH (Downlink Shared Channel), and is transmitted from a base station to mobile terminals. Information used for the call receiving processing is carried on a PCCH (Paging Control Channel). The PCCH is mapped onto a PCH (Paging Channel), and is transmitted to from a base station to mobile terminals being served thereby. Individual control data destined for each mobile terminal are carried on a DCCH (Dedicated Control Channel).

Furthermore, individual user data destined for each mobile terminal are carried on a DTCH (Dedicated Traffic Channel). The DCCH and the DTCH are mapped onto a DL-SCH (Downlink Shared Channel), and are addressed to each mobile terminal by a base station and are transmitted from the base station to each mobile terminal. In contrast with this, the DCCH and the DTCH are transmitted from each mobile terminal to a base station by using a UL-SCH (Uplink Shared Channel). The DL-SCH and the UL-SCH are shared channels (Shared Channels). Control data and user data for E-MBMS are carried on an MCCH (Multicast Control Channel) and an MTCH (Multicast Traffic Channel) respectively, and each of these channels is mapped onto the DL-SCH or an MCH (Multicast Channel) and is transmitted from a base station to mobile terminals. A connection request signal from each mobile terminal, e.g. a scheduling request signal (an uplink resource allocation request signal) SR is transmitted from each mobile terminal to a base station by using a random access channel (Random Access Channel RACH) or a dedicated channel (Dedicated Channel).

Figure 4:
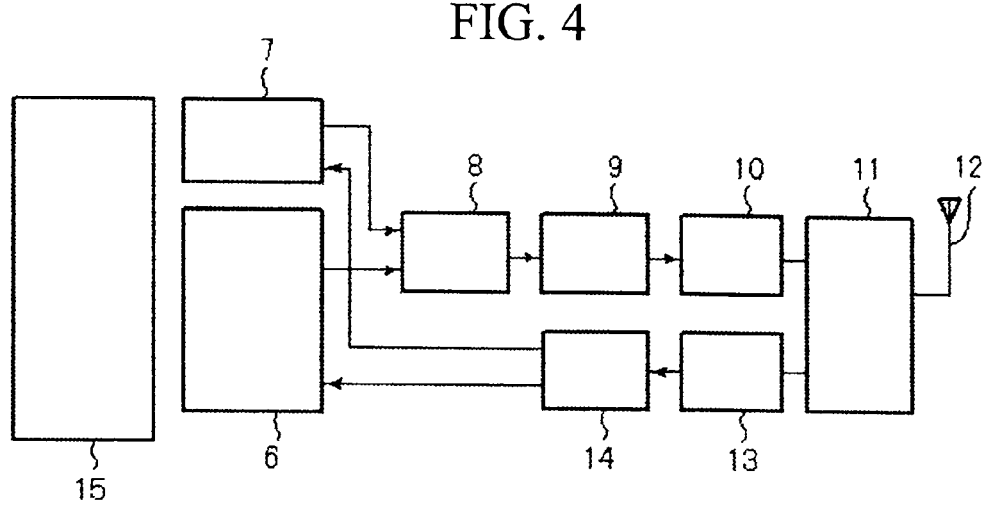
FIG. 4 is a block diagram showing the structure of a mobile terminal.

FIG. 4 is a block diagram showing the structure of each mobile terminal. Each mobile terminal 3 performs a transmitting process as follows. First, control data from a protocol processing unit 6 and user data from an application unit 7 are stored in a transmission data buffer unit 8. The data stored in the transmission data buffer unit 8 are delivered to an encoder unit 9, and the encoder unit 9 then performs an encoding process, such as an error correction process, on the data. There can exist data which are outputted directly from the transmission data buffer unit 8 to a modulating unit 10 without an encoding process being performed. The modulating unit 10 performs a modulation process on the data on which the encoding process has been performed by the encoder unit 9. After the modulated data are converted into a baseband signal, the baseband signal is outputted to a frequency converting unit 11 and is converted into a signal having a radio transmission frequency by the frequency converting unit. After that, the transmission signal is transmitted to a base station 2 by an antenna 12.

Each mobile terminal 3 also performs a receiving process as follows. A radio signal from a base station 2 is received by the antenna 12. The received signal having a radio receiving frequency is converted into a baseband signal by the frequency converting unit 11, and a demodulation process is performed on the baseband signal by a demodulating unit 13. Data which are obtained by demodulating the baseband signal are delivered to a decoder unit 14, and a decoding process, such as an error correction process, is performed on the data. Control data included in the decoded data are delivered to the protocol processing unit 6 while user data included in the decoded data are delivered to the application unit 7. The series of transmitting and receiving processes of each mobile terminal is controlled by a control unit 15.

Figure 5:
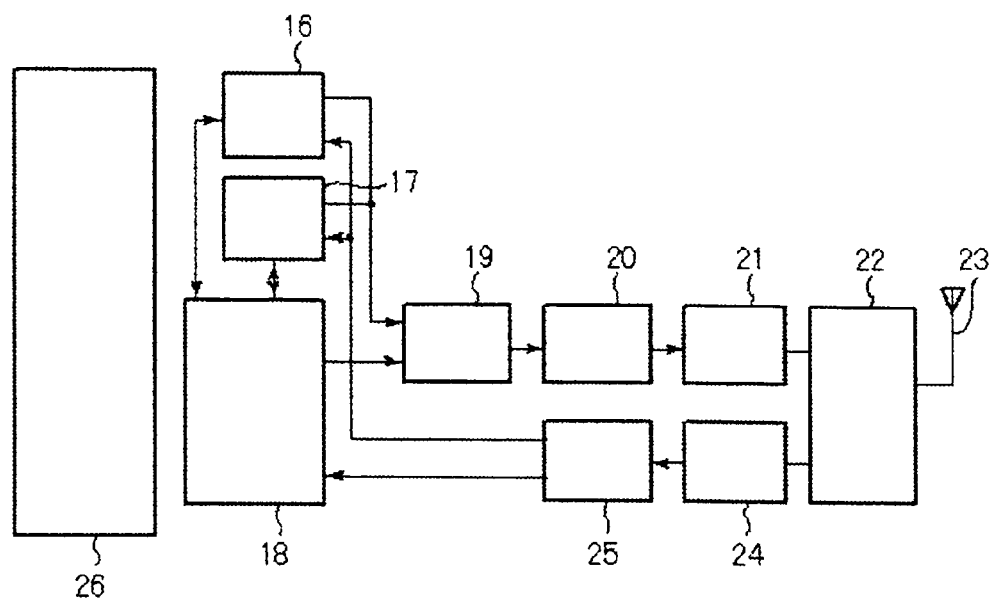
FIG. 5 is a block diagram showing the structure of a base station.

FIG. 5 is a block diagram showing the structure of each base station. Each base station 2 performs a transmitting process as follows. An aGW communication unit 16 carries out transmission and reception of data between the base station 2 and the aGW 1. An other base station communicating unit 17 transmits and receives data to and from another base station. Each of the aGW communication unit 16 and the other base station communicating unit 17 exchanges information with a protocol processing unit 18. Control data from the protocol processing unit 18, and user data from the aGW communication unit 16 and user data from the other base station communicating unit 17 are stored in a transmission data buffer unit 19. The data stored in the transmission data buffer unit 19 are delivered to an encoder unit 20, and the encoder unit 20 then performs an encoding process, such as an error correction process, on the data. There can exist data which are outputted directly from the transmission data buffer unit 19 to a modulating unit 21 without an encoding process being performed. The modulating unit 21 performs a modulation process on the encoded data. After the modulated data are converted into a baseband signal, the baseband signal is outputted to a frequency converting unit 22 and is converted into a signal having a radio transmission frequency by the frequency converting unit. After that, the transmission signal is transmitted to one or more mobile terminals 1 by an antenna 23.

Each base station 2 also performs a receiving process as follows. A radio signal from one or more mobile terminals 3 is received by the antenna 23. The received signal having a radio receiving frequency is converted into a baseband signal by the frequency converting unit 22, and a demodulation process is performed on the baseband signal by a demodulating unit 24. Data which are obtained by demodulating the baseband signal are delivered to a decoder unit 25, and a decoding process, such as an error correction process, is performed on the data. Control data included in the decoded data are delivered to the protocol processing unit 18 while user data included in the decoded data are delivered to the aGW communication unit 16 and the other base station communicating unit 17. The series of transmitting and receiving processes of each base station 2 is controlled by a control unit 26.

This Embodiment 1 is aimed at solving the first problem mentioned above. Nonpatent reference 3 describes that a mobile terminal monitors a candidate set (Candidate Set) of downlink control channels. However, because in a case in which each base station carries out signaling of a candidate set to be monitored to each mobile terminal being served thereby, many radio resources are consumed, it is preferable that each base station does not carry out signaling of the candidate set to each mobile terminal, and each base station and each mobile terminal determine the candidate set. Nonpatent reference 4 discloses a method which does not use signaling. Concretely, nonpatent reference 4 discloses that the identifier (UE-ID) of each mobile terminal or the Cat.0 value is defined as a variable, and a candidate set of downlink control channels is acquired by a mobile terminal and a base station by using a random function.

However, the nonpatent reference 4 does not take into consideration that two or more types (1.25/2.5/5/10/15/20 MHz) of LTE base station bandwidths are disposed. This is a feature of LTE. In a case in which CCEs (Control Channel Elements) have only one size, the number of combinations which CCEs can have changes, that is, the number of candidates of downlink control channels changes when a base station has different bandwidths. In this status, if a candidate set is acquired by a base station and a mobile terminal by using a method which does not taken into consideration the system bandwidth of a base station, e.g. a method disclosed by nonpatent reference 3, there arises a problem that a deviation occurs in the frequency band in which the candidates included in the candidate set exist.

The present invention is characterized in that a base station and a mobile terminal acquire a candidate set of downlink control channels according to the system bandwidth of the base station without relying on signaling for notifying the candidate set. FIG. 6 is an explanatory drawing explaining radio resources for transmitting L1/L2 control information. Each hatched portion shown in FIG. 6 shows a CCE. In FIG. 6, each of eight regions to which a 5-MHz frequency band is divided shows a CCE, and L1/L2 control information is transmitted by using either of a plurality of candidates A1 to A15 which are included in a candidate set A. A case in which a candidate set is acquired without taking into consideration the difference in the system bandwidth will be explained with reference to FIG. 6-A. A base station whose system bandwidth is 5 MHz can allocate L1/L2 control information to either one of the candidates A1 to A15 of the candidate set A. Each mobile terminal detects one or more candidates including the L1/L2 control information from the candidate set A to extract the L1/L2 control information from the candidate. In contrast, because a base station whose system bandwidth is 10 MHz does not use the CCEs included in a region A, a deviation occurs in the frequency band used for downlink control channel transmission, and this results in the radio resources of the region A being not used effectively. A concrete example of a case in which a candidate set is acquired by taking into consideration the difference in the system bandwidth will be shown in FIG. 6-B. For example, the candidate set "candidate set B" of a base station having a system bandwidth of 5 MHz is configured to be one-half of the candidate set "candidate set B'" of a base station having a system bandwidth of 10 MHz. The above-mentioned concrete example is only an example, and the method of acquiring the candidate set by taking into consideration the difference in the system bandwidth is not limited to this example.

Figure 7:
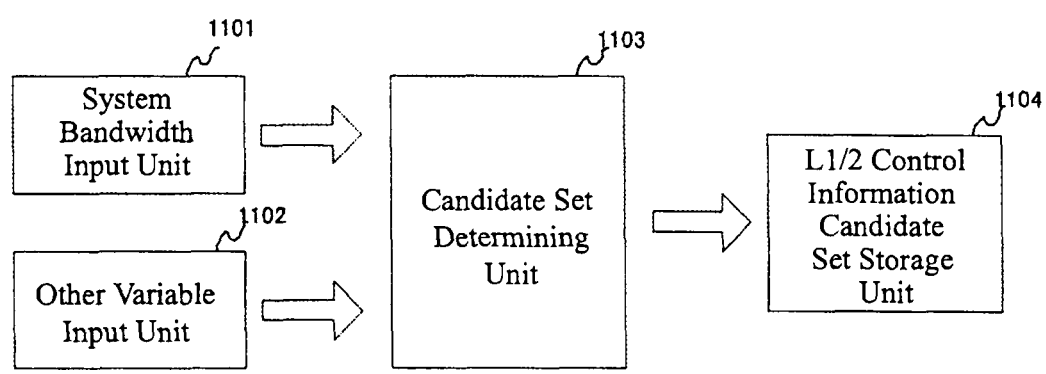
FIG. 7 is a functional block diagram explaining a function of acquiring a candidate set including L1/L2 control information.

FIG. 7 is a functional block diagram explaining the functions for acquiring a candidate set including L1/L2 control information. In the case of each mobile terminal, the functional blocks shown in FIG. 7 can be mounted in the control unit 15 of FIG. 4, while in the case of each base station, the functional blocks shown in FIG. 7 can be mounted in the control unit 26 of FIG. 5. In FIG. 7, a system bandwidth is inputted from a system bandwidth input unit 1101 to a candidate set determining unit 1103. Another variable, other than the system bandwidth, regarding the determination of a candidate set is inputted from a variable input unit 1102 to the candidate set determining unit 1103. The other variable inputted from the variable input unit 1102 to the candidate set determining unit 1103 can be, for example, the identifier (UE-ID) of a mobile terminal or the Cat.0 value, or a parameter for specifying a "CCE group" which will be mentioned below. The candidate set determining unit 1103 determines an L1/L2 control information candidate set by using the inputted variable. Although the candidate set determining unit can use a random function as an example of a determining method of determining the L1/L2 control information candidate set, the candidate set determining unit can alternatively use another method. The candidate set determined by the candidate set determining unit 1103 is stored in an L1/L2 control information candidate set storage unit 1104, and decoding of an L1/L2 control signal is carried out within the candidates.

Figure 8:
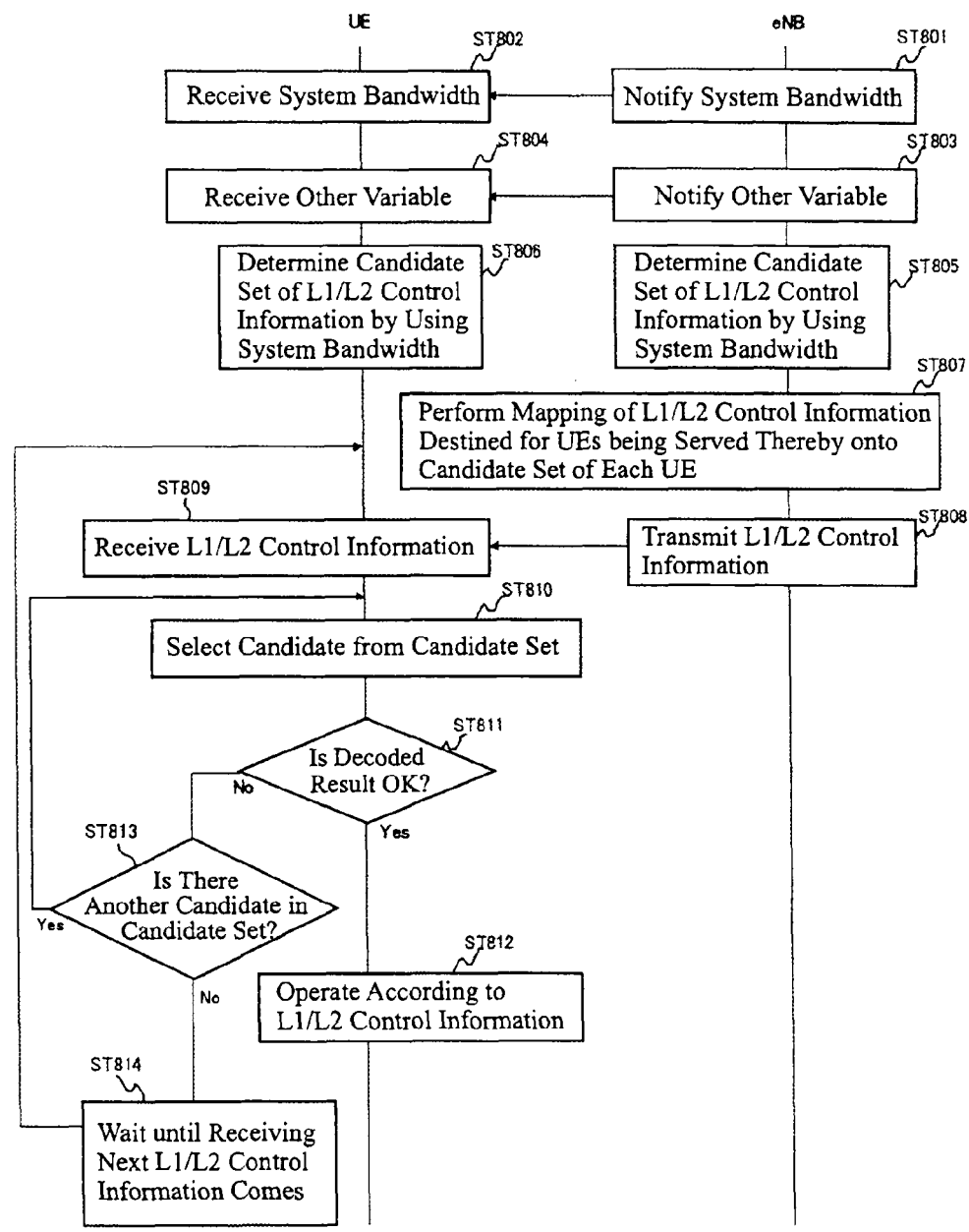
FIG. 8 is a flow chart showing a process of transmitting L1/L2 control information from a base station to a mobile terminal, and a process of determining a candidate set including L1/L2 control information which is carried out by the mobile terminal.

FIG. 8 is a flow chart explaining a process of determining a candidate set including L1/L2 control information. FIG. 8 shows an exchange of signals between a mobile terminal and a base station until a candidate set including L1/L2 control information is determined, and a series of processes which are carried out by the mobile terminal and the base station. In FIG. 8, a system bandwidth is notified from the base station to the mobile terminal (ST801), and the mobile terminal receives the system bandwidth from the base station (ST802). It has been considered that the system bandwidth is carried on the BCCH (Broadcast Control Channel) as broadcast information, and the BCCH is mapped onto the BCH (Broadcast Channel). In addition, the "other variable" other than the system bandwidth is notified from the base station to the mobile terminal (ST803), and the mobile terminal receives the "other variable" notified thereto from the base station (ST804). The base station and mobile terminal determine a candidate set (Candidate Set) of L1/L2 control information from the system bandwidth and the other variable, other than the system bandwidth, regarding the determination of a candidate set (ST805 and ST806) respectively. The methods of determining a candidate set of L1/L2 control information which are carried out by the base station and mobile terminal are the same.

A candidate set can be determined when a variable for determining a candidate set, such as the system bandwidth, varies. The time at which the system bandwidth varies can be the time of location registration or hand-over (the time of changing a serving cell), or the like. Furthermore, the "Cat.0 value" can vary every sub-frame at the shortest. When the change is notified from the base station to the mobile terminal by using an L3 control signal or the like, the "CCE group" is changed. Instead of determining a candidate set when a variable for determining a candidate set, such as the system bandwidth, varies, as previously explained, the base station and mobile terminal can determine a candidate set at fixed time intervals. Furthermore, a candidate set can be alternatively determined when a "trigger" for determining a candidate set is exchanged between the base station and mobile terminal.

In the case of transmitting L1/L2 control information, the base station carries out mapping in such a way that the L1/L2 control information for the mobile terminals being served thereby is included in the candidate set for each of the mobile terminals (ST807), and transmits the L1/L2 control information to the mobile terminals being served thereby (ST808). When receiving the L1/L2 control information from the base station (ST809), each mobile terminal selects one candidate (e.g. one of the candidates A1 to A15 of FIG. 6) from the candidate set of the L1/L2 control information which is determined in ST806 (e.g. the candidate set A of FIG. 6) (ST810). Each mobile terminal carries out a decoding process in order to check to see whether or not the L1/L2 control information is included in the selected candidate (e.g. the candidate A1) (ST811) so as to judge whether or not the results of the decoding process show OK (CRC OK). When the results of the decoding process show OK (if Yes in ST811), each mobile terminal determines that the L1/L2 control information is included in the selected candidate A1, and then carries out a predetermined operation according to the L1/L2 control information (ST812). In contrast, When the results of the decoding process on the selected candidate A1 show NG (if No in ST811), each mobile terminal judges whether or not there is a candidate on which the decoding process has not been performed in the candidate set A (ST813). Because there are candidates A2 to A15 on which the decoding process has not been performed in the candidate set in the previously-explained case (if Yes in ST813), each mobile terminal, in ST810, selects the candidate A2 (ST810), and then performs the decoding process on the candidate (ST811). After having performed the decoding process on all the candidates A1 to A15 (if No in ST813), each mobile terminal determines that there is no L1/L2 control information destined for the mobile terminal itself, and waits until receiving the next L1/L2 control information (ST1214). The processes in above-mentioned ST810 to ST813 are referred to as blind detection (Blind Detect or Blind Decode), or the like.

Each mobile terminal, in ST814, waits until receiving the next L1/L2 control information, and, after that, returns to ST809. As an example, a mobile terminal which has been dynamic-scheduled waits until it receives the first one OFDM symbol, the first two OFDM symbols, or the first three OFDM symbols of the first slot of the next sub-frame. A mobile terminal which is carrying out a DRX operation during active (Active) waits until a receiving operation time interval (on-duration: on-duration) during which the mobile terminal receives L1/L2 control information comes after the next DRX cycle. The DRX operation (DRX in RRC_CONNECTED) during active is a state which is provided newly in order to support low power consumption of a mobile terminal in LTE (E-UTRAN). When the mobile terminal determines that any allocation for the mobile terminal itself is not made during the receiving operation time interval during which the mobile terminal receives L1/L2 control information, the mobile terminal makes a transition to a DRX operation during active again. In contrast, when the mobile terminal determines that allocation for the mobile terminal itself is made during the receiving operation time interval during which the mobile terminal receives L1/L2 control information, the mobile terminal does not perform the DRX operation during active and follows an instruction shown by the L1/L2 control information.

Hereafter, a case in which any variable, other than the system bandwidth, regarding the determination of a candidate set which is notified from the base station to each mobile terminal in ST803 does not exist will be considered. In other words, this case is a case in which only one type of candidate set exists for the system bandwidth. FIG. 9 is a table showing an example of combinations each having a system bandwidth of the base station and a candidate set of L1/L2 control information in Embodiment 1. In a case in which the combinations of a system bandwidths of the base station and a candidate set of L1/L2 control information, as shown in FIG. 9, and a relation between candidate sets and CCEs are statically determined in the mobile communications system, the base station and mobile terminal can determine one candidate set by simply referring to the table of FIG. 9 on the basis of the system bandwidth notified from the base station to each mobile terminal in advance.

As previously explained, by using, as a variable for determining a candidate set including L1/L2 control information, the frequency bandwidth notified from the base station to each mobile terminal in advance, the base station does not need to perform signaling for notifying a candidate set including L1/L2 control information every time when the base station transmits the L1/L2 control information. Therefore, the radio resources can be utilized effectively, and receiving errors do not occur. Therefore, the present embodiment can provide an advantage of being able to prevent disagreement between the state of the base station and that of each mobile terminal, etc. from occurring due to occurrence of a receiving error at the time when each mobile terminal receives a candidate including L1/L2 control information. Furthermore, by defining the frequency band as a variable for determining a candidate set, even an LTE system having two or more frequency bandwidths to be used is enabled to determine a candidate set without causing any deviation in the frequency band in which candidates including L1/L2 control information exist.

In this embodiment, the case in which CCEs (Control Channel Element) have only one size is explained. However, in a case in which there are different base station bandwidths in LTE, CCEs can have different sizes. The method disclosed in this embodiment can also be applied to the case in which CCEs have different sizes this way. Concretely, the size of a CCE according to the system bandwidth (or according to a function of the system bandwidth) is defined as a variable for determining a candidate set, for example. Then, the size of a CCE has only to be derived from the frequency band, and, furthermore, a candidate set has only to be determined according to the size of a CCE. Furthermore, a method of statically determining the table, as shown in FIG. 9, showing the combinations each having a system bandwidth of a base station and a candidate set of L1/L2 control information in advance in the mobile communications system, and statically determining a relation between candidate sets and CCEs in the mobile communications system can also be applied. In this case, what is necessary is to determine a candidate set in consideration of the size of a CCE according to the system bandwidth. Furthermore, what is necessary is to dispose a column showing the size of a CCE according to the system bandwidth in the table. As previously explained, the present embodiment can also be applied to the case in which the sizes of CCEs change according to the base station bandwidth in LTE, and the size of a CCE are not limited to only one type of size. Therefore, the present embodiment offers an advantage of providing the scheduling in the system with flexibility.

Embodiment 2

When receiving a downlink control channel, a mobile terminal demodulates one or more candidates (candidates A1 to A15, or candidates B1 to B15 or B1' to B15') included in a candidate set (the candidate set A, the candidate set B, or the candidate set B' shown in FIG. 6) so as to detect a downlink control signal (L1/L2 control information or the like) included in either one or more of these candidates and destined for the mobile terminal itself with blind detection. Therefore, as the number of candidates increases, the processing load required for the mobile terminal to perform the detecting operation of detecting a downlink control channel increases, and this results in increase in the power consumption of the mobile terminal. Furthermore, as the number of times that the mobile terminal performs the detecting operation of detecting a downlink control channel increases, the average time length required for the mobile terminal to detect a downlink control channel destined for the mobile terminal itself increases, and this results in an increase in delay occurring in the processing carried out by the mobile communications system. In this embodiment, in order to reduce the increase in the power consumption of a mobile terminal and the increase in delay occurring in the processing carried out by the mobile communications system due to the increase in the number of times that the mobile terminal performs the detecting operation of detecting a downlink control channel, CCEs are grouped by information type and/or by mobile terminal, a candidate set is disposed for each group of CCEs, and each mobile terminal is configured in such a way as to carry out a blind detection of only one or more candidates in the candidate set corresponding to a corresponding group in which control information which the mobile terminal desires to detect is included.

Figure 10:
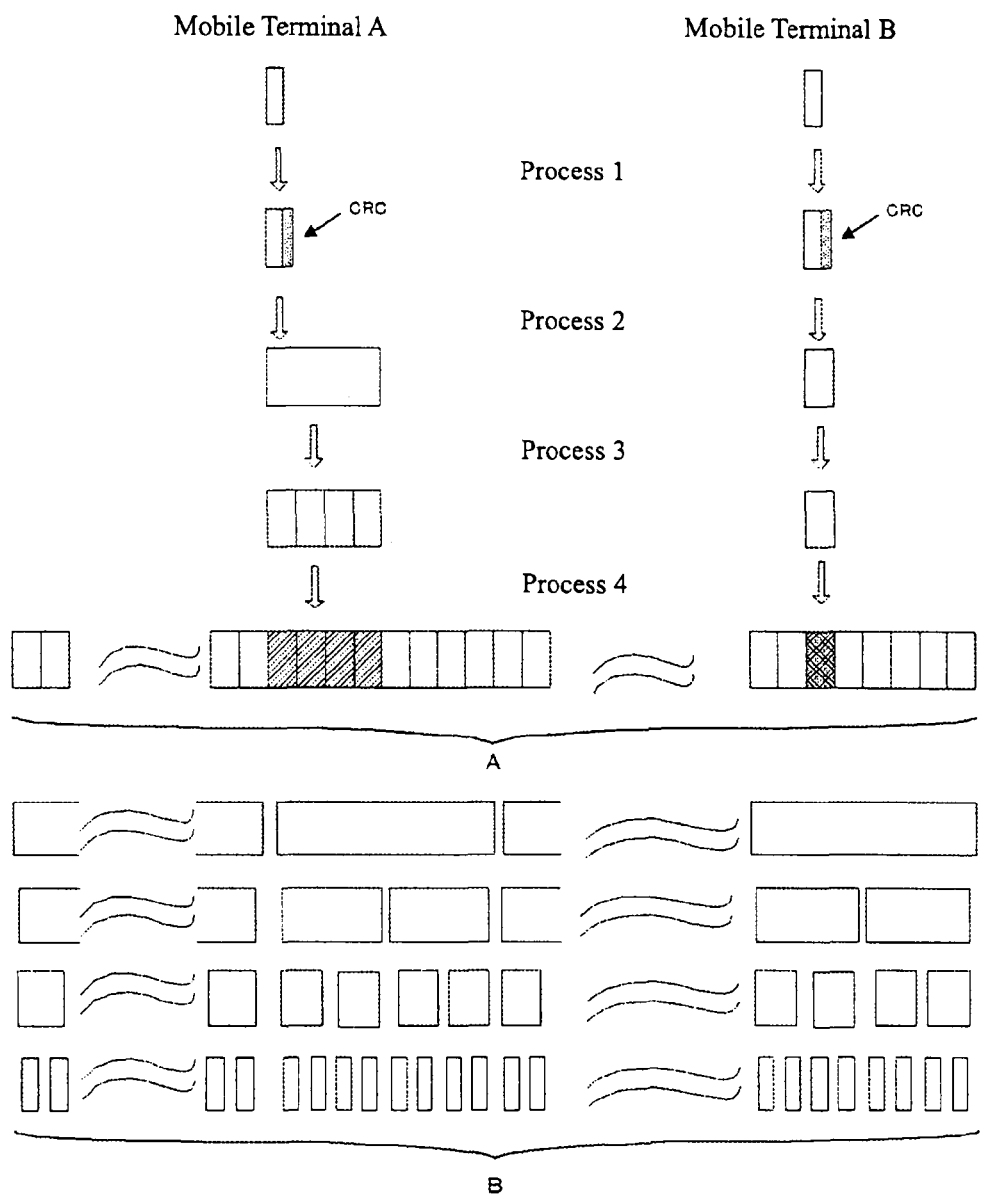
FIG. 10 is an explanatory drawing showing an allocation method of allocating downlink L1/L2 control information (except Ack/Nack) to CCEs, and CCE candidates on which a mobile terminal performs a blind detection.

FIG. 10 is an explanatory drawing showing an allocation method of allocating downlink L1/L2 control information (except for Ack/Nack) destined for mobile terminals A and B to CCEs, and CCE candidates on which each of the mobile terminals performs a blind detection. A base station adds a CRC based on a UE-ID to downlink L1/L2 control information destined for a mobile terminal (except Ack/Nack) (process 1 shown in FIG. 10), and carries out processes, such as encoding, rate matching, and MCS execution (process 2 shown in FIG. 10). The base station divides the downlink L1/L2 control information on which the base station has performed these processes into parts each corresponding to a CCE (process 3 shown in FIG. 10), and allocates them to a part of a number of CCEs which are predetermined according to the system bandwidth (the base station bandwidth), and the number of OFDM symbols to which they are physically mapped (process 4 shown in FIG. 10). The base station carries out the previously-explained processes for each of all the mobile terminals to which the base station will transmit the L1/L2 control information within a certain arbitrary subframe. A in FIG. 10 shows all the CCEs included in the system bandwidth, and B in FIG. 10 shows combinations of CCEs which are candidates to be demodulated.

Each mobile terminal carries out a CCE demodulation process and a blind detection including a CRC check based on the UE-ID so as to identify the L1/L2 control information destined for the mobile terminal itself. However, there are many CCEs provided to the system bandwidth, and there may be a case in which rate matching or the like is performed on the L1/L2 control information (except Ack/Nack) and the L1/L2 control information is allocated to a plurality of CCEs. Therefore, each mobile terminal has to perform a demodulating process on every CCE, every two CCEs, every four CCEs, and every eight CCEs and to perform CRC checks, and the amount of processing load required for the demodulation reaches a huge one. To solve this problem, conventionally, a huge number of combinations of CEs is narrowed to about ten candidates and one set (referred to as a candidate set from here on) including these CCE candidates is predetermined, and each mobile terminal is configured in such a way as to simply demodulate only about ten candidates of combinations of CCEs included in the candidate set so as to retrieve the information destined for the mobile terminal itself. By doing in this way, the amount of processing load required for the demodulation carried out by each mobile terminal can be prevented from reaching a huge one.

Next, a conventional method of mapping CCEs onto a physical resource will be explained. Conventionally, as shown in nonpatent reference 5, L1/L2 control information destined for each mobile terminal (except Ack/Nack) is allocated to CCEs which are provided in advance according to the number of OFDM symbols onto which the CCEs are physically mapped, cell-specific bit scrambling, modulation, and interleaving are performed on the CCEs with these CCEs being handled as a single unit. The CCEs are then mapped onto a physical region included in one sub-frame which is determined to be used for an L1/L2 control signal (in this case, the first three OFDM symbols). By carrying out cell-specific bit scrambling and interleaving, interference between cells is prevented and a frequency diversity gain is acquired.

However, because, in accordance with the above-mentioned conventional method, candidates are selected from among many combinations of some of all the CCEs in the system bandwidth so that only one candidate set is determined in advance, there arises a problem where a limitation, such as one to restrict the number of candidates of one CCE in order to, for example, acquire candidates of eight CCEs, is imposed on the types of combinations, and therefore a limitation to restrict the number of mobile terminals to be allocated to a certain sub-frame is imposed. In contrast with this, although increase in the number of candidates which are selected from many combinations of some of all the CCEs in the system bandwidth reduces the limitations imposed on the combination, there arises a problem where the number of candidates which have to be blind-detected by each mobile terminal increases, and therefore the amount of processing load required for the modulation by each mobile terminal increases. In addition, these problems result in increase in the power consumption of each mobile terminal and occurrence of delay in the processing carried out by the mobile communications system.

In accordance with this embodiment, in order to solve such the problems of the increase in the power consumption of each mobile terminal and occurrence of delay in the processing carried out by the mobile communications system, there is disclosed a method of grouping CCEs by information type and/or by mobile terminal, disposing a candidate set for each CCE group, and causing each mobile terminal to carry out a blind detection of only one or more candidates in the candidate set corresponding to a corresponding group in which control information which the mobile terminal desires to detect is included.

Figure 11:
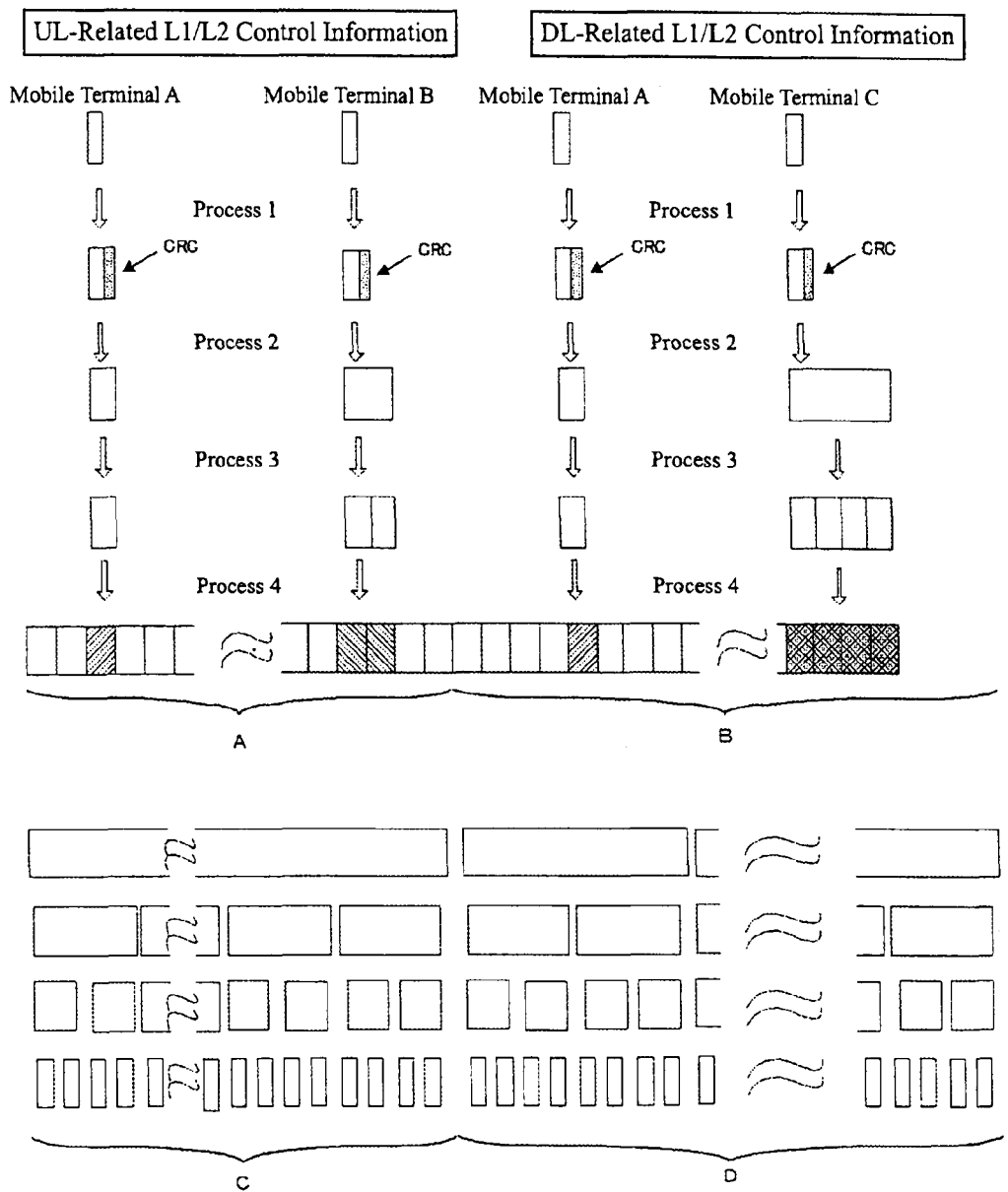
FIG. 11 is an explanatory drawing showing a method of grouping CCEs to allocate L1/L2 control information (except Ack/Nack) to the CCEs by information type, and CCE candidates on which a mobile terminal performs a blind detection.

FIG. 11 is an explanatory drawing showing a method of grouping CCEs to allocate L1/L2 control information (except Ack/Nack) to the CCEs by information type, and CCE candidates on which each mobile terminal performs a blind detection process. L1/L2 control information (except Ack/Nack) is grouped into UL-related L1/L2 control information and DL-related L1/L2 control information. UL-related L1/L2 control information for each of mobile terminals (A and B) is subjected to addition of a CRC (process 1 shown in FIG. 11) and processes, such as encoding, rate matching, and MCS execution (process 2 shown in FIG. 11), by a base station, and is divided into parts each corresponding to a CCE (process 3 shown in FIG. 11). CCEs within the system bandwidth are divided into a group corresponding to UL-related L1/L2 control information and a group corresponding to DL-related L1/L2 control information, and the UL-related L1/L2 control information destined for each mobile terminal, which is divided into parts each corresponding to a CCE, is allocated to the CCE group corresponding to the UL-related L1/L2 control information (process 4 shown in FIG. 11).

In addition, candidates of combinations of CCEs on which each mobile terminal has to perform a blind detection is predefined within the CCE group corresponding to the UL-related L1/L2 control information. As a result, each mobile terminal has only to carry out a blind detection of, instead of candidates which are determined from combinations of CCEs in the whole system bandwidth, candidates which are determined from combinations of CCEs included in the CCE group corresponding to the UL-related L1/L2 control information. On the other hand, DL-related L1/L2 control information for each of mobile terminals (A and C) is subjected to addition of a CRC (process 1 shown in FIG. 11), and processes, such as encoding, rate matching, and MCS execution (process 2 shown in FIG. 11), by the base station, and is divided into parts each corresponding to a CCE (process 3 shown in FIG. 11). The DL-related L1/L2 control information destined for each mobile terminal, which is divided into parts each corresponding to a CCE, is allocated to the CCE group corresponding to the DL-related L1/L2 control information (process 4 shown in FIG. 11). In addition, candidates of combinations of CCEs on which each mobile terminal has to perform a blind detection is determined in advance within the CCE group corresponding to the DL-related L1/L2 control information. As a result, each mobile terminal has only to carry out a blind detection of, instead of candidates which are determined from combinations of CCEs in the whole system bandwidth, candidates which are determined from combinations of CCEs included in the CCE group corresponding to the DL-related L1/L2 control information. A in FIG. 11 shows the CCE group corresponding to the UL-related L1/L2 control information, B in FIG. 11 shows the CCE group corresponding to the DL-related L1/L2 control information, C in FIG. 11 shows combinations of CCEs which are candidates to be demodulated corresponding to the UL-related L1/L2 control information, and D in FIG. 11 shows a combination of CCEs which are candidates to be demodulated corresponding to the DL-related L1/L2 control information.

The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

Furthermore, there is a case in which a mobile terminal can know which type of information has not been sent thereto. For example, when a mobile terminal issues a request for allocation of an uplink resource (e.g. an RACH), UL-related L1/L2 control information is transmitted from the base station to the mobile terminal. Therefore, a mobile terminal which has not issued any request for allocation of an uplink resource can know that no UL-related L1/L2 control information has not been sent thereto. As shown in this embodiment, by using the method of grouping CCEs by information type, and providing a candidate set for each CCE group, the base station enables each mobile terminal to carry out a blind detection of only the candidates included in a CCE group corresponding to DL-related L1/L2 control information in such a case as mentioned above without having to carry out a blind detection of the candidates included in every one of all the control information groups.

Figure 12:
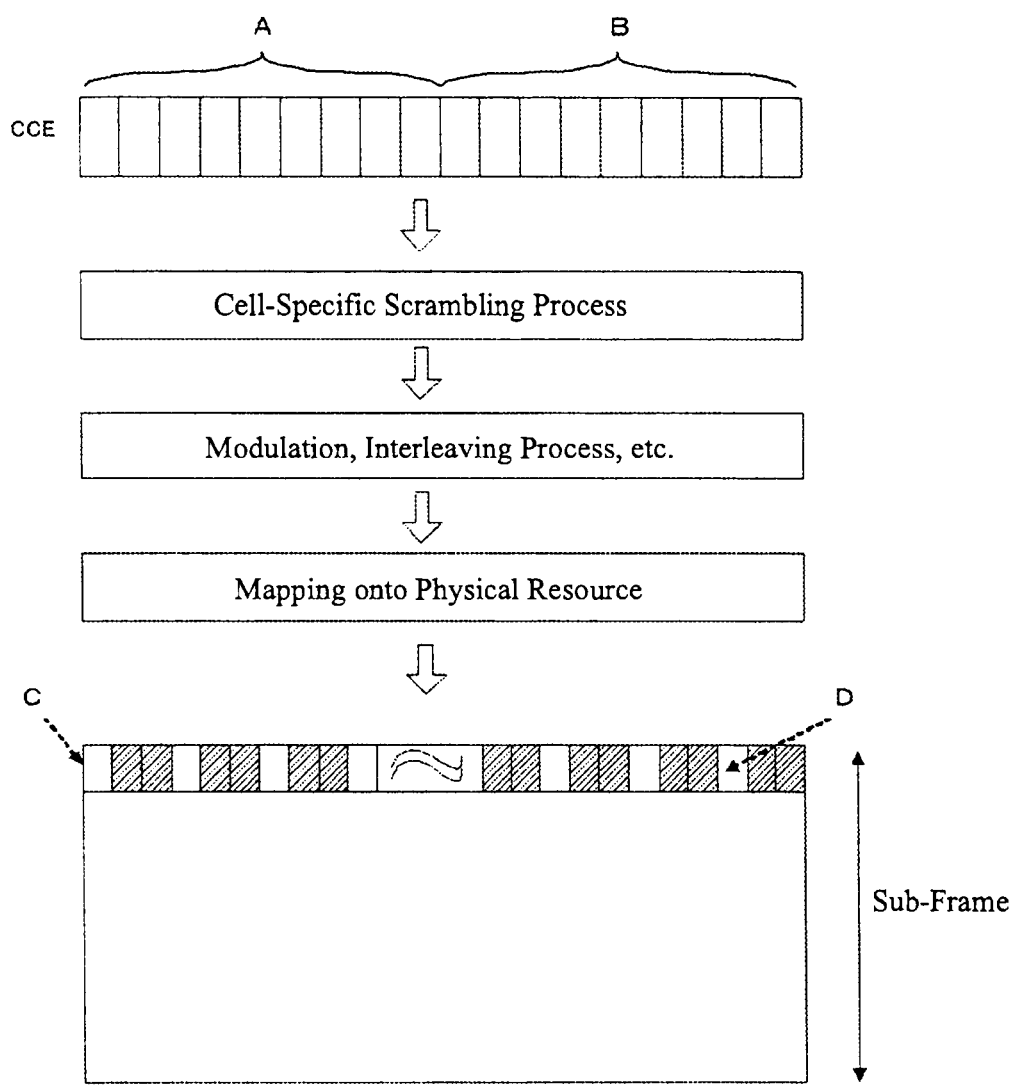
FIG. 12 is an explanatory drawing showing an example of a mapping method of mapping each CCE group onto a physical resource.
Figure 13:
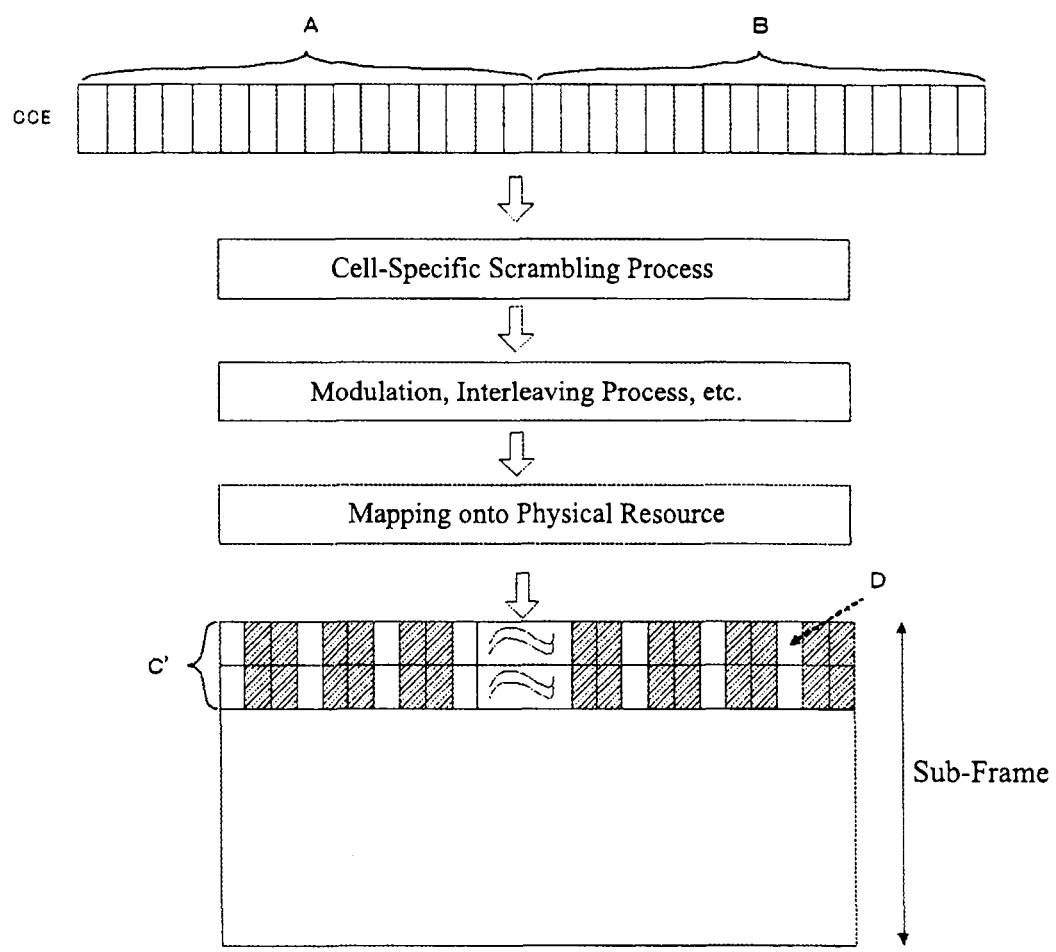
FIG. 13 is an explanatory drawing showing an example of a mapping method of mapping each CCE group onto a physical resource.
Figure 14:
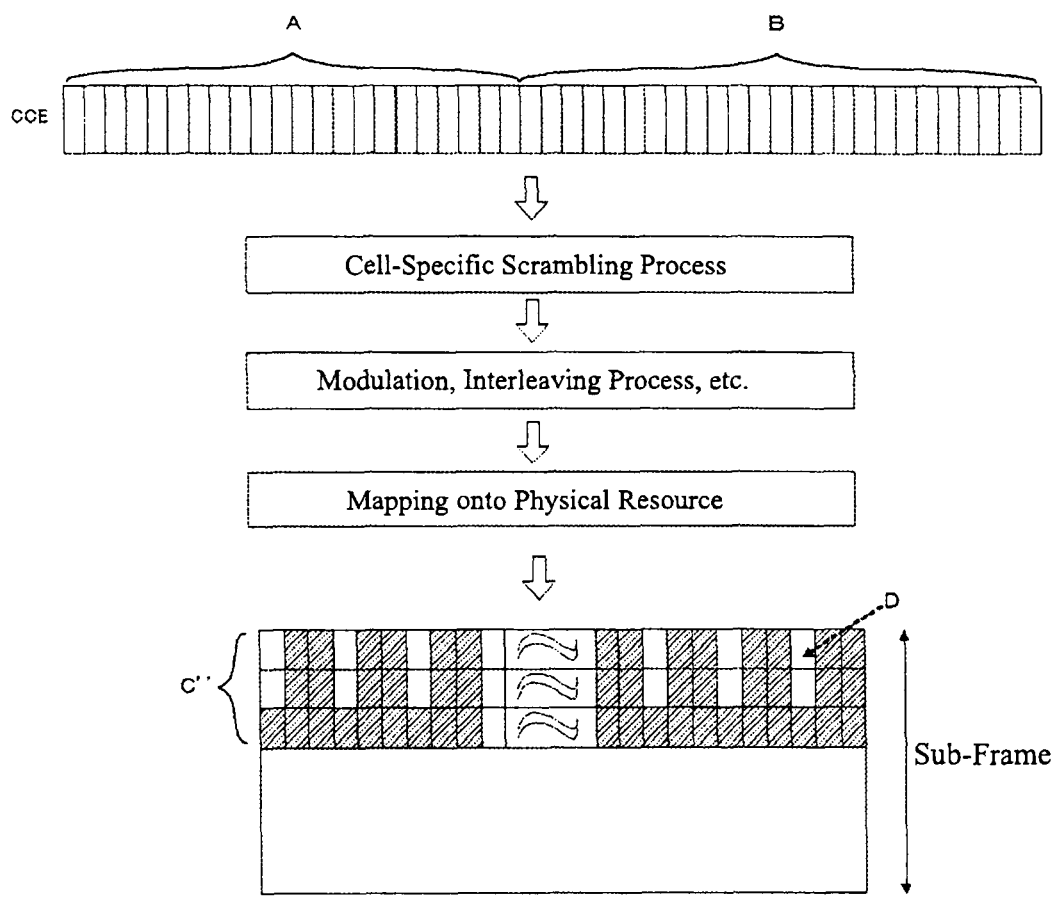
FIG. 14 is an explanatory drawing showing an example of a mapping method of mapping each CCE group onto a physical resource.

Next, a method of mapping CCEs onto a physical resource will be explained. FIG. 12 is an explanatory drawing showing an example of a mapping method of mapping each CCE group onto a physical resource. A in FIG. 12 shows a CCE group corresponding to UL-related L1/L2 control information, B in FIG. 12 shows a CCE group corresponding to DL-related L1/L2 control information, C in FIG. 12 shows one OFDM symbol, and D in FIG. 12 shows a reference symbol. As shown in FIG. 12, all the CCEs within the system bandwidth are divided into a CCE group corresponding to UL-related L1/L2 control information and a CCE group corresponding to DL-related L1/L2 control information. A cell-specific scrambling process, modulation, an interleaving process, etc. are performed on all the CCEs with these CCES being handled as a single unit, and mapping of the CCEs onto a physical resource on frequency and time axes is carried out. FIG. 12 shows a case of mapping of the CCEs onto one OFDM symbol. In the case of mapping the CCEs onto a physical resource, the CCEs are mapped onto a region except regions in each of which information about a reference symbol, Cat0, or Ack/Nack is mapped. FIG. 13 shows a case in which the CCEs are mapped onto two OFDM symbols, and FIG. 14 shows a case in which the CCEs are mapped onto three OFDM symbols. A in each of FIGS. 13 and 14 shows a CCE group corresponding to UL-related L1/L2 control information, B in each of FIGS. 13 and 14 shows a CCE group corresponding to DL-related L1/L2 control information, C in FIG. 12 shows one OFDM symbol, and D in FIG. 12 shows a reference symbol. C" in FIG. 13 shows two OFDM symbols, C" in FIG. 14 shows three OFDM symbols, and D in each of FIGS. 13 and 14 shows a reference symbol. Because the number of all the CCEs is determined according to the number of OFDM symbols, all the CCEs corresponding to the number of OFDM symbols are mapped onto a physical resource on the frequency and time axes, which is included in the predetermined OFDM symbols.

Figure 15:
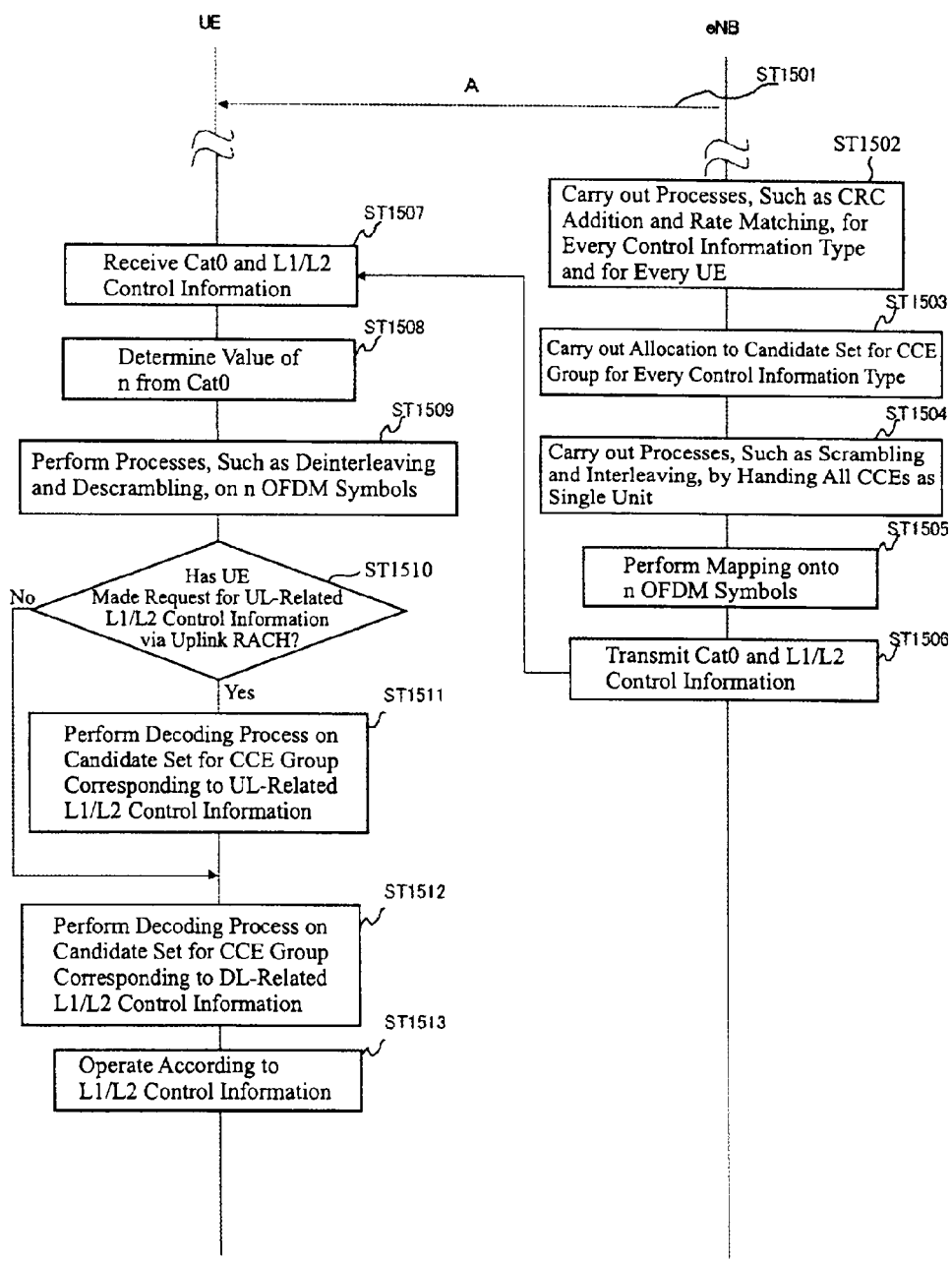
FIG. 15 is a flow chart showing a process of transmitting L1/L2 control information from a base station to a mobile terminal, and a process of determining a candidate set including L1/L2 control information which is carried out by the mobile terminal.

FIG. 15 is a flow chart showing a process of transmitting L1/L2 control information from the base station to each mobile terminal, and a process of determining a candidate set including L1/L2 control information in the mobile terminal. In FIG. 15, each mobile terminal receives an L1/L2 control signal from the base station. A reference character A in FIG. 15 shows that the "number and region of CCEs included in the CCE group according to the number of OFDM symbols", and the "information about the candidate set of each CCE group according to the number of OFDM symbols" are notified from the base station to the mobile terminal (ST1501). This notification is performed by using, for example, the BCCH or L3 signaling. Instead of notifying these pieces of information from the base station to each mobile terminal, the pieces of information can be predefined. The base station performs processes, such as addition of a CRC and rate matching, on control information which has to be transmitted to mobile terminals for every control information type and for every UE (ST1502). Next, the base station divides the information processed as mentioned above into parts each corresponding to a CCE, and allocates these parts to the candidate set for each of the CCE groups into which all the CCEs are divided according to the control information types (ST1503) and performs processes, such as scrambling and interleaving, on all the CCE parts of the information by handling these CCE parts as a single unit (ST1504). The base station then maps the information, on which the base station has performed these processes by handling all the CCE parts as a single unit, onto the 1st to nth OFDM symbols of the physical resource (ST2305), and then transmits, as well as Cat0 (information about the number of OFDM symbols which are used for the L1/L2 control information), the L1/L2 control information to the mobile terminals being served thereby (ST1506).

Each mobile terminal receives, as well as Cat0, the L1/L2 control information (ST1507), determines the number of OFDM symbols used for the L1/L2 control information from Cat0 (ST1508), and performs processes, such as deinterleaving and descrambling, on a number of OFDM symbols which number is based on the results of the determination (ST1509). On the other hand, before performing the processes, each mobile terminal stores information showing whether the mobile terminal has made a request for UL-related L1/L2 control information by using an uplink RACH or the like therein. When each mobile terminal has made a request of the base station for UL-related L1/L2 control information (if Yes in ST1510), the mobile terminal sequentially performs a decoding process on each of the CCE candidates within the candidate set for the CCE group corresponding to UL-related L1/L2 control information, the candidate set being notified thereto in advance in ST1501, after performing the processes such as descrambling (ST1511). When having not made any request of the base station for UL-related L1/L2 control information (if No in ST1510), each mobile terminal skips the process of ST1511, and then performs a decoding process on each of the CCE candidates in the candidate set for the CCE group corresponding to DL-related L1/L2 control information, the candidate set being notified thereto in advance in ST1501 (ST1512). Each mobile terminal then performs an operation according to the L1/L2 control information received thereby (ST1513).

As mentioned above, the base station groups CCEs and allocates L1/L2 control information to the CCEs by information type, and each mobile terminal selects CCE candidates on which the mobile terminal performs a blind detection from combinations of CCEs included in a CCE group corresponding to the information type. Therefore, the present embodiment provides an advantage of being able to reduce the number of candidates as compared with a case of selecting candidates from the combinations of all the CCEs within the system bandwidth, and to reduce the amount of processing load required for the demodulation which each mobile terminal has when performing a blind detection, and the delay occurring in the processing carried out by each mobile terminal. As a result, the power consumption of each mobile terminal can be reduced and the delay occurring in the processing carried out by the mobile communications system can be reduced. In contrast with this, in a case in which the same number of candidates are determined, the number of mobile terminals which are allocated to a certain sub-frame can be increased and hence the efficiency of using the radio resources in the system can be improved. In addition, when each mobile terminal knows which type of information has not been sent thereto, each mobile terminal does not have to carry out a blind detection of the CCE candidates included in each of all the control information groups, and has only to carry out a blind detection of, for example, only the candidates of the CCE group corresponding to DL-related L1/L2 control information. Therefore, the present embodiment provides an advantage of being able to reduce the amount of processing load required for the demodulation carried out by each mobile terminal and the delay occurring in the processing carried out by each mobile terminal. As a result, the power consumption of each mobile terminal can be further reduced and the delay occurring in the processing carried out by the mobile communications system can be reduced.

On the other hand, by carrying out the series of processes, such as a cell-specific scrambling process, by handling, as a single unit, all the CCEs divided into CCE groups, and then mapping them onto a physical resource, as mentioned above, interference between cells can be prevented and a frequency diversity gain can be acquired even though all the CCEs are divided into the CCE groups. In addition, even if the CCE group via which a desired control signal is transmitted changes every sub-frame, each mobile terminal can carry out up to a deinterleaving process of deriving the CCEs from the physical resource and so on according to the same procedure. Therefore, because the demodulating process can be simplified, there can be provided an advantage of reducing the processing time and the circuit scale, and achieving low power consumption.

Furthermore, even when the CCEs are mapped onto two OFDM symbols or the CCEs are mapped onto three OFDM symbols, the same advantages can be provided. In this Embodiment 2, L1/L2 control information (except Ack/Nack) is grouped into UL-related L1/L2 control information and DL-related L1/L2 control information. In contrast, in a case of supporting MIMO, L1/L2 control information (except Ack/Nack) can be alternatively grouped into MIMO-related information and other L1/L2 control information. As a result, a mobile terminal which supports MIMO can selectively demodulate MIMO-related information. In contrast with this, a mobile terminal which does not support MIMO has only to demodulate other L1/L2 control information without demodulating MIMO-related information. As a result, the power consumption of such a mobile terminal can be reduced because of reduction in the amount of processing, and the delay occurring in the processing carried out by the mobile communications system can be reduced.

Figure 16:
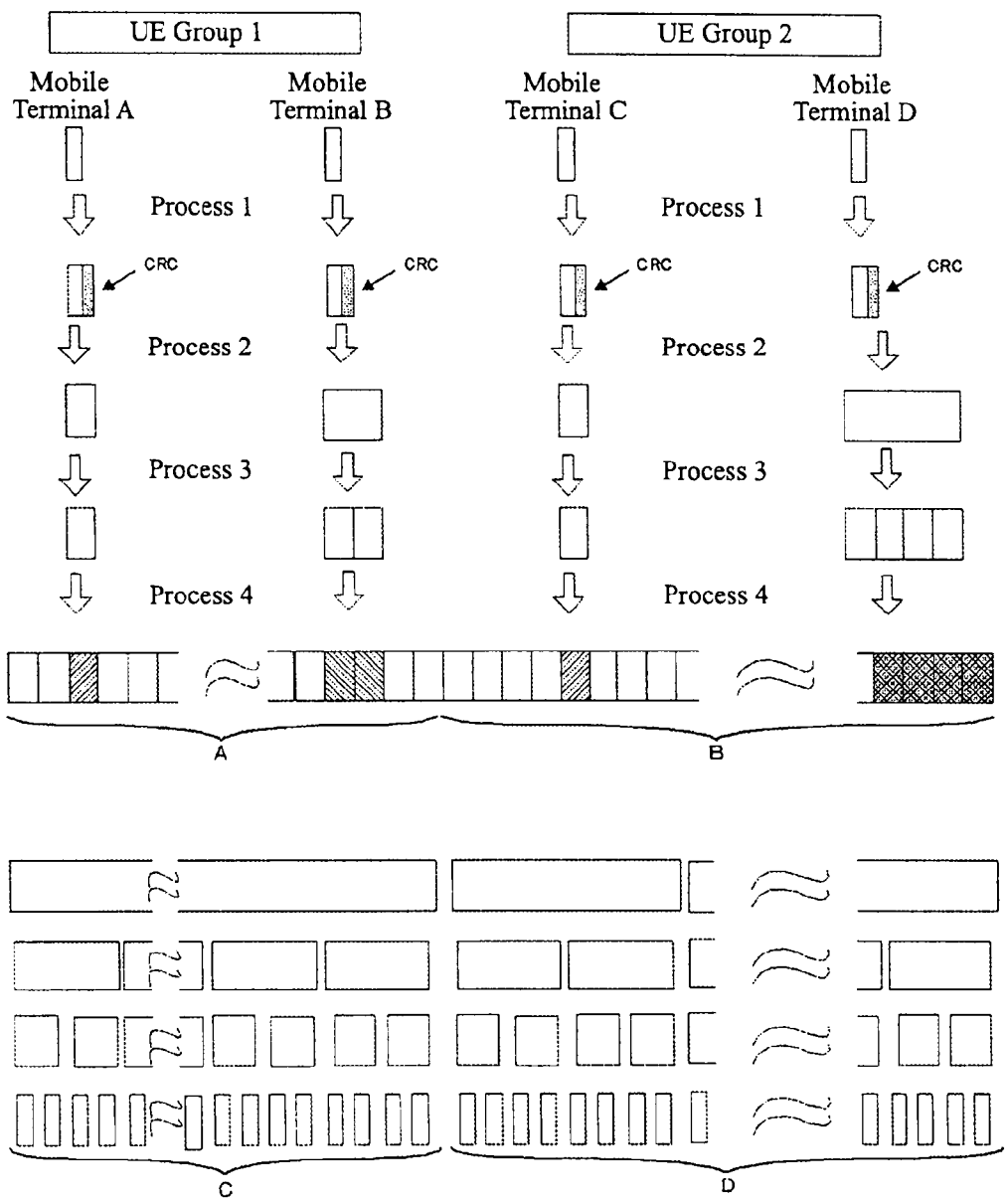
FIG. 16 is an explanatory drawing showing an example of a method of grouping CCEs by mobile terminal to allocate L1/L2 control information to the CCEs, and CCE candidates on which a mobile terminal performs a blind detection.

Hereafter, a first variant of this embodiment will be explained. In the above-mentioned embodiment, the method of grouping CCEs to allocate L1/L2 control information to the CCEs by information type, and CCE candidates on which each mobile terminal performs a blind detection process are explained. Hereafter, a method of grouping CCEs by UE and then allocating L1/L2 control information to the CCEs, and CCE candidates on which each mobile terminal performs a blind detection process will be explained. FIG. 16 is an explanatory drawing showing an example of the method of grouping CCEs by mobile terminal and then allocating L1/L2 control information to the CCEs, and CCE candidates on which each mobile terminal performs a blind detection process. Mobile terminals to which L1/L2 control information is transmitted are grouped into UE group 1 and UE group 2. L1/L2 control information (except Ack/Nack) to be transmitted to each of mobile terminals (A and B) belonging to the UE group 1 is subjected to addition of a CRC (process 1 shown in FIG. 16), and processes, such as encoding, rate matching, and MCS execution, (process 2 shown in FIG. 16) by the base station, and is then divided into parts each corresponding to a CCE (process 3 shown in FIG. 16). The CCEs within the system bandwidth are divided into a group corresponding to the UE group 1 and a group corresponding to the UE group 2, and L1/L2 control information (except Ack/Nack) destined for each mobile terminal belonging to the group 1 and divided into CCE parts is allocated to the CCE group corresponding to the group 1 (process 4 shown in FIG. 16). A in FIG. 16 shows the CCE group corresponding to the UE group 1, B in FIG. 16 shows the CCE group corresponding to the UE group 2, C in FIG. 16 shows combinations of CCEs which correspond to the UE group 1 and which are candidates to be demodulated, and D in FIG. 16 shows combinations of CCEs which correspond to the UE group 2 and which are candidates to be demodulated.

In addition, the candidates of combinations of CCEs on which each of the mobile terminals has to perform a blind detection can be predetermined from among the CCE group corresponding to the UE group 1. As a result, each mobile terminal belonging to the UE group 1 has only to perform a blind detection on, instead of the candidates which are determined from the combinations of CCEs included in the whole system bandwidth, the candidates which are determined from the combinations of CCEs included in the CCE group corresponding to the UE group 1. On the other hand, L1/L2 control information (except Ack/Nack) to be transmitted to each of mobile terminals (C and D) belonging to the UE group 2 is subjected to addition of a CRC (process 1 shown in FIG. 16) and processes, such as encoding, rate matching, and MCS execution, (process 2 shown in FIG. 16) by the base station, and is then divided into parts each corresponding to a CCE (process 3 shown in FIG. 16). L1/L2 control information (except Ack/Nack) destined for each mobile terminal belonging to the group 2 and divided into CCE parts is allocated to the CCE group corresponding to the UE group 2 (process 4 shown in FIG. 16). In addition, candidates of combinations of CCEs on which each of the mobile terminals has to perform a blind detection can be predetermined from among the CCE group corresponding to the UE group 2. As a result, each mobile terminal belonging to the UE group 2 has only to perform a blind detection on, instead of the candidates which are determined from the combinations of CCEs included in the whole system bandwidth, the candidates which are determined from the combinations of CCEs included in the CCE group corresponding to the UE group 2.

To which UE group each mobile terminal is belonging can be clearly notified to each mobile terminal from the base station (for example, the base station notifies to which UE group each mobile terminal is belonging to each mobile terminal in advance by using an L3 message, the BCCH, or the like). As an alternative, the base station and mobile terminal can determine to which UE group each mobile terminal is belonging on the basis of a predefined rule (e.g. having a table showing a correspondence between the UE-ID of each mobile terminal and a UE group number) respectively. The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

Figure 17:
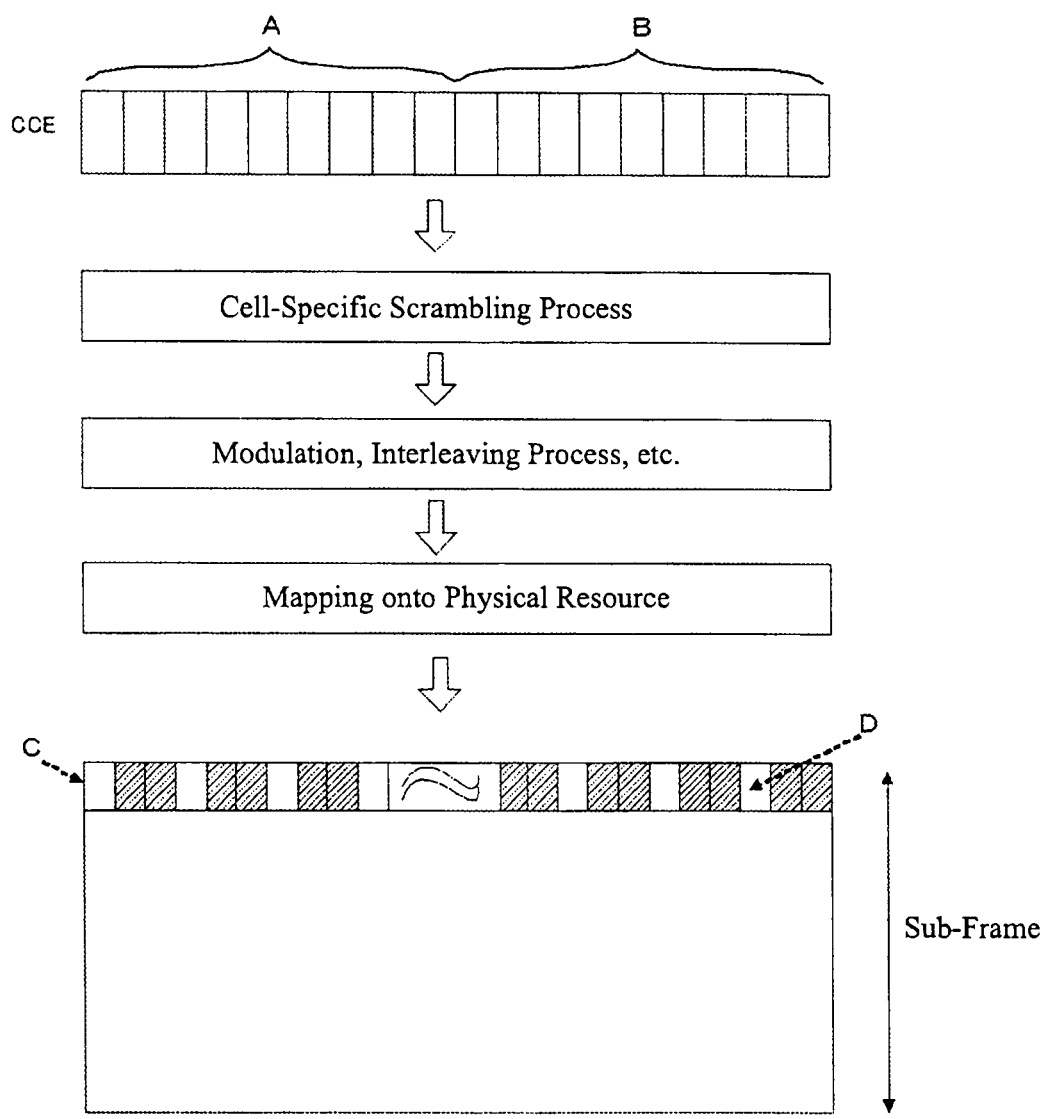
FIG. 17 is an explanatory drawing showing an example of a mapping method of mapping each CCE group onto a physical resource.

Next, a method of mapping CCEs onto a physical resource will be explained. FIG. 17 is an explanatory drawing showing an example of a mapping method of mapping each CCE group onto a physical resource. All the CCEs included in the system bandwidth are divided into the CCE group (A shown in FIG. 17) corresponding to the UE group 1, and the CCE group (B shown in FIG. 17) corresponding to the UE group 2, and a cell-specific scrambling process, modulation, an interleaving process, etc. are performed on all the CCEs with these CCEs being handled as a single unit, and mapping of the CCEs onto a physical resource on frequency and time axes is carried out. FIG. 17 shows a case of mapping each CCE group onto one OFDM symbol (C shown in FIG. 17). In the case of mapping each CCE group onto the physical resource, the CCEs are mapped to a region except regions in each of which information about a reference symbol (D shown in FIG. 17), Cat0, or Ack/Nack is mapped. The mapping can be processed similarly also in a case in which each CCE group is mapped onto two OFDM symbols or three OFDM symbols. More specifically, what is necessary is to replace the CCE group, as shown in FIGS. 13 and 14, corresponding to each information type with the CCE group corresponding to each UE group, and, because the number of all the CCEs is determined according to the number of OFDM symbols, all the CCEs corresponding to the number of OFDM symbols are mapped onto a physical resource on the frequency and time axes, which is included in the predetermined OFDM symbols.

Figure 18:
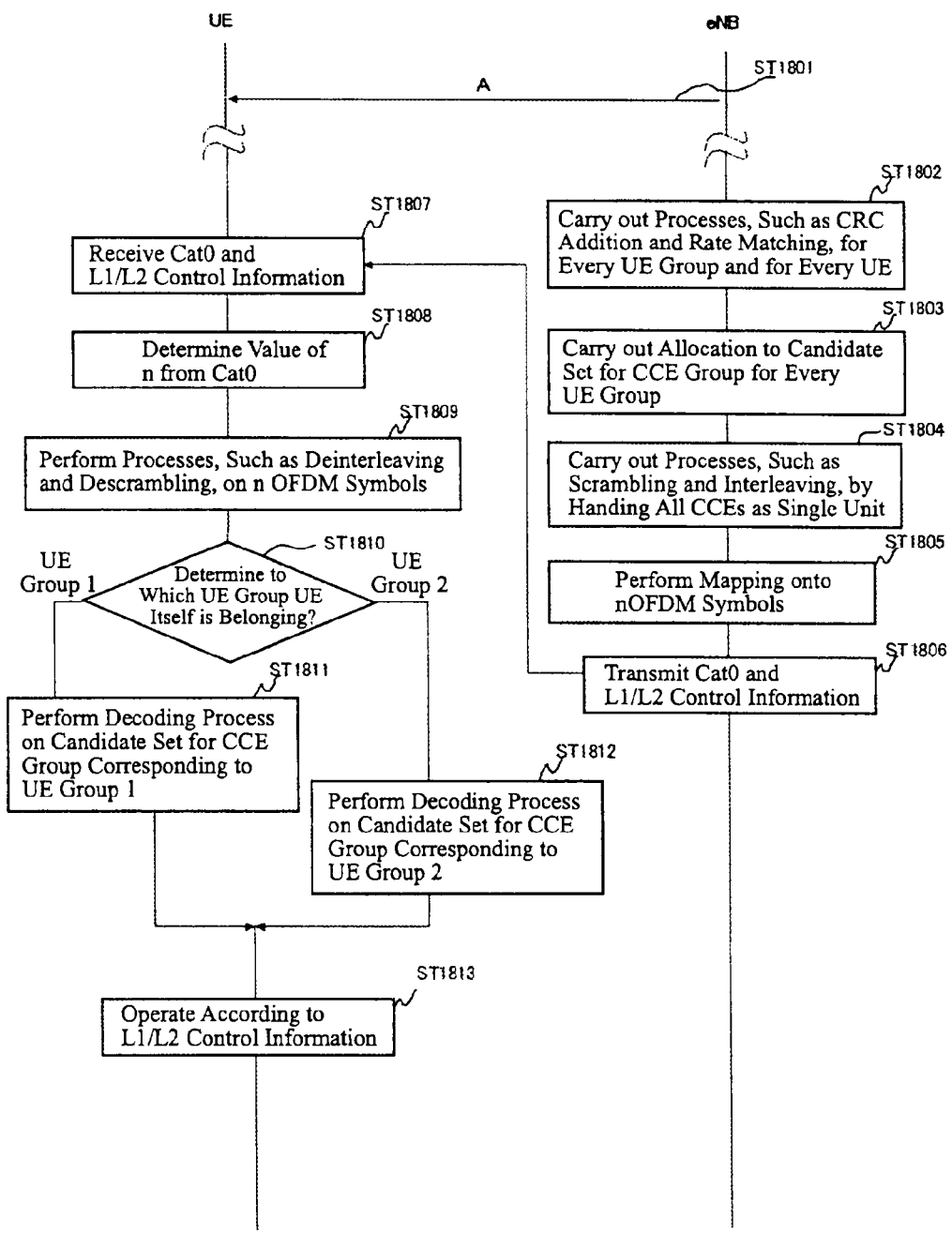
FIG. 18 is a flow chart showing a process of transmitting L1/L2 control information from a base station to a mobile terminal, and a process of determining a candidate set including L1/L2 control information which is carried out by the mobile terminal.

FIG. 18 is a flow chart showing a process of transmitting L1/L2 control information from the base station to each mobile terminal, and a process of determining a candidate set including L1/L2 control information which is carried out by each mobile terminal. Because the processes of ST1802 to ST1809 and ST1813, among the series of processes shown in FIG. 18, are the same as the processes of ST1502 to ST1509 and ST1513 shown in FIG. 15, the explanation of them will be omitted, and ST1801 and ST1810 to ST1812 will be explained. In ST1501 of FIG. 15, the base station notifies both the "number and region of CCEs included in the CCE group according to the number of OFDM symbols", and the "information about the candidate set of each CCE group according to the number of OFDM symbols" to each mobile terminal. In ST1801 of FIG. 18, as shown in a reference character A, the base station is configured in such a way as to newly notify "information about the UE group" to each mobile terminal. Instead of notifying this "information about the UE group" from the base station, the base station and each mobile terminal can determine the information about the UE group on the basis of a predefined rule (e.g. having a table showing a correspondence between the UE-ID of each mobile terminal and a UE group number) respectively. Each mobile terminal, in ST1810, determines the UE group to which each mobile terminal is belonging by using the "information about the UE group" notified thereto from the base station. When belonging to the UE group 1, each mobile terminal performs a decoding process on the CCE candidates included in the candidate set for the CCE group corresponding to the UE group 1 (ST1811). In contrast, when belonging to the UE group 2, each mobile terminal performs a decoding process on the CCE candidates included in the candidate set for the CCE group corresponding to the UE group 2 (ST1812).

As mentioned above, each mobile terminal selects candidates from the combination of CCEs included in the CCE group corresponding to the UE group thereof. Therefore, the present embodiment provides an advantage of being able to reduce the number of candidates as compared with a case of selecting candidates from the combinations of all the CCEs within the system bandwidth, and to reduce the amount of processing load required for the demodulation which each mobile terminal has when performing a blind detection, and the delay occurring in the processing carried out by each mobile terminal. As a result, the power consumption of each mobile terminal can be reduced and the delay occurring in the processing carried out by the mobile communications system can be reduced. In contrast with this, in a case in which the same number of candidates are determined, the number of mobile terminals which are allocated to a certain sub-frame can be increased.

On the other hand, by carrying out the series of processes, such as a cell-specific scrambling process, by handling, as a single unit, all the CCEs divided into the CCE groups respectively corresponding to the UE groups, and then mapping them onto a physical resource, as mentioned above, interference between cells can be prevented and a frequency diversity gain can be acquired even though each mobile terminal is belonging to any of the UE groups. In addition, even if the CCE group via which a desired control signal is transmitted changes every sub-frame, each mobile terminal can carry out up to a deinterleaving process of deriving the CCEs from the physical resource and so on according to the same procedure. Therefore, because the demodulating process can be simplified, there can be provided an advantage of reducing the processing time and the circuit scale, and achieving low power consumption. Furthermore, even when the CCEs are mapped onto two OFDM symbols or the CCEs are mapped onto three OFDM symbols, the same advantages can be provided.

Figure 19:
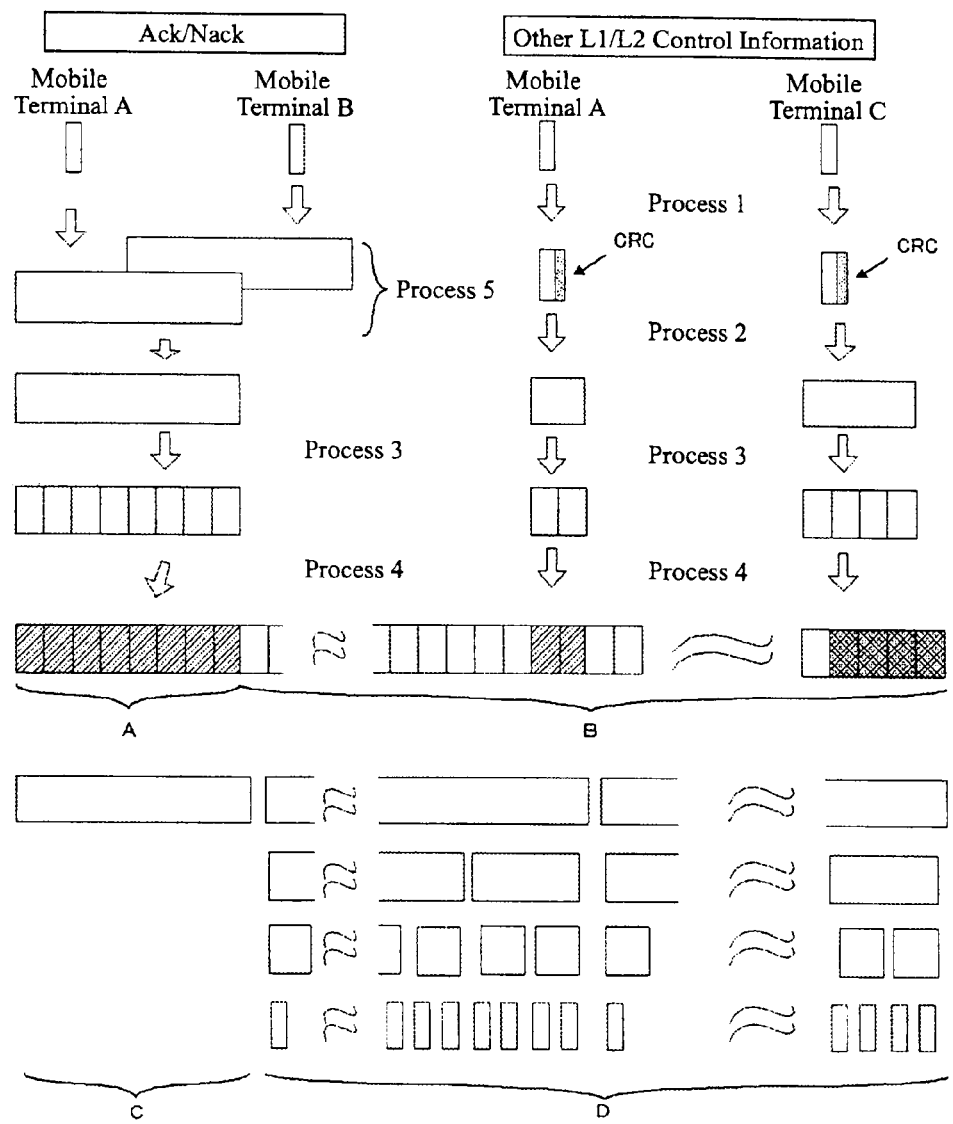
FIG. 19 is an explanatory drawing explaining a method of multiplexing Ack/Nacks among UEs by using CDM, and allocating Ack/Nacks to one CCE group.

Hereafter, a second variant of this embodiment will be explained. In the above-mentioned explanation, it is assumed that the information allocated to the CCEs is L1/L2 control information which does not include Ack/Nack. Therefore, each mobile terminal needs to handle Ack/Nack and other L1/L2 control information by using different methods from a stage of physical mapping, and there is therefore a problem that the processing done by each mobile terminal becomes complicated. Hereafter, a method of handling Ack/Nack, among pieces of L1/L2 control information, as one information type, multiplexing Ack/Nacks among UEs by using CDM, dividing CCEs into one or more CCE groups, and carrying out a blind detection of only one or more candidates included in the candidate set corresponding to a corresponding group in which control information which each mobile terminal desires to detect is included will be explained. FIG. 19 is an explanatory drawing explaining a method of multiplexing Ack/Nacks among UEs by using CDM, and allocating the Ack/Nacks to one CCE group. The base station processes L1/L2 control information by making a distinction between Ack/Nack and other L1/L2 control information. As shown in FIG. 19, when Ack/Nack is transmitted to each of mobile terminals A and B, Ack/Nacks are multiplexed among the mobile terminals by using CDM (process 5 shown in FIG. 19). In this case, the spread code length for carrying out CDM-multiplexing between the mobile terminals is predetermined by taking into consideration the number of desired mobile terminals to each of which Ack/Nack needs to be transmitted within one sub-frame in the system. The number of CCEs to be allocated can be uniquely determined in advance in consideration of both the spread code length and the number of repetitions (Repetitions) to be performed for a mobile terminal having bad reception quality. The base station divides the information on which the base station has performed multiplexing between the mobile terminals by using CDM into CCE parts each corresponding to a CCE (process 3 shown in FIG. 19).

On the other hand, other L1/L2 control signals are subjected to addition of a CRC (process 1 shown in FIG. 19) and processes, such as encoding, rate matching, and MCS execution, (process 2 shown in FIG. 19), for every mobile terminal, and are divided into parts each corresponding to a CCE (process 3 shown in FIG. 19), as described in Embodiment 2. The CCEs within the system bandwidth are divided into a CCE group corresponding to Ack/Nack and a CCE group corresponding to other L1/L2 control information. The base station allocates Ack/Nacks which are CDM-multiplexed among mobile terminals to the CCE group corresponding to Ack/Nacks (A shown in FIG. 19) (process 4 shown in FIG. 19), and allocates the other L1/L2 control signals to the CCE group corresponding to other L1/L2 control information (B shown in FIG. 19) (process 4 shown in FIG. 19). C in FIG. 19 shows a combination of CCEs which are candidates to be demodulated corresponding to Ack/Nack, and D in FIG. 19 shows combinations of CCEs which are candidates to be demodulated corresponding to other L1/L2 control information.

In addition, the candidates of combinations of CCEs on which each of the mobile terminals has to perform a blind detection can be predetermined from among the CCE group thereof. As a result, each mobile terminal to which Ack/Nack is transmitted has only to perform a blind detection on, instead of the candidates which are determined from the combinations of CCEs included in the whole system bandwidth, the candidates included in the CCE group corresponding to Ack/Nack. In the second variant, because the number of CCEs to be allocated are uniquely determined in advance, only one candidate is included in the CCE group. Furthermore, also regarding other L1/L2 control information, each mobile terminal has only to perform a blind detection on, instead of the candidates which are determined from the combination of CCEs included in the whole system bandwidth, the candidates included in the CCE group corresponding to other L1/L2 control information.

The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

In addition, there is a case in which each mobile terminal can know which type of information has not been sent thereto. For example, when a mobile terminal is not transmitting uplink data, Ack/Nack is not transmitted to the mobile terminal from the base station. Like in the case of this variant 2, by using the method of allocating Ack/Nacks to CCEs, grouping the CCEs, and providing a candidate set for each CCE group, a terminal which is not transmitting any uplink data has only to carry out a blind detection of the candidates included in the CCE group corresponding to other L1/L2 control information while a mobile terminal which is transmitting uplink data has only to carry out a blind detection of the candidates included in the CCE group corresponding to Ack/Nack and the candidates included in the CCE group corresponding to other L1/L2 control information.

Figure 20:
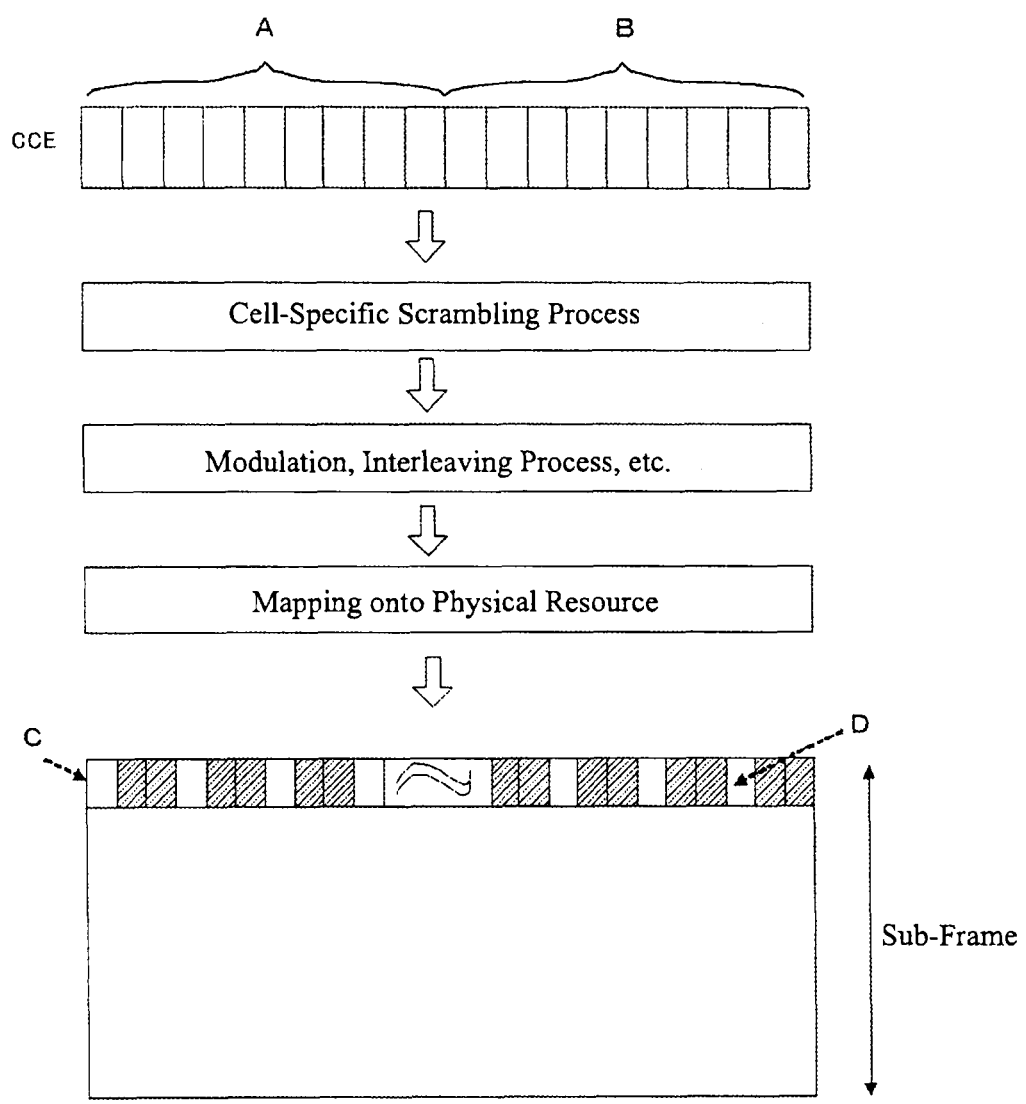
FIG. 20 is an explanatory drawing showing an example of a mapping method of mapping each CCE group onto a physical resource.

Next, a method of mapping CCEs onto a physical resource will be explained. FIG. 20 is an explanatory drawing showing an example of the mapping method of mapping each CCE group onto a physical resource. All the CCEs within the system bandwidth are divided into a CCE group corresponding to Ack/Nack (A shown in FIG. 20), and a CCE group corresponding to other L1/L2 control information (B shown in FIG. 20), as shown in FIG. 20, and a cell-specific scrambling process, modulation, an interleaving process, etc. are performed on all the CCEs with these CCEs being handled as a single unit, and mapping of the CCEs onto a physical resource on the frequency and time axes is carried out. The figure shows a case of mapping each CCE group onto one OFDM symbol (C shown in FIG. 20). In the case of mapping each CCE group onto the physical resource, the CCEs are mapped onto a region except regions in each of which information about a reference symbol (D shown in FIG. 20) or Cat0 is mapped. Also in the case of mapping each CCE group onto two OFDM symbols or three OFDM symbols, because the number of all the CCEs is determined according to the number of OFDM symbols, all the CCEs corresponding to the number of OFDM symbols are mapped onto a physical resource on the frequency and time axes, which is included in the predetermined OFDM symbols.

Figure 21:
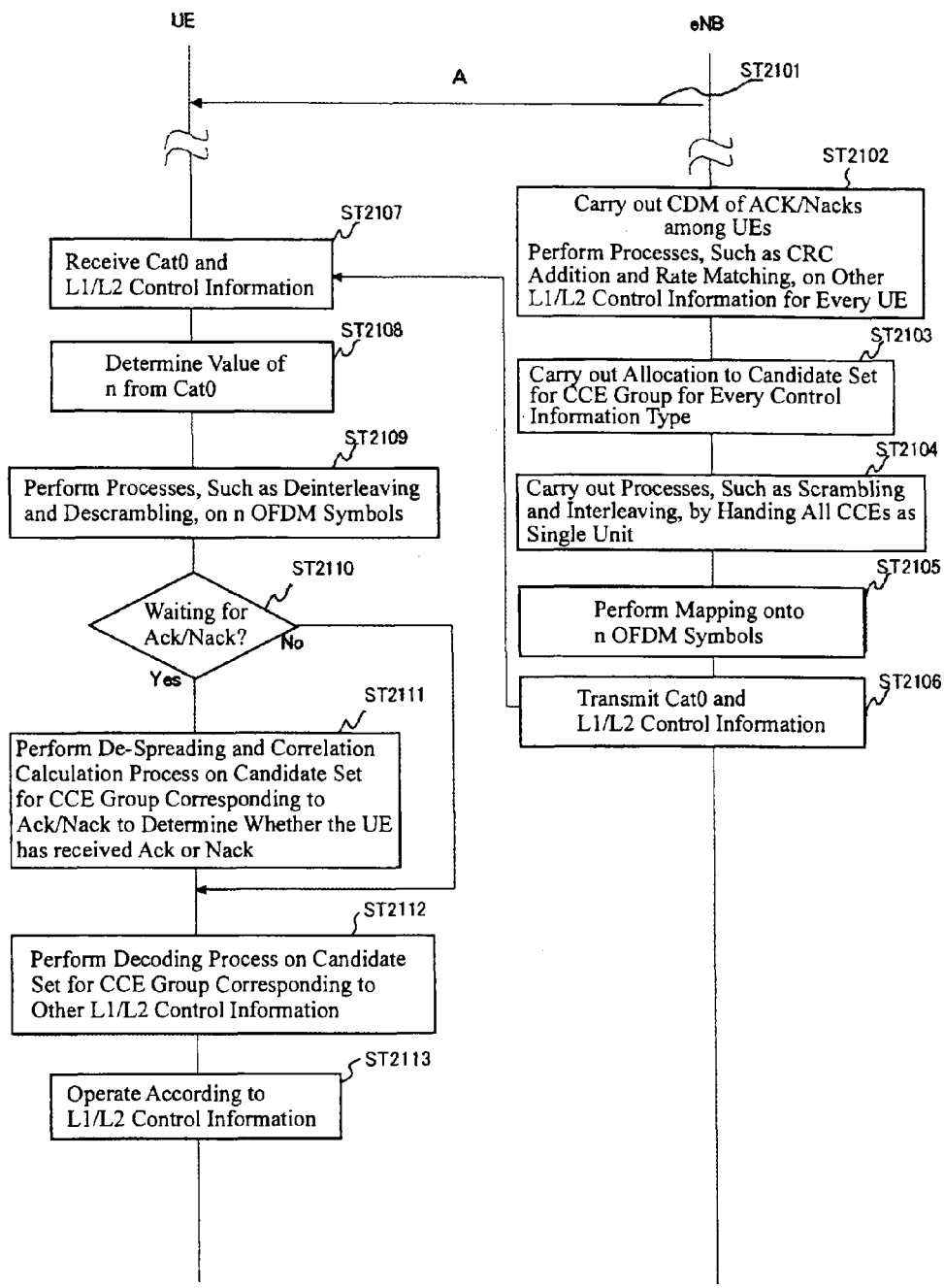
FIG. 21 is a flow chart showing a process of transmitting L1/L2 control information from a base station to a mobile terminal, and a process of determining a candidate set including L1/L2 control information which is carried out by the mobile terminal.

FIG. 21 is a flow chart showing a process of transmitting L1/L2 control information from the base station to each mobile terminal, and a process of determining a candidate set including L1/L2 control information which is carried out by each mobile terminal. Because the processes of ST2103 to ST2109 and ST2113, among the series of processes shown in FIG. 21, are the same as the processes of ST1803 to ST1809 and ST1813 shown in FIG. 18 respectively, the explanation of them will be omitted, and ST2101, ST2102, and ST2110 to ST2112 will be explained. In ST1801 of FIG. 18, the base station notifies both the "number and region of CCEs included in the CCE group according to the number of OFDM symbols", and the "information about the candidate set of each CCE group according to the number of OFDM symbols" to each mobile terminal. In ST2101 of FIG. 21, as shown in a reference character A, the base station is configured in such a way as to newly notify a "spread code" to each mobile terminal. First, the base station processes control information which the base station needs to transmit to each mobile terminal for every control information type. In this variant, the base station performs CDM-multiplexing among mobile terminals on the Ack/Nacks. As to other L1/L2 control information, the base station carries out processes, such as addition of a CRC and rate matching, for every UE (ST2902). Each mobile terminal judges whether or not the mobile terminal is placed in a state which it is waiting for reception of Ack/Nack transmitted from the base station after transmitting uplink data to the base station (ST2110). When each mobile terminal is placed in the state in which it is waiting for reception of Ack/Nack transmitted from the base station, the mobile terminal performs de-spreading and a correlation calculation process on the CCE candidates included in the candidate set in the CCE group corresponding to Ack/Nack, the candidate set being notified thereto in advance in ST2101, and determines whether the mobile terminal has received Ack or Nack (ST2111). In contrast, when each mobile terminal does not transmit any uplink data and is not waiting for reception of Ack/Nack transmitted from the base station, the mobile terminal skips a demodulating process corresponding to Ack/Nack and performs a decoding process on the candidate set in the CCE group corresponding to other L1/L2 control information, the candidate set being notified thereto in advance in ST2101 (ST2112).

As mentioned above, the base station handles also Ack/Nack, which is included in L1/L2 control information, as one information type, and CDM-multiplexes Ack/Nacks among UEs and then divides CCEs into one or more CCE groups. Therefore, because the CDM-multiplexing method is used as the method of multiplexing Ack/Nacks among mobile terminals, there is provided an advantage of reducing the number of candidates on which each UE performs a blind detection (for example, in the case of this variant, the number of candidates is 1). In addition, because the use of the CDM-multiplexing method can reduce the number of CCEs which are dedicated for Ack/Nacks, the number of CCEs allocated to other L1/L2 control information can be increased. Furthermore, because the base station CDM-multiplexes Ack/Nacks and encodes them by using a coding method different from that used for other L1/L2 control signals, the base station can carry out scheduling for each of MCS, a coding rate, and so on independently even in a case in which the reception quality required for other L1/L2 control information differs from the reception quality required for Ack/Nack, so that the base station enables each mobile terminal to meet the reception qualities. In addition, the base station also handles Ack/Nacks as one information type and allocates the Ack/Nacks to CCEs, like in the case of other L1/L2 control information, and carries out physical mapping of the CCEs. As a result, because the base station can process both Ack/Nack and other L1/L2 control information in the stages from the allocation to CCEs to the physical mapping by using the same method, simplification of the processing circuit and reduction of amount of processing can be achieved. Furthermore, because each mobile terminal can carries out the processes of deinterleaving and so on including up to the process of deriving the CCEs from the physical resource for both Ack/Nack and other L1/L2 control information by using the same method, too, the processing carried out by each mobile terminal can be simplified. The amount of processing carried out by each mobile terminal can be thus reduced. Therefore, low power consumption of each mobile terminal can be achieved, and reduction of the processing time and reduction of the circuit scale can be achieved. In addition, even if the CCE group via which a desired control signal is transmitted changes every sub-frame, each mobile terminal can carry out up to a deinterleaving process of deriving the CCEs from the physical resource and so on according to the same procedure. Therefore, because the demodulating process can be simplified, there can be provided an advantage of reducing the processing time and the circuit scale, and achieving low power consumption. Furthermore, in this variant, by carrying out the series of processes, such as a cell-specific scrambling process, by handling, as a single unit, all the CCEs divided into the CCE groups, and then mapping them onto a physical resource, interference between cells can be prevented and a frequency diversity gain can be acquired even though all the CCEs are divided into the CCE groups. In addition, even when the CCEs are mapped onto two OFDM symbols or three OFDM symbols, the same advantages can be provided.

In the second variant, Ack/Nacks are CDM-multiplexed among UEs, and CCEs are divided into one CCE group. In a case in which the spread codes are insufficient for a desired number of mobile terminals to which Ack/Nacks need to be transmitted within one sub-frame in the system, the mobile terminals to which Ack/Nacks need to be transmitted can be divided into a plurality of groups, the CDM-multiplexing method can be used as the multiplexing method of multiplexing Ack/Nacks among the mobile terminals for every divided group, and Ack/Nacks destined for mobile terminals in each group can be allocated to the CCEs included in the CCE group corresponding to the group. The combinations of CCEs which are the candidates to be demodulated can also be determined in advance from each CCE group. As a result, because the same code can be used by each group, the variant is effective for the case in which the spread codes are insufficient for the desired number of mobile terminals. Furthermore, because all the CCEs are mapped onto a physical resource with all the CCEs being handled as a single unit, interference between cells can be prevented and a frequency diversity gain can be acquired even though all the CCEs are divided into the CCE groups. In addition, because each mobile terminal receives a notification of the group to which each mobile terminal is belonging in advance from the base station, or the group to which each mobile terminal is belonging is predefined, each mobile terminal performs processes, such as de-spreading, on only the group corresponding to Ack/Nack for each mobile terminal itself, and therefore the amount of processing carried out by each mobile terminal can be reduced.

Hereafter, a third variant of this embodiment will be explained. In the above-mentioned second variant, because Ack/Nack, which is included in L1/L2 control information, is also handled as one information type, and Ack/Nacks are multiplexed among mobile terminals by using CDM and the spread code length used for the CDM-multiplexing is predetermined from the number of repetitions to be performed for a mobile terminal having bad reception quality, and so on, Ack/Nack destined for a mobile terminal having good reception quality is also allocated to CCEs included in the same region. In the third variant, a method of using radio resources more efficiently will be disclosed. Mobile terminals are grouped by reception quality information which each of the mobile terminals transmits to the base station, MCS is varied according to each group's quality, and the number of CCEs to be allocated is varied according to the variation. Furthermore, only one combination candidate of CCEs on which each mobile terminal performs a blind detection can be determined from each CCE group.

Figure 22:
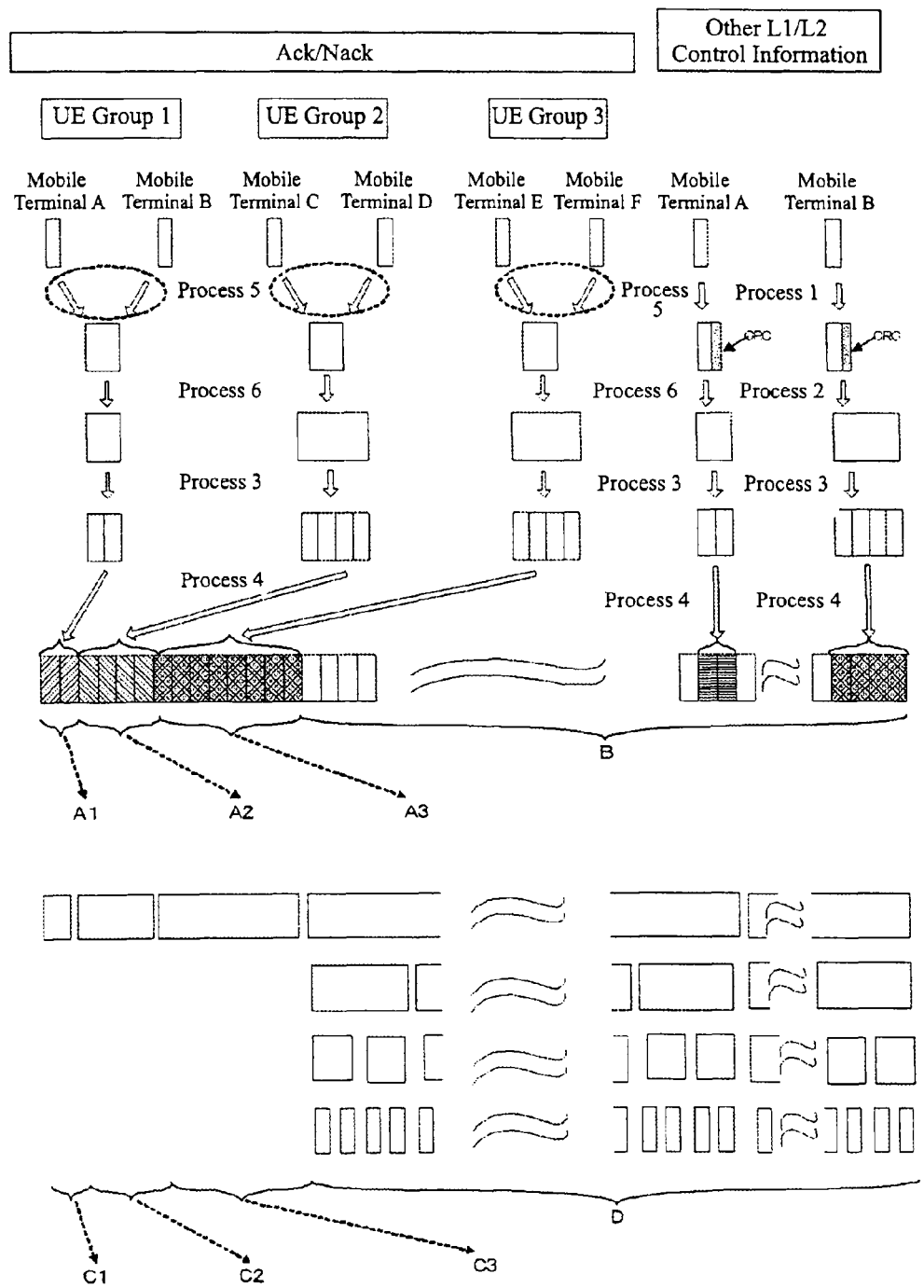
FIG. 22 is an explanatory drawing showing a method of grouping mobile terminals by reception quality information, and allocating information to each CCE group.

FIG. 22 is an explanatory drawing showing a method of grouping mobile terminals by reception quality information, and allocating information to each CCE group. The base station processes L1/L2 control information by making a distinction between Ack/Nack and other L1/L2 control information. A process on Ack/Nack will be explained. Mobile terminals are grouped by quality information which each of the mobile terminals transmits to the base station. In the figure, a case in which mobile terminals are divided into a mobile terminal group 1 having high reception quality (UE group 1 shown in FIG. 22), a mobile terminal group 2 having medium reception quality (UE group 2 shown in FIG. 22), and a mobile terminal group 3 having low reception quality (UE group 3 shown in FIG. 22).

Because the mobile terminal group 1 has high reception quality, after carrying out multiplexing of UEs by using CDM (process 5 shown in FIG. 22), the base station carries out repetition by setting the number of repetitions to, for example, 1 (process 6 shown in FIG. 22). The amount of repeated information in this case is equivalent to, for example, two CCEs. The repeated information is divided into parts each corresponding to a CCE (process 3 shown in FIG. 22), and is allocated to a CCE group (A1 shown in FIG. 22) corresponding to the UE group 1 corresponding to Ack/Nack (process 4 shown in FIG. 22). Because the mobile terminal group 2 has medium reception quality, after carrying out multiplexing of UEs by using CDM (process 5 shown in FIG. 22), the base station carries out repetition by setting the number of repetitions to, for example, 2 (process 6 shown in FIG. 22). Therefore, the amount of repeated information is equivalent to four CCEs. The repeated information is then divided into parts each corresponding to a CCE (process 3 shown in FIG. 22), and is allocated to a CCE group (A2 shown in FIG. 22) corresponding to the UE group 2 corresponding to Ack/Nack (process 4 shown in FIG. 22). Because the mobile terminal group 3 has low reception quality, after carrying out multiplexing of UEs by using CDM (process 5 shown in FIG. 22), the base station carries out repetition by setting the number of repetitions to, for example, 4 (process 6 shown in FIG. 22). Therefore, the amount of repeated information is then equivalent to eight CCEs. The repeated information is then divided into parts each corresponding to a CCE (process 3 shown in FIG. 22), and is allocated to a CCE group (A3 shown in FIG. 22) corresponding to the UE group 3 corresponding to Ack/Nack (process 4 shown in FIG. 22). Because, by predetermining the MCS method (in this case, the number of repetitions) for every UE group according to the reception quality information, the number of CCEs to be allocated for every UE group is predetermined as a result, only one combination of CCEs on which each mobile terminal has to perform a blind detection can be provided for every group.

On the other hand, other L1/L2 control signals are subjected to addition of a CRC (process 1 shown in FIG. 22) and processes, such as encoding, rate matching, and MCS execution, (process 2 shown in FIG. 22) for every mobile terminal, and are divided into parts each corresponding to a CCE (process 3 shown in FIG. 22), as described in variant 2. The other L1/L2 control signals are then allocated to the CCE group corresponding to other L1/L2 control information (B shown in FIG. 22) (process 4 shown in FIG. 22). Each mobile terminal sequentially demodulates the candidates on which the mobile terminal will perform a blind detection and which are included in the CCE group corresponding to other L1/L2 control information. C1 in FIG. 22 shows a combination of CCEs which are the candidates to be demodulated corresponding to the UE group 1 corresponding to Ack/Nack, C2 in FIG. 22 shows a combination of CCEs which are the candidates to be demodulated corresponding to the UE group 2 corresponding to Ack/Nack, C3 in FIG. 22 shows a combination of CCEs which are the candidates to be demodulated corresponding to the UE group 3 corresponding to Ack/Nack, and D in FIG. 22 shows combinations of CCE CCEs which are the candidates to be demodulated corresponding to other L1/L2 control information.

Concretely, the method of grouping mobile terminals by reception quality information can include the step of using, for example, a CQI value notified from each mobile terminal to the base station and providing a threshold for this CQI value in advance so as to carryout the grouping. As a result, each mobile terminal which has reported the CQI value and the base station to which the CQI value has been reported can recognize to which group each mobile terminal is belonging. The threshold disposed for this CQI value can be clearly notified to each mobile terminal from the base station (for example, the base station notifies the threshold disposed for this CQI value to each mobile terminal in advance by using an L3 message, the BCCH, or the like), or can be predefined. Furthermore, information about each CCE group's candidate set can be clearly notified from the base station to each mobile terminal (for example, the information is notified to each mobile terminal in advance by using a BCCH, an L3 message, or the like), or can be predefined.

As mentioned above, mobile terminals are grouped by reception quality information which each of the mobile terminals transmits to the base station, the number of repetitions is varied according to each group's quality, and the number of CCEs to be allocated is varied according to the variation. Furthermore, only one combination candidate of CCEs on which each mobile terminal performs a blind detection is determined from each CCE group. Therefore, the waste of radio resources resulting from allocation of a large region of CCEs to a mobile terminal having good reception quality can be eliminated, and an efficient use of radio resources can be achieved. Furthermore, because the number of candidates on which each mobile terminal performs a blind detection can be reduced to one, the amount of processing load required for the demodulation by each mobile terminal can be reduced, low power consumption of each mobile terminal can be achieved, and the delay occurring in the processing carried out by each mobile terminal can be reduced.

In variant 3, mobile terminals are grouped by reception quality information which each of the mobile terminals informs to the base station, MCS is varied according to each group's quality, and the number of CCEs to be allocated is varied according to the variation. Furthermore, only one combination candidate of CCEs on which each mobile terminal performs a blind detection is determined from each CCE group. As an alternative, mobile terminals can be grouped by, instead of the reception quality information, for example, the path loss of the cell in which each mobile terminal is existing, the difference in path loss between the cell and an adjacent cell, the traveling speed of each mobile terminal, the service type (e.g. VoIP) of data, or the like which each mobile terminal reports to the base station. The grouping of mobile terminals on the basis of any of these pieces of information provides an advantage of being able to maintain the reception quality required for reception of Ack/Nack even if each mobile terminal is placed in any state, and to achieve an effective use of radio resources in the system.

As mentioned above, in this embodiment, UL-related L1/L2 control information, DL-related L1/L2 control information, MIMO-related information, and Ack/Nack are shown as examples of the information types of L1/L2 control information. In addition, paging information (PI) can be provided. By carrying paging information (PI) on the L1/L2 control channel to handle the paging information as one information type, and then applying this embodiment, a mobile terminal which is placed in an idle state and is receiving paging at certain intervals is enabled to demodulate only the paging information and skip the process of demodulating any other L1/L2 control information. Therefore, the amount of processing load required for the demodulation by each mobile terminal can be reduced, low power consumption of each mobile terminal can be achieved, and the delay occurring in the processing carried out by each mobile terminal can be reduced. Furthermore, as mentioned above, this embodiment discloses the grouping of CCEs by information type and/or by mobile terminal, though the grouping of CCEs can be alternatively carried out for each of OFDM symbols onto which CCEs are physically mapped. As a result, there is provided an advantage of being able to map CCEs onto a desired OFDM symbol according to the error rate of L1/L2 control information received by each mobile terminal, the requirements on the processing time, etc.

Embodiment 3

The second variant of Embodiment 2 discloses the method of handing Ack/Nack included in L1/L2 control information as one information type, multiplexing Ack/Nacks among UEs by using CDM, dividing CCEs into one or more CCE groups, and causing each mobile terminal to carry out a blind detection of only one or more candidates in the candidate set corresponding to a corresponding group in which control information which the mobile terminal desires to detect is included. The second variant also discloses that the method can include the steps of, when the spread codes are insufficient for the desired number of mobile terminals to which Ack/Nacks need to be transmitted within one sub-frame in the system, dividing the mobile terminals to which Ack/Nacks need to be transmitted into a plurality of groups, using the CDM method as the multiplexing method of multiplexing Ack/Nacks among the mobile terminals for every divided group, and allocating Ack/Nack destined for mobile terminals in each group to the CCEs included in the CCE group corresponding to the group. However, because Ack/Nacks are multiplexed by using CDM and are encoded by using an encoding method different from that used for other L1/L2 control signals, each mobile terminal cannot demodulate Ack/Nack and other L1/L2 control information by using the same demodulating method. Therefore, Ack/Nack and other L1/L2 control information cannot be allocated to the same CCE group. Therefore, in variant 2, Ack/Nack and other L1/L2 control information are allocated different CCE groups respectively, a candidate set is disposed for every CCE group, and each mobile terminal is enabled to demodulate the CCEs included in each group's candidate set by using a different method. On the other hand, the number and region of CCEs included in each CCE group and the candidate set corresponding to each CCE group are predefined, or are notified to each mobile terminal from the base station.

However, there is a case in which the number of mobile terminals which are transmitting uplink data varies on the time axis, that is, the number of mobile terminals which are transmitting uplink data varies dynamically every sub-frame. As the number of mobile terminals which are transmitting uplink data varies, the amount of information of Ack/Nacks which the base station needs to transmit to all the mobile terminals being served thereby within one sub-frame increases or decreases every sub-frame. In variant 2, the number and region of CCE groups which are used for Ack/Nack are preset to be large values according to the system capacity etc. so that the system can respond an increase of the amount of information of Ack/Nacks. For example, FIG. 23 is an explanatory drawing showing an example of allocation of Ack/Nacks. As shown in FIG. 23, even in both a case of FIG. 23(a) in which there are a small number of Ack/Nacks and a case of FIG. 23(b) in which there are a large number of Ack/Nacks, the number and region of CCE groups which are used for Ack/Nack are determined so that the CCEs included in up to the CCE groups 1 and 2 (A1 and A2 shown in FIG. 23) corresponding to Ack/Nack can be allocated to Ack/Nacks. As a result, the system can respond an increase of the amount of information of Ack/Nacks. However, in the case in which the system is thus configured, when the amount of information of Ack/Nacks decreases, CCEs to which no Ack/Nack information is allocated appears in a CCE group which is preset for allocation of Ack/Nacks, and therefore the use efficiency of radio resources degrades. B in FIG. 23 shows a CCE group corresponding to other L1/L2 control information, and a hatched portion shows a region where Ack/Nacks multiplexed among UEs by using CDM are allocated.

Figure 24:
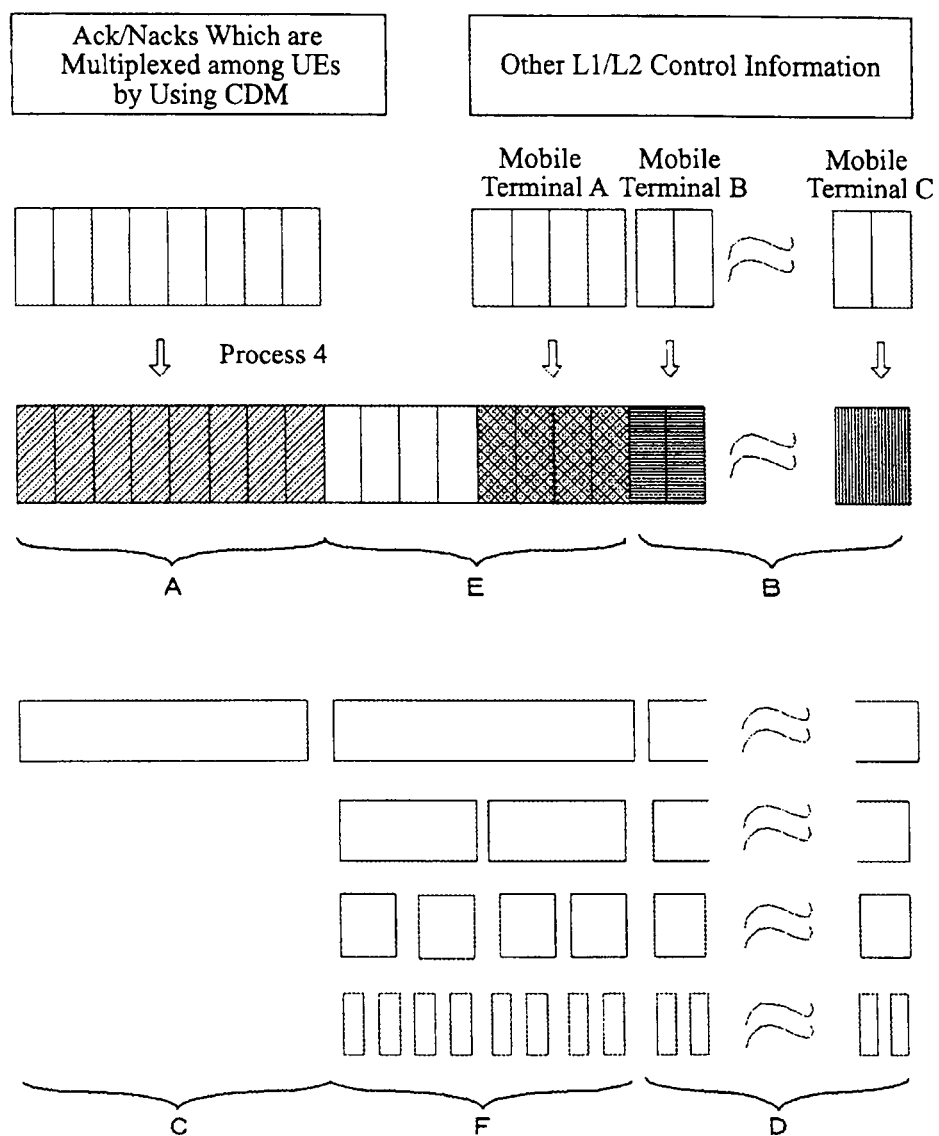
FIG. 24 is an explanatory drawing showing an example of a method of disposing a common CCE group in accordance with Embodiment 3.

In this embodiment, there is provided a method of, in order to suppress the reduction in the use efficiency of radio resources due to variations in the amount of information of Ack/Nacks, providing CCE groups (A1 and A2 shown in FIG. 23) to which Ack/Nacks are allocated, a CCE group (B shown in FIG. 23) to which other L1/L2 control information is allocated, and a common CCE group (E shown in FIG. 24) to which either Ack/Nacks or other L1/L2 control information is allocated. FIG. 24 is an explanatory drawing showing an example of the method of disposing the common CCE group (E shown in FIG. 24) in accordance with Embodiment 3. FIG. 24 shows a case in which there are a small number of Ack/Nacks. As shown in the figure, all the CCEs are divided into the CCE group (A shown in FIG. 24) corresponding to Ack/Nack, the CCE group corresponding to L1/L2 control information (B shown in FIG. 24), and the common CCE groups (E shown in FIG. 24). Either Ack/Nack information or other L1/L2 control information can be allocated to the common CCE group (E shown in FIG. 24). In the case in which there are a small number of Ack/Nacks, the common CCE group serves as a CCE group to which other L1/L2 control information is allocated, as shown in the figure. A process 4 of FIG. 24 shows a process of allocating Ack/Nacks to CCEs. Furthermore, C in FIG. 24 shows a combination of CCEs which are the candidates to be demodulated corresponding to Ack/Nack, D in FIG. 24 shows combinations of CCEs which are the candidates to be demodulated corresponding to other L1/L2 control information, and F in FIG. 24 shows combinations of CCEs which are the candidates to be demodulated corresponding to the common CCE group.

Figure 25:
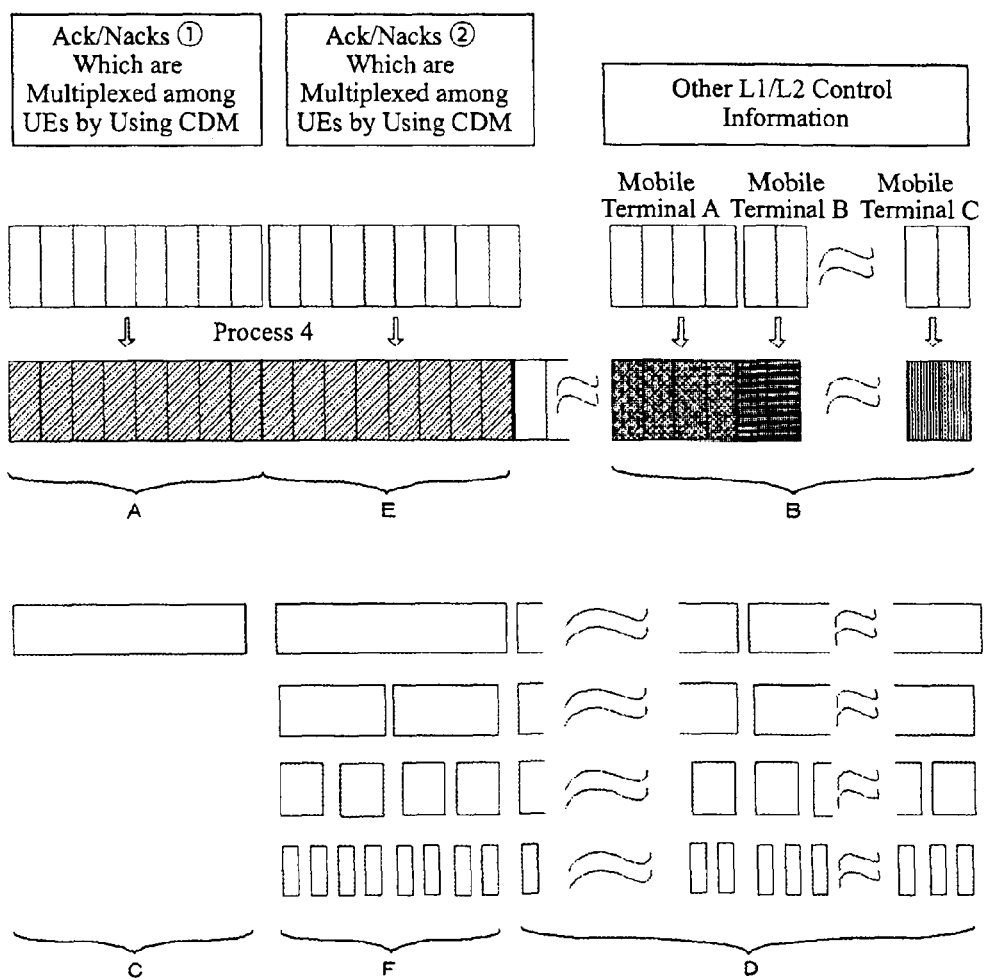
FIG. 25 is an explanatory drawing showing an example of the method of disposing a common CCE group in accordance with Embodiment 3.

FIG. 25 is an explanatory drawing showing an example of the method of disposing the common CCE group (E shown in FIG. 24) in accordance with Embodiment 3. FIG. 25 shows a case in which there are a large number of Ack/Nacks. As shown in the figure, all the CCEs are divided into a CCE group (A shown in FIG. 25) corresponding to Ack/Nack, a CCE group corresponding to other L1/L2 control information (B shown in FIG. 25), and a common CCE group (E shown in FIG. 25), like in the case of FIG. 24. That is, the dividing method is fixed to the above-mentioned one for variations of the number of Ack/Nacks for every sub-frame. However, in the case of FIG. 25, Ack/Nack information is allocated to the common CCE group (E shown in FIG. 25), unlike in the case of FIG. 24. Furthermore, according to the change in the amount of information of Ack/Nacks, the number of all CCEs to which L1/L2 control information is allocated can be increased or decreased as shown in the figure. In a case in which the number of all CCEs to which L1/L2 control information is allocated is increased, the system can respond the increase by increasing the number of OFDM symbols onto which the CCEs are physically mapped. In FIG. 25, because the same reference numerals as those shown in FIG. 24 denote the same components or like components, the explanation of these components will be omitted hereafter.

Next, candidates of combinations of CCEs on which each mobile terminal has to perform a blind detection will be explained. The candidates are determined in advance from among the combinations of CCEs included in each CCE group as shown in FIG. 24. Because Ack/Nacks are CDM-multiplexed among UEs, the candidate set (C shown in FIGS. 24 and 25) of the CCE group corresponding to Ack/Nack can be made to have a small number of candidates. For example, the number of candidates can be reduced to one. Because other L1/L2 control signals can be allocated to the common CCE group, the number of candidates included in the common CCE group's candidate set (F shown in FIGS. 24 and 25) is made to be substantially the same as the number of candidates included in the candidate set of the CCE group corresponding to other L1/L2 control information. As a result, other L1/L2 control signals can be allocated also to the common CCE group, each mobile terminal can demodulate the CCE candidates included in the candidate set by carrying out a blind detection of the CCE candidates included in the candidate set.

The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

Next, a method of mapping CCEs onto a physical resource will be explained. All the CCEs included in the system bandwidth are divided into a CCE group corresponding to Ack/Nack, a CCE group corresponding to other L1/L2 control information, and a common CCE group, and a cell-specific scrambling process, modulation, an interleaving process, etc. are performed on all the CCEs with these CCEs being handled as a single unit, and mapping of the CCEs onto a physical resource on the frequency and time axes is carried out. In the case of mapping the CCEs onto a physical resource, the CCEs are mapped onto a region except region in each of which a reference symbol or information about Cat0 is mapped. Because the number of all the CCEs is determined according to the number of OFDM symbols, all the CCEs corresponding to the number of OFDM symbols are mapped onto a physical resource on the frequency and time axes, which is included in the predetermined OFDM symbol.

Figure 26:
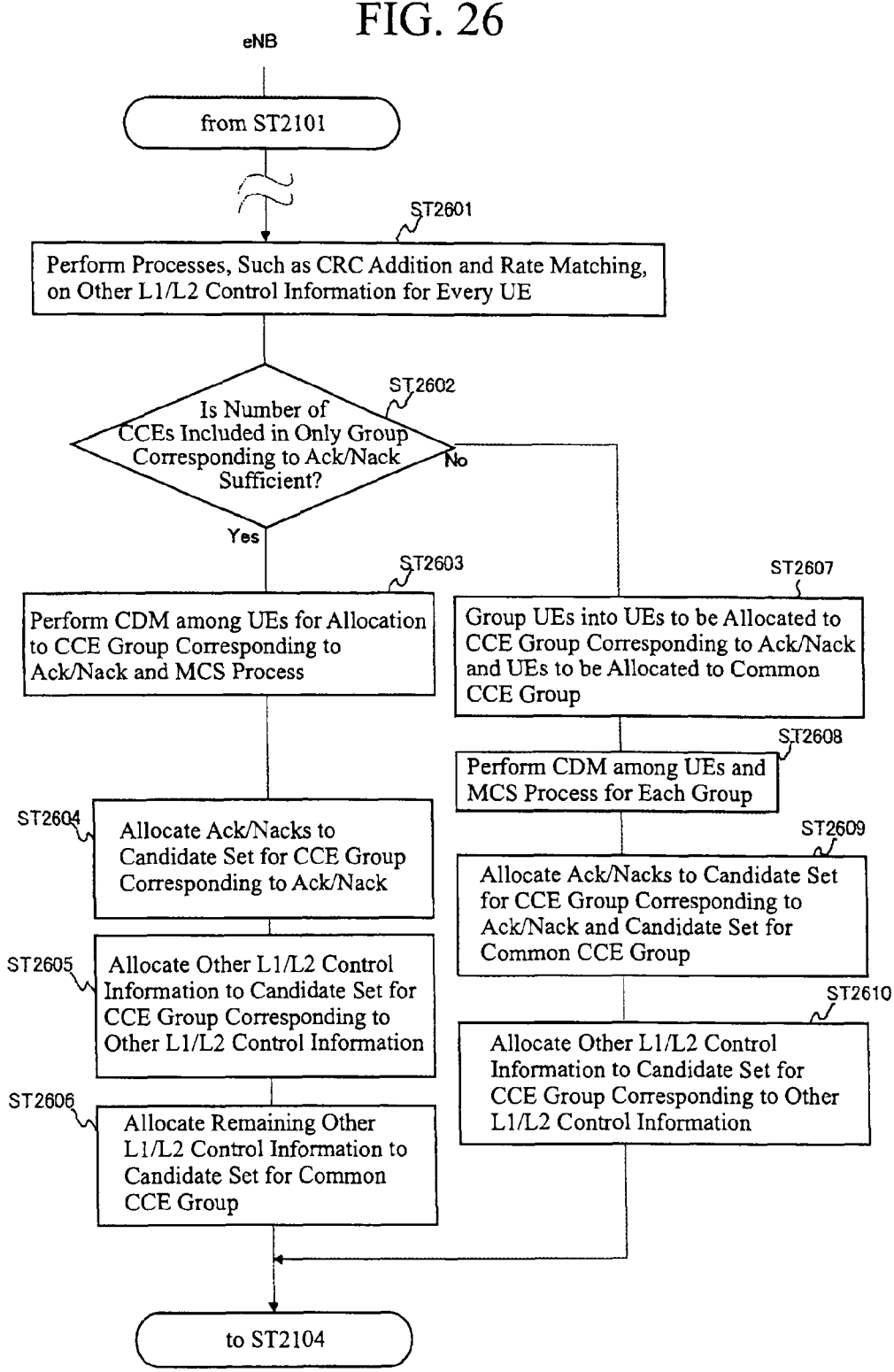
FIG. 26 is a flow chart showing the details of processing carried out by the base station shown in FIG. 21.
Figure 27:
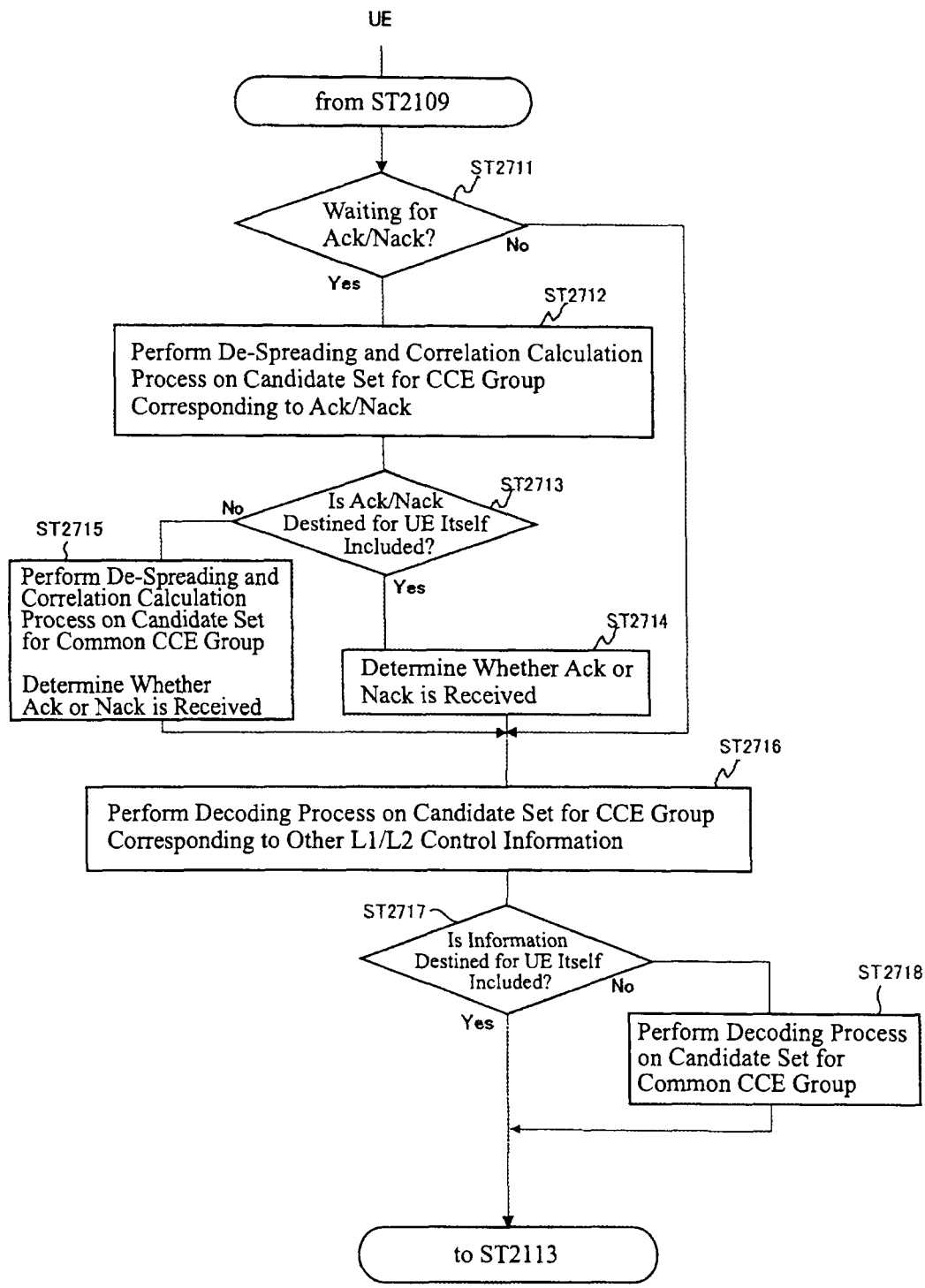
FIG. 27 is a flow chart showing the details of processing carried out by the mobile terminal shown in FIG. 21.

An example of the operation of the base station and that of each mobile terminal in accordance with the present invention will be explained. This embodiment can be implemented by changing a part of the sequence, as shown in FIG. 21, in the case in which the CCEs are grouped by the following two information types: Ack/Nack and other L1/L2 control information, as shown in FIG. 26. FIG. 26 is a flow chart showing the details of the processing carried out by the base station shown in FIG. 21. FIG. 27 is a flow chart showing the details of the processing carried out by each mobile terminal shown in FIG. 21. The base station carries out processes which are changed, as shown in FIG. 26, from the processes of ST2102 and ST2103 of FIG. 21. In FIG. 26, the base station processes control information which the base station needs to transmit to each mobile terminal for every control information type, first. The base station performs processes, such as addition of a CRC and rate matching, on other L1/L2 control information to be transmitted to each mobile terminal (ST2601). The base station then judges whether or not only the number of CCEs included in only the group corresponding to Ack/Nack is sufficient for the number of CCEs required for the base station to transmit Ack/Nacks with a certain sub-frame (ST2602). When only the number of CCEs included in only the group corresponding to Ack/Nack is sufficient for the number of CCEs required for the base station to transmit Ack/Nacks with a certain sub-frame, the base station performs CDM-multiplexing among UEs in order to allocate Ack/Nacks to the CCE group corresponding to Ack/Nack and carries out processes such as MCS (ST2603). Next, the base station allocates Ack/Nacks processed as mentioned above to the candidate set for the CCE group corresponding to Ack/Nack (ST2604). The base station then allocates the other L1/L2 control information to the candidate set of the CCE group corresponding to other L1/L2 control information (ST2605). When the base station cannot allocate all of the other L1/L2 control information to be transmitted to the CCE group corresponding to other L1/L2 control information, the base station allocates the remaining other L1/L2 control information to the candidate set for the common CCE group (ST2606). In contrast, when, in ST2602, determining that only the number of CCEs included in only the group corresponding to Ack/Nack is insufficient for the number of CCEs required for the base station to transmit Ack/Nacks with a certain sub-frame, the base station groups the mobile terminals into a CCE group corresponding to Ack/Nack allocation UE group and a common group allocation UE group (ST2607). The base station performs multiplexing among UEs by using CDM for each of the groups, and carries out processes such as MCS (ST2608). The base station then allocates Ack/Nacks to the candidate sets for the CCE group corresponding to Ack/Nack and the common CCE group (ST2609). Next, the base station allocates the other L1/L2 control information to the candidate set of the CCE group corresponding to other L1/L2 control information (ST2610). After that, the base station performs processes of ST2104 to ST2106 shown in FIG. 21.

Each mobile terminal performs a series of processes shown in FIG. 27 after performing the processes of ST2107 to ST2109 shown in FIG. 21. As shown in FIG. 27, each mobile terminal determines whether or not each mobile terminal is placed in a state in which it is waiting for reception of Ack/Nack transmitted from the base station after transmitting uplink data to the base station (ST2711). When each mobile terminal is placed in the state in which it is waiting for reception of Ack/Nack transmitted from the base station, the mobile terminal performs de-spreading and a correlation calculation process on the CCE candidates included in the candidate set in the CCE group corresponding to Ack/Nack, the candidate set being notified thereto in advance in ST2101 shown in FIG. 21 (ST2712). Next, each mobile terminal determines whether or not there is Ack/Nack destined for itself in the CCE candidates (ST2713). When there is Ack/Nack destined for the mobile terminal in the CCE candidates, it determines whether either Ack or Nack is included (ST2714). In contrast, when, the result of the determination of the presence or absence of Ack/Nack destined for the mobile terminal in ST2713 shows when there is no Ack/Nack destined for the mobile terminal, each mobile terminal performs de-spreading and a correlation calculation process on the CCE candidates included in the candidate set for the common CCE group, the candidate set being notified thereto in advance in ST2101 shown in FIG. 21, and then determines whether or not either Ack or Nack is included in the CCE candidates (ST2715). When each mobile terminal, in ST2711, is not placed in the state in which it is waiting for reception of Ack/Nack transmitted from the base station, the mobile terminal performs a decoding process on the CCE candidates included in the candidate set for the CCE group corresponding to other L1/L2 control information, the candidate set being notified thereto in advance in ST2101 in FIG. 21 (ST2716). Each mobile terminal determines the presence or absence of information destined for itself on the basis of the results of the decoding process, and, when the results show the presence of information destined for itself, advances to the process of ST2113 shown in FIG. 21. In contrast, when the results of the determination of ST2717 of the presence or absence of information destined for the mobile terminal show the absence of information destined for the local station, each mobile terminal performs a decoding process on the CCE candidates included in the candidate set for the common CCE group, the candidate set being notified thereto in advance in ST2101 shown in FIG. 21. After that, as shown in ST2113 of FIG. 21, each mobile terminal operates according to L1/L2 control information received thereby by using the above-mentioned method.

As mentioned above, in accordance with the present invention, there is provided a method of providing a CCE group to which Ack/Nacks are allocated, a CCE group to which other L1/L2 control information is allocated, and a common CCE group to which either Ack/Nacks or other L1/L2 control information is allocated. Therefore, in addition to the same advantages as those provided by variant 2 of Embodiment 2, the present embodiment offers another advantage of being able to eliminate the reduction in the use efficiency of radio resources without having to ensure useless CCEs to which Ack/Nacks are allocated even when the amount of information of Ack/Nacks dynamically changes every sub-frame. In addition, the priorities assigned to the groups to each of which Ack/Nacks can be allocated are determined in advance by each mobile terminal and the base station. More specifically, for example, Ack/Nacks are allocated to the CCE group corresponding to Ack/Nack first, and other L1/L2 control information is then allocated to the CCE group corresponding to other L1/L2 control information, as shown in FIGS. 26 and 27. In this case, if all of the Ack/Nacks cannot be allocated to the CCE group corresponding to Ack/Nack, and/or if all of the other L1/L2 control information cannot be allocated to the CCE group corresponding to other L1/L2 control information, the remaining Ack/Nacks and/or the remaining other L1/L2 control information is allocated to the common CCE group. By doing in this way, while waiting for Ack/Nack, each mobile terminal has only to carry out a de-spreading process, starting from a de-spreading process on the candidate set of the CCE group corresponding to Ack/Nack. When Ack/Nack is included in the group, each mobile terminal does not have to perform an inverse operation process on the candidate set of the common CCE group. Furthermore, as to other L1/L2 control information, each mobile terminal has only to carry out a blind detection, starting from a blind detection on the candidate set of the CCE group corresponding to L1/L2 control information. When other L1/L2 control information exists in the group, each mobile terminal does not have to perform a blind detection on the candidate set of the common CCE group. Therefore, the amount of processing load required for the demodulation by each mobile terminal can be reduced, low power consumption of each mobile terminal can be achieved, and the delay occurring in the processing carried out by each mobile terminal can be reduced.

In this embodiment, Ack/Nack and other L1/L2 control information are explained as an example, though the present invention can be applied to control information to which a different coding method is applied. In this variant, the same advantages are provided.

Embodiment 4

In Embodiment 3, because Ack/Nacks are CDM-multiplexed and are encoded by using a coding method different from that used for other L1/L2 control signals, each mobile terminal cannot demodulate Ack/Nack and other L1/L2 control information by using the same demodulating method, and there is a case in which the number of mobile terminals which are transmitting uplink data varies dynamically every sub-frame, and, as a result, the amount of information of Ack/Nacks which the base station transmits increases or decreases every sub-frame, as previously explained. In such a case, each mobile terminal has to know which coding method has been used to encode the CCEs to be demodulated and to which group the CCEs to be demodulated belongs for every sub-frame. Therefore, the second variant of Embodiment 2 discloses the method of, in order to support information which has been coded using a different coding method and which dynamically increases or decreases every sub-frame, presetting the number and region of CCE groups used for Ack/Nack to large values according to the system capacity and so on. Furthermore, in Embodiment 3, there is disclosed a method of providing a CCE group to which Ack/Nacks are allocated, a CCE group to which other L1/L2 control information is allocated, and a common CCE group to which either Ack/Nacks or other L1/L2 control information is allocated.

Figure 28:
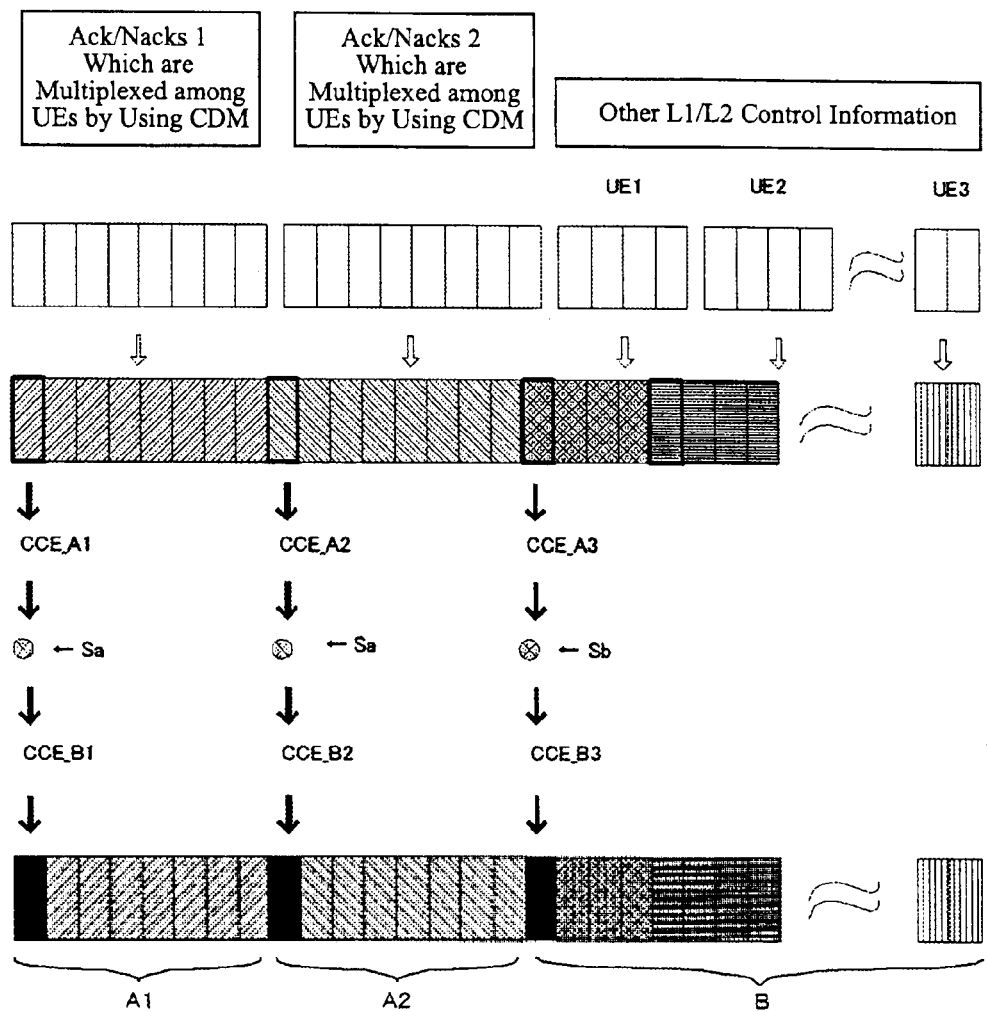
FIG. 28 is an explanatory drawing showing an example of a method of multiplying a CCE at the head of each group by an orthogonal scrambling code specific to each group in accordance with Embodiment 4.

In this embodiment, in order to eliminate the reduction in the use efficiency of radio resources due to variations of the amount of information of Ack/Nacks, there is disclosed a method of providing a CCE group corresponding to Ack/Nack and a CCE group corresponding to other L1/L2 control information, and multiplying a CCE at the head of each group by an orthogonal scrambling code specific to each group. FIG. 28 is an explanatory drawing showing an example of the method of multiplying a CCE at the head of each group by an orthogonal scrambling code specific to each group in accordance with Embodiment 4. As shown in the figure, all the CCEs are divided into a CCE group 1 (A1 shown in FIG. 28) corresponding to Ack/Nack, a group 2 (A2 shown in FIG. 28) corresponding to Ack/Nack, and a CCE group corresponding to other L1/L2 control information (B shown in FIG. 28). The number of CCE groups corresponding to Ack/Nack dynamically increases or decreases every sub-frame. The CCE at the head of each CCE group to which either other L1/L2 control information or Ack/Nack is allocated is multiplied by a scrambling code. CCE Data CCE_A1 and CCE_A2 at the heads of the CCE groups 1 and 2 corresponding to Ack/Nack are respectively multiplied by a scrambling code Sa, and become CCE_B1 and CCE_B2 respectively. They are then allocated again to the CCEs at the heads of the CCE groups, in which the original data are included respectively. In contrast, CCE_A3 at the head of the CCE group corresponding to other L1/L2 control information is multiplied by a scrambling code Sb, and becomes CCE_B3. CCE_B3 is then allocated again to the CCE at the head of the CCE group. Sa and Sb are made to be orthogonal to each other. Because the base station and mobile terminal are configured as mentioned above, each mobile terminal can discriminate between the CCE group corresponding to Ack/Nack and that corresponding to other L1/L2 control signals when receiving an L1/L2 control signal.

The scrambling code specific to each CCE group and information about each CCE group's candidate set can be clearly notified from the base station to each mobile terminal (for example, the information is notified to each mobile terminal in advance by using a BCCH, an L3 message, or the like), or can be predefined.

Next, a method of mapping CCEs onto a physical resource will be explained. All the CCEs included in the system bandwidth are divided into a CCE group corresponding to Ack/Nack, a CCE group corresponding to other L1/L2 control information, and a common CCE group, and a cell-specific scrambling process, modulation, an interleaving process, etc. are performed on all the CCEs with these CCEs being handled as a single unit, and mapping of the CCEs onto a physical resource on the frequency and time axes is carried out. In the case of mapping the CCEs onto a physical resource, the CCEs are mapped onto a region except regions in each of which a reference symbol or information about Cat0 is mapped. Because the number of all the CCEs is determined according to the number of OFDM symbols, all the CCEs corresponding to the number of OFDM symbols are mapped onto a physical resource on the frequency and time axes, which is included in the predetermined OFDM symbol.

Figure 29:
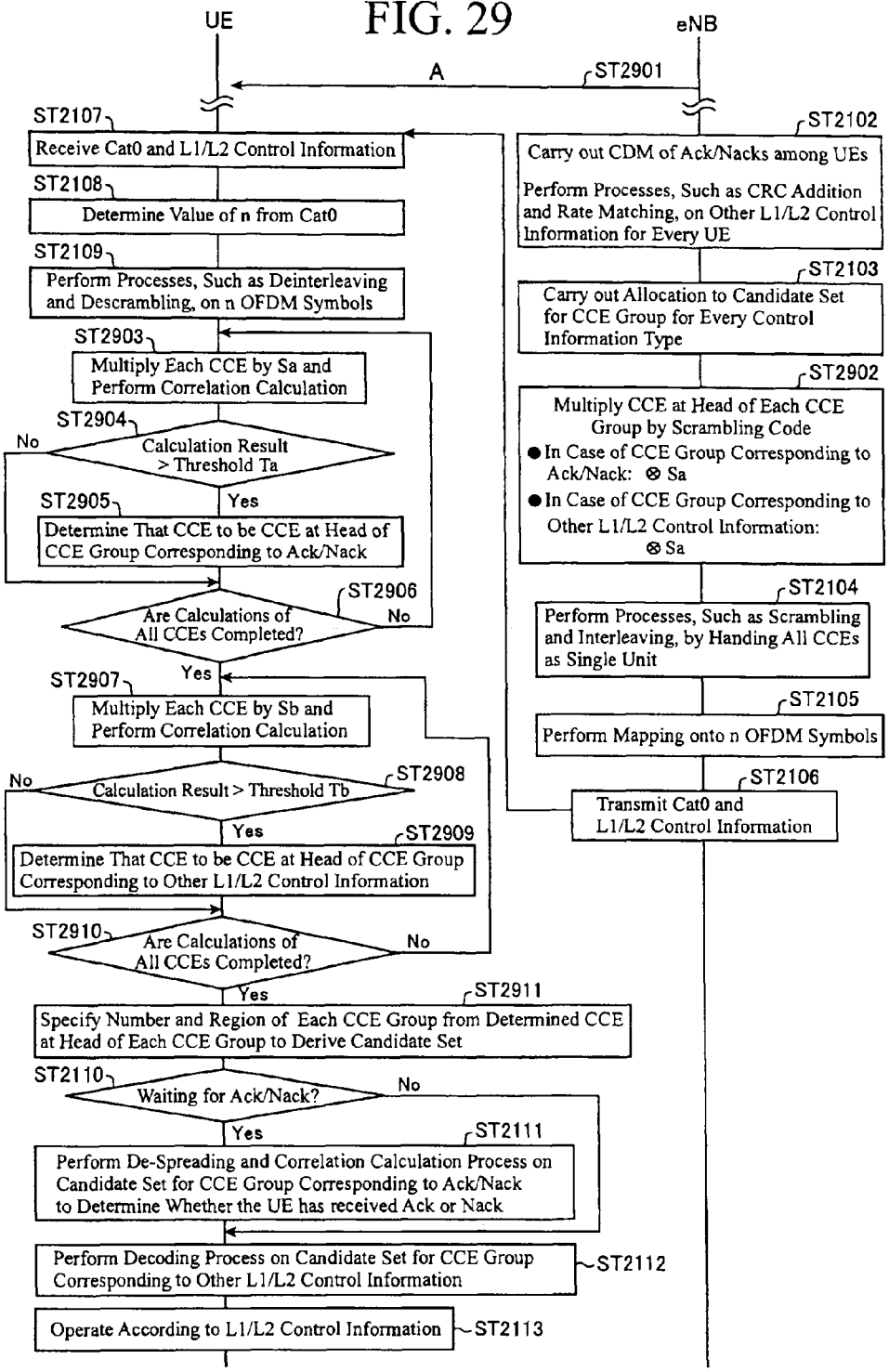
FIG. 29 is a flow chart showing a process of transmitting L1/L2 control information from a base station to a mobile terminal, and a process of determining a candidate set including L1/L2 control information which is carried out by the mobile terminal.

An example of the operation of the base station and that of each mobile terminal in accordance with the present invention will be explained. This embodiment can be implemented by changing a part of the sequence, as shown in FIG. 21, in the case in which the CCEs are grouped by the following two information types: Ack/Nack and other L1/L2 control information, as shown in FIG. 29. FIG. 29 is a flow chart showing a process of transmitting L1/L2 control information to each mobile terminal from the base station, and a process of determining a candidate set including L1/L2 control information which is carried out by each mobile terminal. In FIG. 29, because the same reference characters as those shown in FIG. 21 denote the same processes or like processes, the explanation of these processes will be omitted hereafter. Each mobile terminal receives an L1/L2 control signal from the base station. As shown by a reference character A of FIG. 29, prior to receiving an L1/L2 control signal, each mobile terminal receives "information about the candidate set according to the number of CCEs included in each CCE group", a "spread code", the "scrambling codes Sa and Sb", and "thresholds Ta and Tb" which are notified thereto via, for example, a BCCH or L3 signaling, from the base station. In this example, it is assume that these pieces of information are notified to each mobile terminal. As an alternative, they can be predefined (ST2901).

After carrying out the processes of ST2107 to ST2109, each mobile terminal performs a correlation calculation on each CCE by multiplying it by Sa (ST2903), and then determines whether or not the result of the correlation calculation is larger than the threshold Ta (ST2904). When the result of the correlation calculation is larger than the threshold Ta (if Yes in ST2904), each mobile terminal determines that the CCE is the one at the head of the CCE group corresponding to Ack/Nack (ST2905). In contrast, when the result of the correlation calculation is equal to or smaller than the threshold Ta (if No in ST2904), each mobile terminal makes a transition to the correlation calculation of the next CCE without performing any process. Each mobile terminal then determines whether it has performed a correlation calculation on each of all the CCEs (ST2906), and repeatedly performs a correlation calculation of the next CCE and a comparison of the result of the correlation calculation with the threshold until each mobile terminal has completed a correlation calculation and a comparison of each of all the CCEs. When each mobile terminal has completed a correlation calculation of each of all the CCEs by multiplying it by Sa, a comparison of the result of the correlation calculation with the threshold, and determination of whether or not each CCE is the head of the CCE group, each mobile terminal then performs a correlation calculation on each CCE by multiplying it by Sb (ST2907). Each mobile terminal then determines whether or not the result of the correlation calculation is larger than the threshold Tb (ST2908). When the result of the correlation calculation is larger than the threshold Tb, each mobile terminal determines that the CCE is the one at the head of the CCE group corresponding to other L1/L2 control signals (ST2909). In contrast, when the result of the correlation calculation is not larger than the threshold Tb, each mobile terminal makes a transition to a correlation calculation of the next CCE without performing any process. Each mobile terminal then determines whether it has performed a correlation calculation of each of all the CCEs (ST2910), and repeatedly performs a correlation calculation of the next CCE and a comparison of the result of the correlation calculation with the threshold until each mobile terminal has completed a correlation calculation and a comparison of each of all the CCEs. When each mobile terminal has completed a correlation calculation of each of all the CCEs by multiplying it by Sb, a comparison of the result of the correlation calculation with the threshold, and determination of whether or not each CCE is the head of the CCE group, each mobile terminal then specifies the number and region of each CCE group from the determined CCE at the head of each CCE group and derives a candidate set according to the number of CCEs (ST2911). By thus determining the CCE at the head of each CCE group, each mobile terminal can specify the number and region of CCEs included in each CCE group even if the number of CCE groups corresponding to Ack/Nack increases or decreases.

As mentioned above, in accordance with the present invention, there is provided a method of disposing a CCE group corresponding to Ack/Nack and a CCE group corresponding to other L1/L2 control information, and multiplying the CCE at the head of each group by an orthogonal scrambling code specific to each group. Therefore, in addition to the same advantages as those provided by the second variant of Embodiment 2, there is provided an advantage of, even when the amount of information of Ack/Nacks are changed dynamically every sub-frame, being able to eliminate the reduction in the use efficiency of radio resources without having to ensure useless CCEs to which Ack/Nacks are allocated.

Furthermore, in accordance with this Embodiment 4, by determining the CCE at the head of each CCE group, each mobile terminal can specify the number and region of CCEs included in each CCE group even if the number of CCE groups corresponding to Ack/Nack increases or decreases, as previously explained. This embodiment can be applied to not only the case in which the number of CCE groups corresponding to Ack/Nack increases or decreases, but also a case in which the number of CCEs included in each CCE group increases or decreases. In this case, the number of CCEs included in each CCE group is brought into correspondence with the candidate set of the CCE group. A function required for the correspondence can be clearly informed from the base station to each mobile terminal (for example, the function required for the correspondence is informed to each mobile terminal in advance by using a BCCH, an L3 message, or the like), or can be predefined. By doing in this way, because the number of CCEs included in each CCE group can be increased or decreased more flexibly every sub-frame, the use efficiency of radio resources can be further improved. In addition, because each mobile terminal does not have to perform a de-spreading process and a blind detection on many CCE groups (for example, see ST2711 to ST2718 shown in FIG. 27 in accordance with Embodiment 3). Therefore, the amount of information to be demodulated by each mobile terminal can be reduced, low power consumption of each mobile terminal can be achieved, and the delay occurring in the processing carried out by each mobile terminal can be reduced.

In this embodiment, the method of disposing a CCE group corresponding to Ack/Nack and a CCE group corresponding to other L1/L2 control information, and multiplying the CCE at the head of each group by an orthogonal scrambling code specific to the group is disclosed in order to eliminate the reduction in the use efficiency of radio resources due to variations in the amount of information of Ack/Nacks. The method can include the step of multiplying not only the CCE at the head of each group, but each of all the CCEs included in each group by an orthogonal scrambling code specific to the group. Because each of all the CCEs included in each group is multiplied by the orthogonal scrambling code specific to the group, this variant offers an advantage of being able to enable each mobile terminal to determine the presence or absence of a correlation more certainly when performing a correlation calculation on each CCE.

Furthermore, in this embodiment, although the method of multiplying the CCE at the head of each group by the orthogonal scrambling code specific to the group is disclosed, as previously mentioned. As an alternative, a method of respectively multiplying the CCE at the head of each of all the CCE groups and each of the other CCEs included in the CCE group by scrambling codes orthogonal to each other can be used. By using this method, the required scrambling codes are made to simply include only one scrambling code by which the CCE at the head of each CCE group is multiplied even though how many CCE groups exist. Therefore, there is provided an advantage of being able to reduce the required number of scrambling codes, together with the scrambling code by which each of the remaining CCEs is multiplied, to two. In addition, there is provided an advantage of being able to enable each mobile terminal to determine the presence or absence of a correlation more certainly when performing a correlation calculation on each CCE because each mobile terminal multiplies the CCE at the head of each CCE group and each of the other CCEs by the scrambling codes orthogonal to each other.

Furthermore, in this embodiment, each mobile terminal can alternatively determine the presence or absence of a correlation by, instead of performing a correlation calculation on the CCE at the head of each CCE group, performing a correlation calculation on the CCE at the tail end of each CCE group. That is, each mobile terminal has only to be able to specify the number and region of CCEs included in each group.

In this embodiment, Ack/Nack and other L1/L2 control information are explained as an example, though the present invention can be applied to control information to which a different coding method is applied. In this variant, the same advantages are provided.

Embodiment 5

Figure 30:
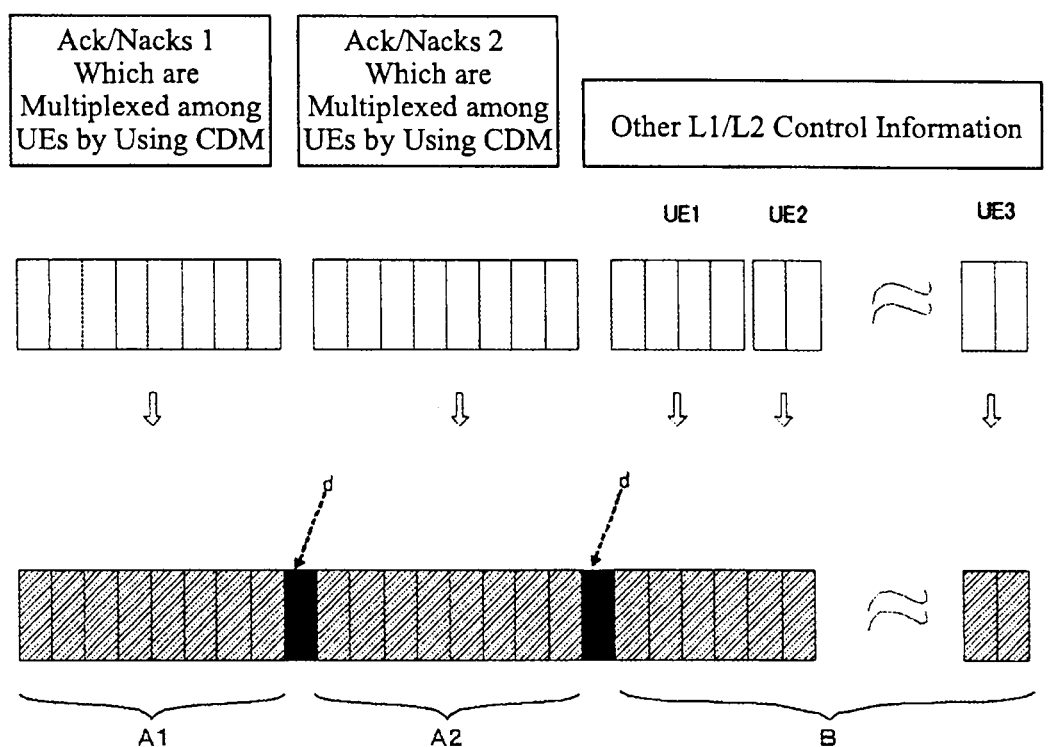
FIG. 30 is an explanatory drawing showing an example of a method of disposing a dummy CCE, to which no L1/L2 control information is allocated, between CCE groups into which CCEs have been divided in accordance with Embodiment 5.

In Embodiment 4, the method of disposing a CCE group corresponding to Ack/Nack and a CCE group corresponding to other L1/L2 control information, and multiplying either the CCE at the head of each group or each CCE of each group by an orthogonal scrambling code specific to the group in order to eliminate the reduction in the use efficiency of radio resources due to variations in the amount of information of Ack/Nacks is explained. In this embodiment, a method of disposing a dummy CCE to which no L1/L2 control information is allocated between CCE groups into which the CCEs are divided, and inserting predetermined data (e.g. all 0s or all 1s) into this dummy CCE is disclosed. FIG. 30 is an explanatory drawing showing an example of the method of disposing a dummy CCE to which no L1/L2 control information is allocated between CCE groups into which the CCEs are divided in accordance with Embodiment 5. As shown in the figure, all the CCEs are divided into a CCE group 1 (A1 shown in FIG. 30) corresponding to Ack/Nack, a group 2 (A2 shown in FIG. 30) corresponding to Ack/Nack, and a CCE group corresponding to other L1/L2 control information (B shown in FIG. 30), and a dummy CCE (d shown in FIG. 30) is disposed between any two adjacent groups. Predetermined data (e.g. all 0s or all 1s) are inserted into each dummy CCE. Because the method is configured as mentioned above, even when the number of CCE groups corresponding to Ack/Nack dynamically increases or decreases every sub-frame, the mobile terminal can discriminate between a CCE group corresponding to Ack/Nack and that corresponding to other L1/L2 control signals when receiving an L1/L2 control signal. Furthermore, this embodiment can be applied to not only the case in which the number of CCE groups corresponding to Ack/Nack increases or decreases, but also a case in which the number of CCEs included in each CCE group dynamically increases or decreases every sub-frame.

The data included in the dummy CCE inserted between any two adjacent CCE groups and information about each CCE group's candidate set can be clearly informed from the base station to the mobile terminal (for example, the data and the information are informed to the mobile terminal in advance by using a BCCH, an L3 message, or the like), or can be predefined.

Next, a method of mapping CCEs onto a physical resource will be explained. All the CCEs included in the system bandwidth are divided into a CCE group corresponding to Ack/Nack, a CCE group corresponding to other L1/L2 control information, and a common CCE group, and a cell-specific scrambling process, modulation, an interleaving process, etc. are performed on all the CCEs with these CCEs being handled as a single unit, and mapping of the CCEs onto a physical resource on the frequency and time axes is carried out. In the case of mapping the CCEs onto a physical resource, the CCEs are mapped onto a region except regions in each of which a reference symbol or information about Cat0 is mapped. Because the number of all the CCEs is determined according to the number of OFDM symbols, all the CCEs corresponding to the number of OFDM symbols are mapped onto a physical resource on the frequency and time axes, which is included in the predetermined OFDM symbol.

An example of the operation of the base station and that of the mobile terminal in accordance with the present invention will be explained. This embodiment can be implemented by changing a part of the sequence, as shown in FIG. 21, in the case in which the CCEs are grouped by the following two information types: Ack/Nack and other L1/L2 control information, as follows. In ST2101 of FIG. 21, in the information to be notified from the base station to the mobile terminal in advance, a spread code, information about the candidate set according to the number of CCEs included in each CCE group, and information about what kind of data are inserted into each dummy CCE have only to be included. In addition, between the steps of ST2103 and ST2104, the base station inputs predetermined data to a CCE between any two adjacent groups to dispose a dummy CCE. The subsequent processes of the base station can be the same as those shown in FIG. 21. Next, processes carried out by the mobile terminal will be explained. In ST2107 of FIG. 21, the mobile terminal receives, as well as Cat0, L1/L2 control information, and determines the number of OFDM symbols used for the L1/L2 control information from Cat0. The mobile terminal performs processes, such as deinterleaving and descrambling, on a number of OFDM symbols whose number is based on the result of the determination to derive the CCEs. In this case, the mobile terminal carries out a process of searching for each dummy CCE between the steps of ST2109 and ST2110. Because the predetermined data are inputted into each dummy CCE, the mobile terminal has only to search for the data. Because the mobile terminal does not have to perform a correlation calculation on each of all the CCEs by multiplying it by a scrambling code, like that of Embodiment 4, the amount of processing carried out by the mobile terminal can be reduced greatly. After searching for the dummy CCEs, the mobile terminal derives the number of and region of CCEs included in each CCE group on the basis of the dummy CCEs, and also derives the candidate set corresponding to each CCE group. Information about the derivation of the number of and region of CCEs included in each CCE group and the derivation of the candidate set corresponding to each CCE group can be inserted into the information about the candidate set according to the number of CCEs included in each CCE group which is notified in advance from the base station, or can be predefined. After that, the mobile terminal which has derived the candidate set corresponding to each CCE group simply carries out the processes in step ST2110 and the subsequent steps of FIG. 21.

As mentioned above, in accordance with the present invention, there is provided a method of disposing a dummy CCE to which no L1/L2 control information is allocated between CCE groups into which the CCEs are divided, and inserting predetermined data (e.g. all 0s or all 1s) into this dummy CCE. Therefore, in addition to the same advantages as those provided by the second variant of Embodiment 2, there is provided a further advantage of being able to eliminate the reduction in the use efficiency of radio resources without having to ensure useless CCEs to which Ack/Nacks are allocated even when the amount of information of Ack/Nacks dynamically changes every sub-frame. In addition, because the mobile terminal can specify the number and region of CCEs included in each CCE group even if the number of CCE groups corresponding to Ack/Nack increases or decreases, this embodiment can be applied to not only the case in which the number of CCE groups increases or decreases, but also a case in which the number of CCEs included in each CCE group increases or decreases. In this case, the number of CCEs included in each CCE group is brought into correspondence with the candidate set of the CCE group. A function required for the correspondence can be clearly informed from the base station to the mobile terminal (for example, the function required for the correspondence is informed to the mobile terminal in advance by using a BCCH, an L3 message, or the like), or can be predefined. By doing in this way, because the number of CCEs included in each CCE group can be increased or decreased more flexibly every sub-frame, the use efficiency of radio resources can be further improved. In addition, the mobile terminal does not have to perform a de-spreading process and a blind detection on each of all the CCEs included in each of many CCE groups (ST2711 to ST2718 shown in FIG. 27), and does not have to perform a correlation calculation on each of all the CCEs by performing a scrambling process on it (for example, see ST2903 to ST2910 shown in FIG. 29 in accordance with Embodiment 4). Therefore, the amount of information to be demodulated by the mobile terminal can be reduced, low power consumption of the mobile terminal can be achieved, and the delay occurring in the processing carried out by the mobile terminal can be reduced.

In this embodiment, in order to eliminate the reduction in the use efficiency of radio resources due to variations in the amount of information of Ack/Nacks, the method of disposing a dummy CCE to which no L1/L2 control information is allocated between CCE groups into which the CCEs are divided, and inserting predetermined data (e.g. all 0s or all 1s) into this dummy CCE is disclosed. The same method as that shown in Embodiment 4 can be applied to each dummy CCE, and a method of multiplying each dummy CCE by a certain specific scrambling code can be used. In this case, because the number of required codes is reduced to one which is used for the dummy CCEs, there is provided an advantage of being able to minimize the number of required codes.

In this embodiment, Ack/Nack and other L1/L2 control information are explained as an example, though the present invention can be applied to control information to which a different coding method is applied. In this variant, the same advantages are provided.

Embodiment 6

In the above-mentioned embodiments and variants, the method of dividing all the CCEs within the system bandwidth into CCE groups while performing a cell-specific scrambling process, modulation, an interleaving process, etc. on all the CCEs by handling these CCEs as a single unit, and then mapping the CCEs onto a physical resource on the frequency and time axes is disclosed. Also in the case of mapping the CCEs onto two OFDM symbols or three OFDM symbols, because the number of all the CCEs is determined according to the number of OFDM symbols, all the CCEs corresponding to the number of OFDM symbols are mapped onto a physical resource on the frequency and time axes, which is included in the predetermined OFDM symbols, as previously explained. A problem with the case of using the above-mentioned method is that because an interleaving process is performed on all the CCEs with these CCEs being handled as a single unit, and mapping of the CCEs onto a physical resource is carried out, a case in which there is a physical region where CCEs should be mapped for every CCE group cannot be supported. To solve this problem, in this embodiment, a method of carrying out an interleaving process for every CCE group, and mapping CCEs onto a physical resource is disclosed. By using this method, mapping of CCEs onto a desired physical resource for every CCE group can be carried out.

A case, as shown in FIG. 19, in which Ack/Nacks and other L1/L2 control signals are grouped will be explained as an example of the present invention. As shown in the figure, Ack/Nacks are multiplexed among mobile terminals by using CDM, and are divided into parts each corresponding to a CCE after subjected to processes such as MCS. On the other hand, other L1/L2 control signals are subjected to processes, such as addition of a CRC, encoding, and rate matching, for every mobile terminal, and are divided into parts each corresponding a CCE. All the CCEs corresponding to the number of OFDM symbols onto which the CCEs are physically mapped are divided into a CCE group corresponding to Ack/Nack and a CCE group corresponding to other L1/L2 control information. The Ack/Nacks which are CDM-multiplexed among mobile terminals are allocated to the CCE group corresponding to Ack/Nack by the base station, and the other L1/L2 control signals are allocated to the CCE group corresponding to other L1/L2 control information by the base station. The candidates of combinations of CCEs on which each mobile terminal has to perform a blind detection is predetermined from each CCE group. As a result, each mobile terminal to which Ack/Nack is transmitted has only to perform a blind detection on, instead of the candidates which are determined from the combinations of CCEs included in the whole system bandwidth, the candidates included in the CCE group corresponding to Ack/Nack. Furthermore, also regarding other L1/L2 control information, each mobile terminal has only to perform a blind detection on, instead of the candidates which are determined from the combinations of CCEs included in the whole system bandwidth, the candidates included in the CCE group corresponding to other L1/L2 control information.

The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

Figure 31:
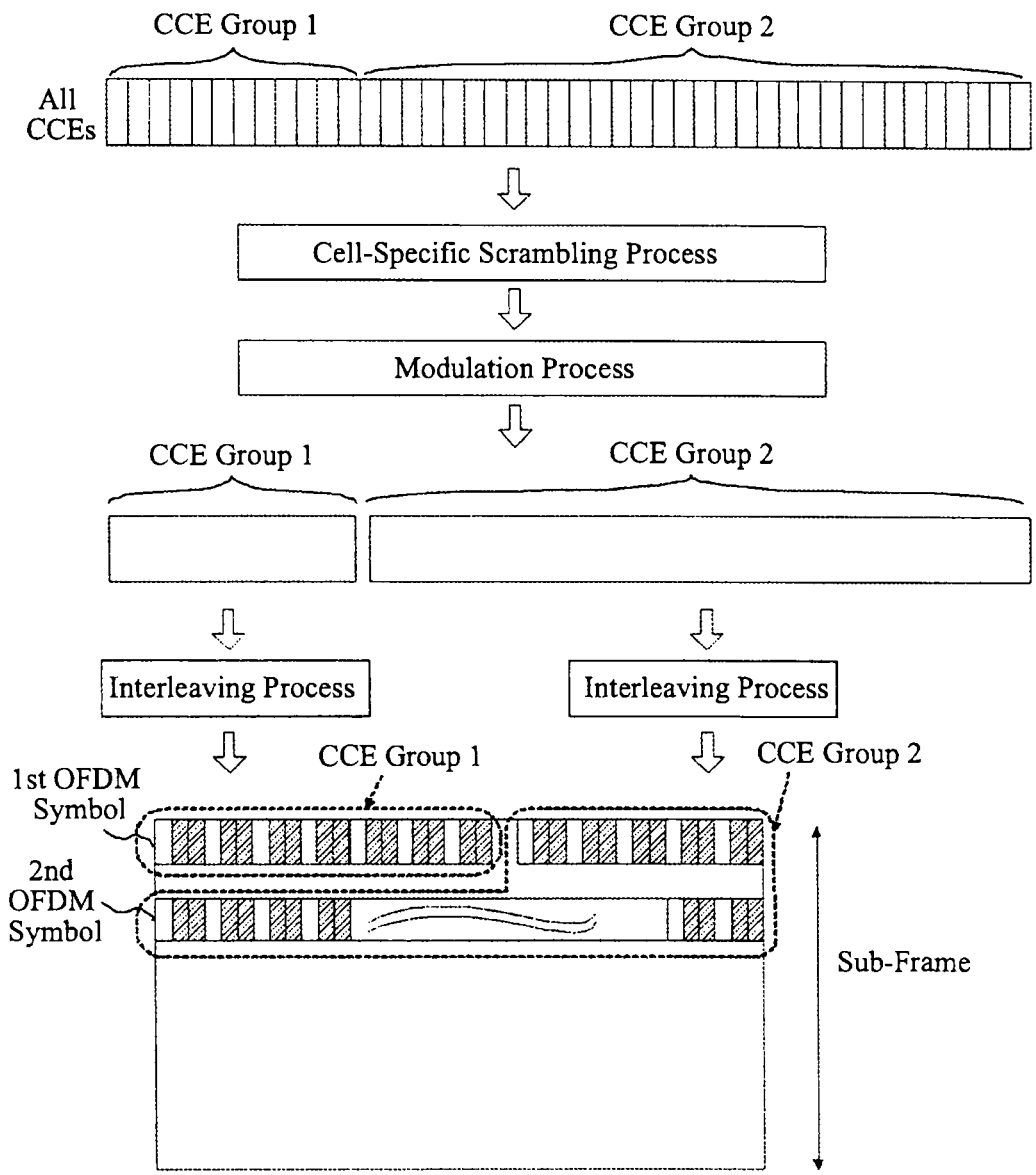
FIG. 31 is an explanatory drawing showing an example of a mapping method of mapping each CCE group onto a physical resource.

Next, a method of mapping CCEs onto a physical resource will be explained. FIG. 31 is an explanatory drawing showing an example of a mapping method of mapping each CCE group onto a physical resource in accordance with Embodiment 6. In this case, a CCE group 1 corresponds to Ack/Nack and a CCE group 2 corresponds to other L1/L2 control information. As shown in FIG. 31, all the CCEs corresponding to the number of OFDM symbols onto which the CCEs are physically mapped are divided into the CCE group 1 corresponding to Ack/Nack and the CCE group 2 corresponding to other L1/L2 control information, and a cell-specific scrambling process and modulation are performed on all the CCEs with these CCEs being handed as a single unit. After that, an interleaving process is carried out for every CCE group, and mapping of the CCEs onto a physical resource on the frequency and time axes which is allocated for every CCE group is carried out. Because an interleaving process is carried out for every CCE group in this way, mapping of the CCEs onto a desired physical resource can be carried out. More specifically, for example, in a case in which it is desirable that Ack/Nacks are mapped onto the 1st OFDM symbol from requirements on the error rate etc., by carrying out an interleaving process for every CCE group, as shown in the figure, the CCE group 1 corresponding to Ack/Nack is allocated to the 1st OFDM symbol which is allocated in advance so that Ack/Nacks can be mapped onto the 1st OFDM symbol. Information about a correspondence between each CCE group and the physical resource on the frequency and time axes which is allocated for every group can be clearly notified from the base station to each mobile terminal (for example, the information is notified to each mobile terminal in advance by using a BCCH, an L3 message, or the like), or can be predefined.

The figure shows a case of mapping onto two OFDM symbols. In the case of mapping the CCEs onto a physical resource, the CCEs are mapped onto a region except regions in each of which a reference symbol or information about Cat0 is mapped. Also in a case of mapping onto one OFDM symbol and in a case of mapping onto three OFDM symbols, because the mapping can be carried out similarly, and the number of all the CCEs is determined according to the number of OFDM symbols, all the CCEs corresponding to the number of OFDM symbols are mapped onto a physical resource on the frequency and time axes, which is included in the one or more predetermined OFDM symbols.

Figure 32:
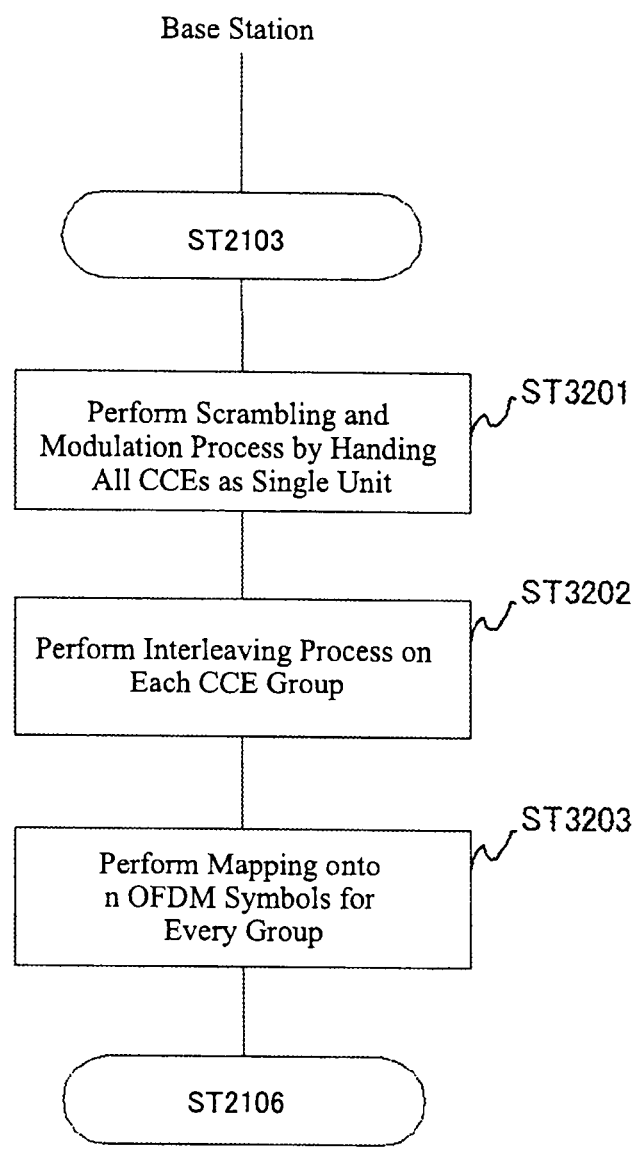
FIG. 32 is a flow chart showing the details of processing carried out by the base station shown in FIG. 21.
Figure 33:
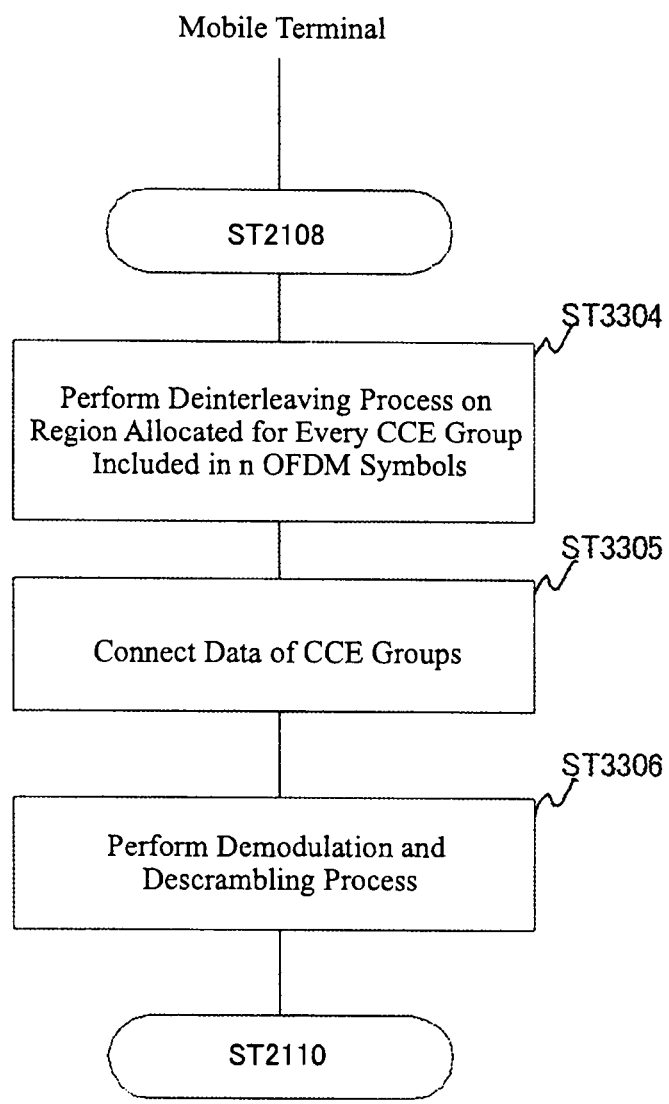
FIG. 33 is a flow chart showing the details of processing carried out by the mobile terminal shown in FIG. 21.

An example of the operation of the base station and that of each mobile terminal in accordance with the present invention will be explained. This embodiment can be implemented by changing a part of the sequence, as shown in FIG. 21, in the case in which the CCEs are grouped by the following two information types: Ack/Nack and other L1/L2 control information, as follows. FIG. 32 is a flow chart showing the details of the processing carried out by the base station shown in FIG. 21. FIG. 33 is a flowchart showing the details of the processing carried out by each mobile terminal shown in FIG. 21. In FIG. 32, after carrying out the processes in ST2103 of FIG. 21, the base station carries out scrambling and a modulation process by handling all the CCEs as a single unit (ST3201). The base station then carries out an interleaving process for every CCE group (ST3202), and then maps the CCEs onto a region, which is included in the n OFDM symbols and which is allocated to each CCE group, for every group (ST3203). After that, the base station carries out the processes in step ST2106 and the subsequent steps of FIG. 21. In FIG. 33, each mobile terminal carries out a deinterleaving process on the region which is included in the n OFDM symbols and which is allocated to each CCE group after carrying out the process in step ST2108 of FIG. 21 (ST3304). Each mobile terminal then couples the data of the CCE groups (ST3305), and performs demodulation and a descrambling process on the data (ST3306). After that, each mobile terminal carries out the processes in step ST2110 and the subsequent steps of FIG. 21.

Furthermore, in the above-mentioned embodiment, instead of performing scrambling and a modulation process on all the CCEs by handling all the CCEs as a single unit (ST3301), each mobile terminal can perform scrambling and a modulation process on each CCE group. In this case, each mobile terminal has only to perform demodulation and descrambling on each CCE group, instead of performing steps ST3305 and ST3306, and, after that, couple the data of the CCE groups. As a result, because the base station can carry out the scrambling process to the mapping onto the physical resource in series for every CCE group, and each mobile terminal can carry out the deinterleaving process of deinterleaving the physical resource to the descrambling process in series for every CCE group, the complexity of the processings can be reduced.

As mentioned above, by using the method of performing the interleaving process on each CCE group, and then mapping the CCEs onto a physical resource, in addition to the advantages as described in the second variant of Embodiment 1, there is provided another advantage of being able to map the CCEs onto a desired physical resource for every CCE group. Accordingly, physical mapping according to desired reception quality which is required for every information type can be carried out. Furthermore, by allocating information which should be demodulated at an earlier time or the like to the 1st OFDM symbol, each mobile terminal is enabled to demodulate the information at an early time and can carryout the next process with very little delay. Particularly, there is a case in which it is required that Ack/Nacks are allocated to the 1st OFDM symbol, because meeting the error rate requirements and a shortening of the time required for the demodulation process in order for each mobile terminal to carry out a retransmitting process after receiving Ack/Nack, and so on are required. By applying the present invention to such a case, an improvement in the reception quality and a shortening of the time required for the demodulation process can be achieved.

Furthermore, in the above-mentioned embodiment, instead of performing scrambling and a modulation process on all the CCEs by handling all the CCEs as a single unit (ST3301), each mobile terminal can perform scrambling and a modulation process on each CCE group. In this case, each mobile terminal has only to perform demodulation and descrambling on each CCE group, instead of performing steps ST3305 and ST3306, and, after that, couple the data of the CCE groups. As a result, because the base station can carry out the scrambling process to the mapping onto the physical resource in series for each CCE group, and each mobile terminal can carry out the deinterleaving process of deinterleaving the physical resource to the descrambling process in series for each CCE group, the complexity of the processings can be reduced.

In the above-mentioned embodiment, the method of performing an interleaving process on each CCE group and mapping CCEs onto a physical resource in order to make it possible to map the CCEs onto a desired physical resource for each CCE group is disclosed. In this embodiment, a method of performing an interleaving process on all the CCEs corresponding to the number of OFDMs for each OFDM symbol, and mapping all the CCEs onto these OFDM symbols in order to make it possible to map the CCEs onto a desired physical resource for every CCE group is disclosed.

A case, as shown in FIG. 19, in which Ack/Nacks and other L1/L2 control signals are grouped will be explained as an example of the present invention. As shown in the figure, Ack/Nacks are multiplexed among mobile terminals by using CDM, and are divided into parts each corresponding to a CCE after subjected to processes such as MCS. On the other hand, other L1/L2 control signals are subjected to processes, such as addition of a CRC, encoding, and rate matching, for every mobile terminal, and are divided into parts each corresponding to a CCE. Ack/Nacks which are CDM-multiplexed among mobile terminals are allocated to the CCE group corresponding to Ack/Nack by the base station, and the other L1/L2 control signals are allocated to the CCE group corresponding to other L1/L2 control information by the base station.

The candidates of combinations of CCEs on which each mobile terminal has to perform a blind detection is predetermined from each CCE group. As a result, each mobile terminal to which Ack/Nack is transmitted has only to perform a blind detection on, instead of the candidates which are determined from the combinations of CCEs included in the whole system bandwidth, the candidates included in the CCE group corresponding to Ack/Nack. Furthermore, also regarding other L1/L2 control information, each mobile terminal has only to perform a blind detection on, instead of the candidates which are determined from the combinations of CCEs included in the whole system bandwidth, the candidates included in the CCE group corresponding to other L1/L2 control information.

The number and region (in a case in which CCEs are numbered, numbers) of CCEs included in each CCE group are brought into correspondence with the number of OFDM symbols, and each CCE group's candidate set is determined according to the correspondence between the number and region of CCEs included in each CCE group and the number of OFDM symbols. Information about each CCE group's candidate set can be clearly notified from the base station to each mobile terminal (for example, the information is notified to each mobile terminal in advance by using a BCCH, an L3 message, or the like), or can be predefined. Furthermore, information about the number and region of CCEs included in each CCE group can also be clearly notified from the base station to each mobile terminal (for example, the information is notified to each mobile terminal in advance by using a BCCH, an L3 message, or the like), or can be predefined.

Figure 34:
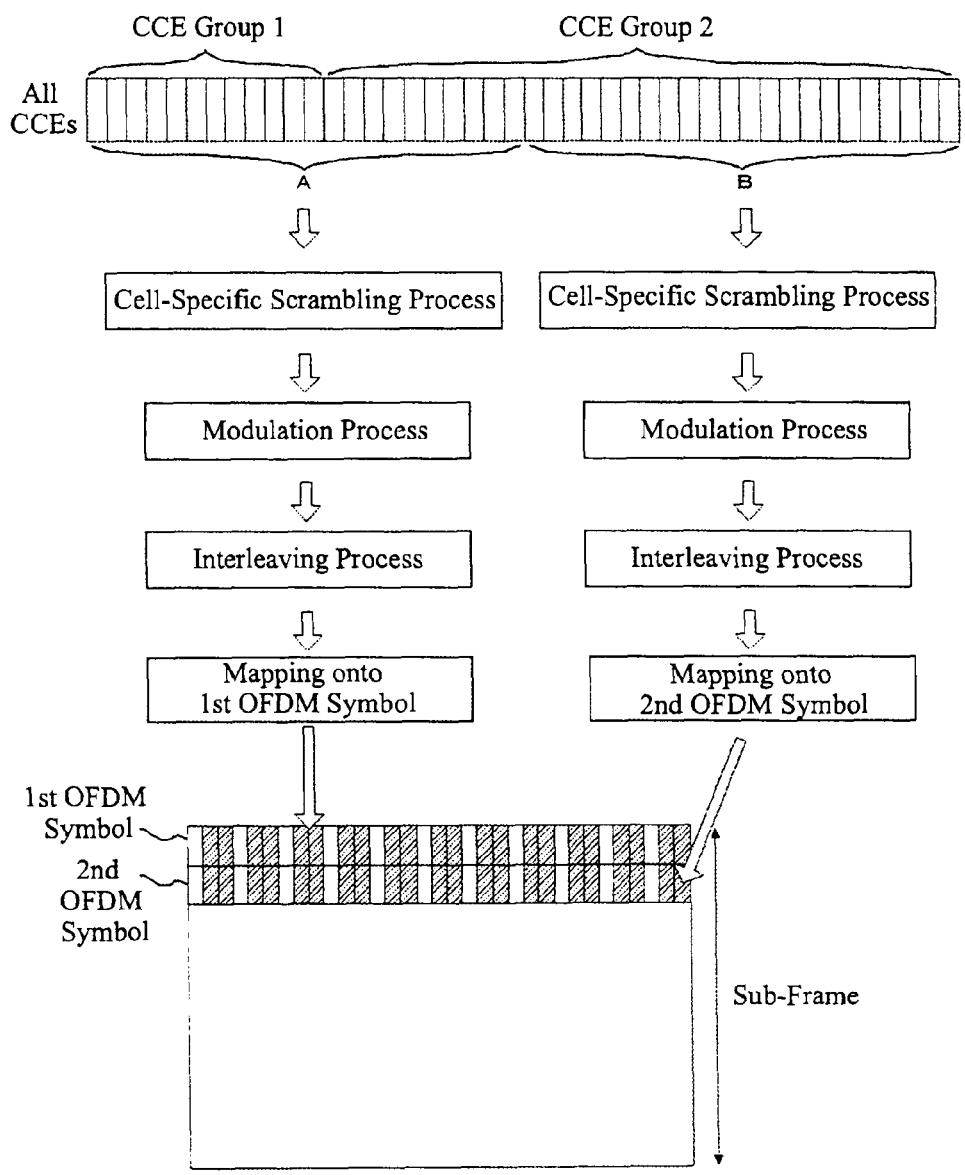
FIG. 34 is an explanatory drawing showing an example of a mapping method of mapping each CCE group onto a physical resource.

Next, a method of mapping CCEs onto a physical resource will be explained. FIG. 34 is an explanatory drawing showing an example of a mapping method of mapping each CCE group onto a physical resource in accordance with variant 1 of Embodiment 6. In this case, a CCE group 1 corresponds to Ack/Nack and a CCE group 2 corresponds to other L1/L2 control information. As shown in FIG. 34, all the CCEs corresponding to the number of OFDM symbols onto which the CCEs are physically mapped are divided into parts whose number is equal to the number of OFDM symbols. For example, in the case of mapping the CCEs onto two OFDM symbols, all the CCEs are divided into a part for the 1st OFDM symbol (A shown in FIG. 34) and a part for the 2nd OFDM symbol (B shown in FIG. 34). Each CCE group is allocated to the divided CCEs for each of the OFDM symbols so that each CCE group is mapped onto a desired OFDM symbol. In this case, the CCE group 1 corresponding to Ack/Nack is allocated to the CCEs for the 1st OFDM symbol. The CCE group 2 corresponding to other L1/L2 control information is allocated to the remaining CCEs.

Each CCE group is allocated to a desired OFDM symbol. As mentioned above, the number and region (in a case in which CCEs are numbered, numbers) of CCEs included in each CCE group correspond to the number of OFDM symbols, and the number and region of CCEs included in each CCE group can be determined in consideration of to which OFDM symbol the CCEs are to be allocated.

The base station performs a cell-specific scrambling process, a modulation process, and an interleaving process on the CCEs for each OFDM symbol, e.g. each of the CCEs for the 1st OFDM symbol and the CCEs for the 2nd OFDM symbol. After that, the base station maps the CCEs for each OFDM symbol onto the OFDM symbol. More specifically, the base station maps the CCEs for the 1st OFDM symbol onto the 1st OFDM symbol, and also maps the CCEs for the 2nd OFDM symbol onto the 2nd OFDM symbol. By performing an interleaving process for each OFDM symbol and then mapping the CCEs onto these OFDM symbols, as mentioned above, the base station can map the CCE group 1 corresponding to Ack/Nack onto the 1st OFDM symbol, for example.

The figure shows the case of mapping the CCEs onto two OFDM symbols. In the case of mapping the CCEs onto a physical resource, the CCEs are mapped onto a region except regions in each of which a reference symbol or information about Cat0 is mapped. Also in a case of mapping the CCEs onto one OFDM symbol and in a case of mapping the CCEs onto three OFDM symbols, because the mapping can be carried out similarly, and the number of all the CCEs is determined according to the number of OFDM symbols, all the CCEs corresponding to the number of OFDM symbols are mapped onto a physical resource on the frequency and time axes, which is included in the one or more predetermined OFDM symbols.

Figure 35:
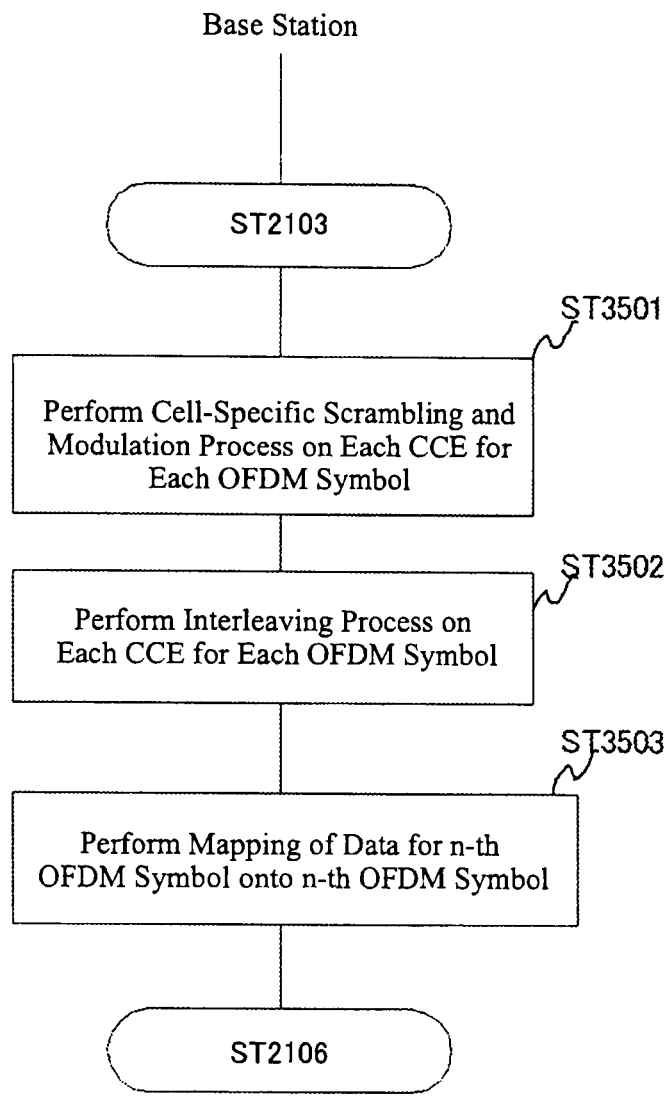
FIG. 35 is a flow chart showing the details of processing carried out by the base station shown in FIG. 21.
Figure 36:
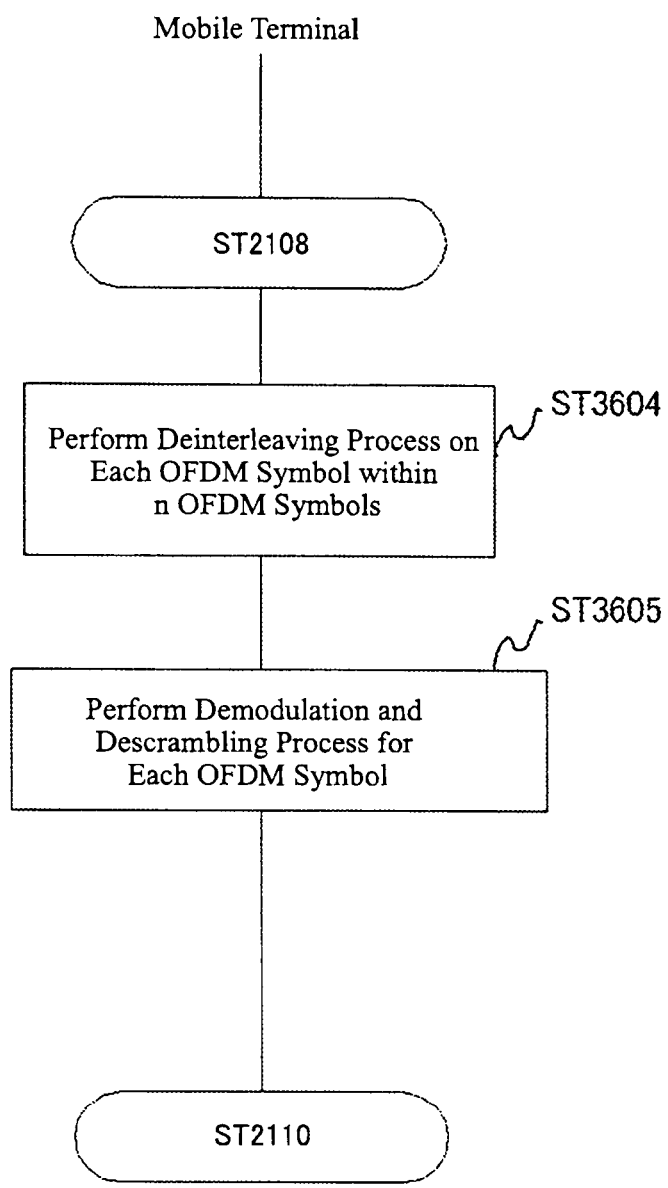
FIG. 36 is a flow chart showing the details of processing carried out by the mobile terminal shown in FIG. 21.

An example of the operation of the base station and that of each mobile terminal in accordance with the present invention will be explained. This variant can be implemented by changing a part of the sequence, as shown in FIG. 21, in the case in which the CCEs are grouped by the following two information types: Ack/Nack and other L1/L2 control information, as follows. FIG. 35 is a flow chart showing the details of the processing carried out by the base station shown in FIG. 21. FIG. 36 is a flow chart showing the details of the processing carried out by each mobile terminal shown in FIG. 21. As shown in FIG. 35, after carrying out the process in step ST2103 of FIG. 21, the base station performs a cell-specific scrambling process and a modulation process on the CCEs for each OFDM symbol (ST3501). Next, the base station performs an interleaving process on the CCEs for each OFDM symbol (ST3502). The base station then maps data which the base station has derived from the CCEs for the n-th OFDM symbol onto the n-th OFDM symbol (ST3503). After that, the base station carries out the processes in step ST2106 and the subsequent steps of FIG. 21. A changed portion of the processing carried out by each mobile terminal is shown in FIG. 36. Each mobile terminal carries out a deinterleaving process for each OFDM symbol within the n OFDM symbols after carrying out the process in step ST2108 of FIG. 21 (ST3604). Each mobile terminal then carries out demodulation and a descrambling process for each OFDM symbol (ST3605). After that, each mobile terminal carries out the processes in step ST2110 and the subsequent steps of FIG. 21.

In above-mentioned embodiment, the base station carried out a scrambling process, a modulation process, and an interleaving process for each OFDM symbol. As an alternative, after performing scrambling and a modulation process on all the CCEs by handling all the CCEs as a single unit, the base station can carry out an interleaving process for each OFDM symbol. In this case, each mobile terminal carries out descrambling for each OFDM symbol, and, after that, performs demodulation and a descrambling process on all the CCEs by handling all the CCEs as a single unit.

As mentioned above, by using the method of performing an interleaving process on all the CCEs for each of the OFDM symbols onto which the CCEs are physically mapped, and mapping all the CCEs onto these OFDM symbols, in addition to the advantages as described in variant 2 of Embodiment 1, there is provided an advantage of being able to map the CCEs onto a desired physical resource for every CCE group. Accordingly, physical mapping according to desired reception quality which is required for every information type can be carried out. Furthermore, by allocating information which should be demodulated at an earlier time or the like to the 1st OFDM symbol, each mobile terminal is enabled to demodulate the information at an early time and can carry out the next process with very little delay. Particularly, there is a case in which it is required that Ack/Nacks are allocated to the 1st OFDM symbol, because meeting the error rate requirements and a shortening of the time required for the demodulation process in order for each mobile terminal to carry out a retransmitting process after receiving Ack/Nack, and so on are required. By applying the present invention to such a case, an improvement in the reception quality and a shortening of the time required for the demodulation process can be achieved. In addition, because the base station carries out an interleaving process for each OFDM symbol, the base station and mobile terminal simply require only one size of interleaving and only one size of deinterleaving respectively. Therefore, the circuit scales of the base station and mobile terminal can be reduced greatly and the processings carried out by the base station and mobile terminal can be simplified. Furthermore, because the base station performs cell-specific scrambling for every OFDM symbol, only one type of cell-specific scrambling code is required and therefore efficient use of code resources can be achieved. In addition, because the base station uses scrambling having the same length among cells for every OFDM symbol, the capability of reducing the interference among cells can be improved.

Embodiment 7

This Embodiment 7 is aimed at solving the above-mentioned fourth problem and establishing a method of mapping Ack/Nacks and other L1/L2 control information onto the same L1/L2 control information region. In a case in which mapping is carried out as shown in Embodiment 2, a region in which L1/L2 control information other than Ack/Nack (other L1/L2 control information) can be mapped is limited to a region which is the subtraction of an Ack/Nack mapping region from an L1/L2 control information region. As examples of other L1/L2 control information, there are (1) L1/L2 control information for uplink communications control (as an example, uplink Grant (UL GRANT)), (2) L1/L2 control information for downlink communications control (as an example, downlink allocation (DL Allocation)), etc. Therefore, in a case in which there exist many mobile terminals simultaneously for which the base station carries out scheduling, there arises a problem that it is required that the region in which other L1/L2 control information can be mapped be increased. Furthermore, if a receiving error occurs in a mobile terminal when the mobile terminal receives other L1/L2 control information, this results in an increase in delay occurring in the processing carried out by the mobile communications system. Therefore, a method resistant to frequency-selective fading, concretely, a transmission method of transmitting other L1/L2 control information according to MCS is required. Also from this reason, there arises a problem that it is required that the region in which other L1/L2 control information can be mapped be increased.

Figure 37:
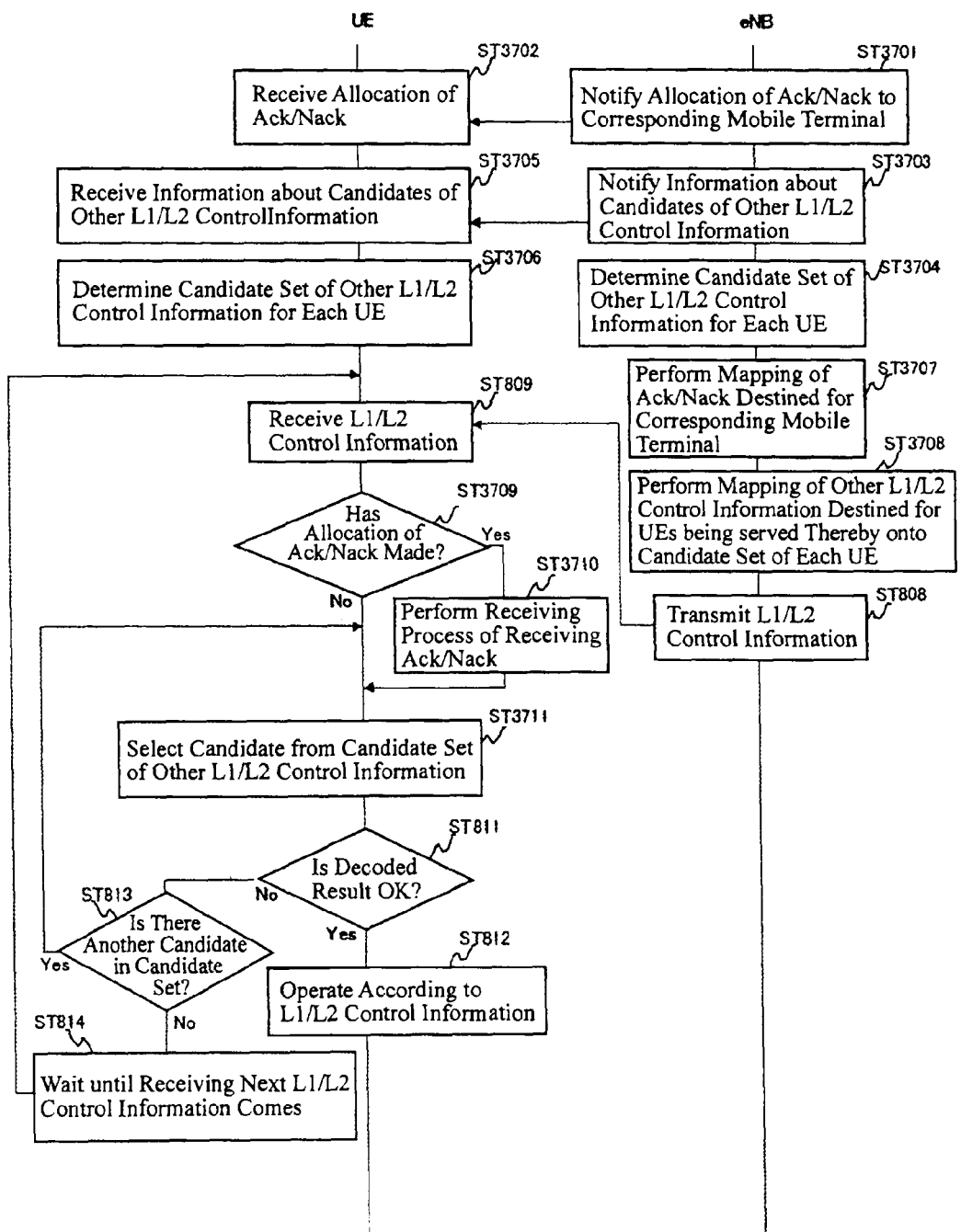
FIG. 37 is a flow chart showing a process of transmitting L1/L2 control information from a base station to a mobile terminal, and a process of determining a candidate set including L1/L2 control information which is carried out by the mobile terminal.

FIG. 37 is a flow chart showing a process of transmitting L1/L2 control information to each mobile terminal from the base station, and a process of determining a candidate set including L1/L2 control information which is carried out by each mobile terminal. In FIG. 37, because in the steps designated by the same reference characters as those shown in FIG. 8 the same processes or like processes are carried out, the explanation of these processes will be omitted hereafter. The base station, in ST3701, notifies allocation of Ack/Nack to each mobile terminal which the base station needs to transmit Ack/Nack via a downlink. Each mobile terminal, in ST3702, receives allocation of Ack/Nack. The base station, in ST3703, notifies information about candidates of other L1/L2 control information to each mobile terminal. The base station, in ST3704, determines a candidate set of other L1/L2 control information for each mobile terminal. When determining a candidate set of other L1/L2 control information, the base station, in ST3701, determines a candidate set regardless of where Ack/Nack has been allocated. The base station determines this candidate set of other L1/L2 control information by using all of the L1/L2 control information region. However, the method of determining a candidate set of other L1/L2 control information is not limited to this example. For example, a region which is certainly used as the Ack/Nack region is ensured, and a candidate set of other L1/L2 control information can be determined by using all of the L1/L2 control information region except a region which is ensured for Ack/Nack as a region for other L1/L2 control information (a minimum region which is required regardless of variations in the number of mobile terminals which are transmitting uplink data and are requiring Ack/Nack). Accordingly, the candidates included in the candidate set of other L1/L2 control information can be reduced. Therefore, the processing load on each mobile terminal can be reduced. Accordingly, there can be provided an advantage of achieving low power consumption in each mobile terminal. Furthermore, because the number of times that each mobile terminal performs a blind detection can be reduced, the delay occurring in the processing carried out by each mobile terminal can be reduced. As a result, there can be provided an advantage of providing an improvement in the throughput of uplink and/or downlink data in the mobile communications system. Each mobile terminal, in ST3705, receives the information about the candidates of other L1/L2 control information. Each mobile terminal, in ST3706, determines a candidate set of other L1/L2 control information. A method of determining a candidate set is the same as the method of determining a candidate set of other L1/L2 control information which the base station uses.

The base station, in ST3707, maps Ack/Nack destined for each corresponding mobile terminal according to the allocation in ST3701. The base station, in ST3708, maps other L1/L2 control information onto a region included in the region for L1/L2 control information in which no allocation has been performed in ST3701, in other words, a region included in the region for L1/L2 control information in which no Ack/Nack has been mapped in ST3705 in such a way that the other L1/L2 control information is included in the candidate set of other L1/L2 control information for each mobile terminal. The base station, in ST808, transmits the L1/L2 control information to the mobile terminals being served thereby. Each mobile terminal, in ST809, receives the L1/L2 control information from the base station.

Each mobile terminal, in ST3709, determines whether or not allocation of Ack/Nack has been made therefor. When allocation of Ack/Nack has been made therefor, each mobile terminal advances to step ST3710. Each mobile terminal, in ST3710, carries out a receiving process of receiving Ack/Nack. After that, each mobile terminal advances to step ST3711. Each mobile terminal, in ST3711, selects a candidate from the candidate set of other L1/L2 control information. Each mobile terminal, in ST811 to ST813, performs a blind detection on the other L1/L2 control information. Because the decoded result shows NG (CRC NG) at the time of this blind detection by each mobile terminal in a case in which a part corresponding to either Ack/Nack destined for each mobile terminal itself or Ack/Nack destined for another mobile terminal is included in the selected candidate, each mobile terminal can carry out a blind detection of whether other L1/L2 control information destined for the mobile terminal itself exists without caring about the positions where Ack/Nacks destined for the mobile terminal itself and/or the other mobile terminal are allocated.

The use of Embodiment 7 can offer the following advantages. Because there is no constraint on the candidate set and so on regarding mapping of Ack/Nacks, there can be provided an advantage of being able to freely map Ack/Nacks to the L1/L2 control information region. In addition, the use of the method in accordance with Embodiment 7 makes it possible to carry out freely mapping of Ack/Nacks onto a region outside the L1/L2 control information region. Furthermore, when the base station, in ST3704 of FIG. 37, determines a candidate set of other L1/L2 control information, the base station can determine a candidate set of other L1/L2 control information regardless of where Ack/Nacks have been allocated in ST3701. In view of this point, Embodiment 7 is effective at solving the fourth problem because the region in which other L1/L2 control information can be mapped can be enlarged to the entire L1/L2 control information region. Furthermore, even if the number of mobile terminals which are transmitting uplink data and are requiring Ack/Nack varies, the use of Embodiment 7 makes it possible to respond to the variation because Ack/Nacks can be mapped freely. In addition, even if the number of mobile terminals which are requiring Ack/Nack varies, the use of Embodiment 7 makes it possible to carry out a blind detection of other L1/L2 control information without caring about allocation of Ack/Nacks. By using Embodiment 7 in this way, there can be provided an advantage of being able to respond to a variation in the required number of Ack/Nacks without adding any new signal to the mobile communications system and without causing the base station and mobile terminal to perform any additional processes. In view of this point, Embodiment 7 is effective at solving the fifth problem. Furthermore, because allocation of Ack/Nack to each mobile terminal is made by the base station, each mobile terminal does not need to carry out a blind detection of Ack/Nack. Therefore, the processing load on each mobile terminal can be reduced. Accordingly, there can be provided an advantage of achieving low power consumption in each mobile terminal. Furthermore, because each mobile terminal does not need to carry out a blind detection of Ack/Nack, the delay occurring in the processing carried out by each mobile terminal can be reduced. As a result, there can be provided an advantage of providing an improvement in the throughput of uplink data in the mobile communications system.

In variant 1, a method of allocating particularly Ack/Nacks in units of CCEs in the method of Embodiment 7 will be explained. Because the sequence diagram of the method is similar to that shown in FIG. 37, only changed steps will be explained. In variant 1, the process of ST3701 is changed in such a way that the base station allocates and notifies Ack/Nack destined for each corresponding mobile terminal in units of CCEs. Furthermore, the process of ST3707 is changed in such a way that the base station carries out mapping of the Ack/Nack destined for each corresponding mobile terminal according to the allocation of the Ack/Nack in units of CCEs in ST3701. In addition, the process of ST3711 is changed in such a way as to include a step at the time of determining that allocation of Ack/Nacks has been made in ST3709, and a step at the time of determining that no allocation of Ack/Nacks has been made. More specifically, when determining that allocation of Ack/Nacks has been made, the base station does not select any candidate including CCEs to which Ack/Nack has been allocated from among the candidate set of other L1/L2 control information, that is, the base station does not perform any blind detection. In contrast, when determining that no allocation of Ack/Nacks has been made, the base station carries out the same processing as that shown in Embodiment 7. This process added to ST3711 does not have to be carried out.

By using variant 1 of Embodiment 7, the following advantages can be provided in addition to the advantages provided by Embodiment 7. Because the base station, in ST3701, can carry out allocation of Ack/Nacks destined for mobile terminals in units of CCEs, the base station does not have to carry out the allocation by using any frequency information and any time information, and can therefore reduce the amount of information (number of bits) required for the allocation. As a result, there can be provided an advantage of making effective use of radio resources. Furthermore, when each mobile terminal carries out a blind detection in order to judge whether other L1/L2 control information destined for each mobile terminal itself exists to select a candidate from among the candidate set of other L1/L2 control information in step ST3711, each mobile terminal can carry out the process in such a way as not to select any candidate including CCEs to which Ack/Nack destined for each mobile terminal itself has been allocated. In other words, each mobile terminal does not have to perform a blind detection on any candidate including CCEs to which Ack/Nack destined for each mobile terminal itself has been allocated. This results in a reduction in the number of times that each mobile terminal carries out a blind detection, and the processing load on each mobile terminal can be reduced. Accordingly, there can be provided an advantage of achieving low power consumption in each mobile terminal. Furthermore, because the number of times that each mobile terminal carries out a blind detection can be reduced, there can be provided an advantage of being able to reduce the delay occurring in the processing carried out in the mobile communications system.

In a second variant, the base station carries out multiplexing of Ack/Nack and other L1/L2 control information by using Frequency Division Multiplexing (Frequency Division Multiplexing: FDM), and carries out multiplexing of Ack/Nacks among mobile terminals by using code division multiplexing (Code Division Multiplexing: CDM). The second variant of this Embodiment 7 can be applied to Embodiment 7 and the first variant of Embodiment 7. Therefore, by using not only FDM but also CDM, the number of mobile terminals to which Ack/Nacks can be allocated with the same frequency can be increased. Therefore, the number of regions where Ack/Nacks are allocated can be decreased, and the number of regions where other L1/L2 control information can be allocated can be increased. As a result, there can be provided an advantage of making effective use of radio resources.

Embodiment 8

Problems to be solved by this Embodiment 8 will be explained hereafter. In nonpatent reference 5, a mapping method of mapping CCEs onto a physical resource is described, though how to map L1/L2 control information divided into parts each corresponding to a CCE onto CCEs is not disclosed. In addition, in nonpatent reference 3, it is described that downlink control channels are configured as a set of CCEs. Therefore, there exist a number of mapping methods of mapping L1/L2 control information divided into parts each corresponding to a CCE onto CCEs, the number of mapping methods being equal to the number of the permutations of an aggregation (Aggregation) number of CCEs. Currently, the aggregation number can be considered to be "1", "2", "4", or "8". Concretely, the number of types of aggregations can be calculated from the permutations of the aggregation number, and the number of types of aggregations becomes a huge number with increase in the aggregation number as follows: there is one type of aggregation when the aggregation number is 1, there are two types of aggregations when the aggregation number is 2, there are 24 types of aggregations when the aggregation number is 4, and there are 40,320 types of aggregations when the aggregation number is 8.

Figure 38:
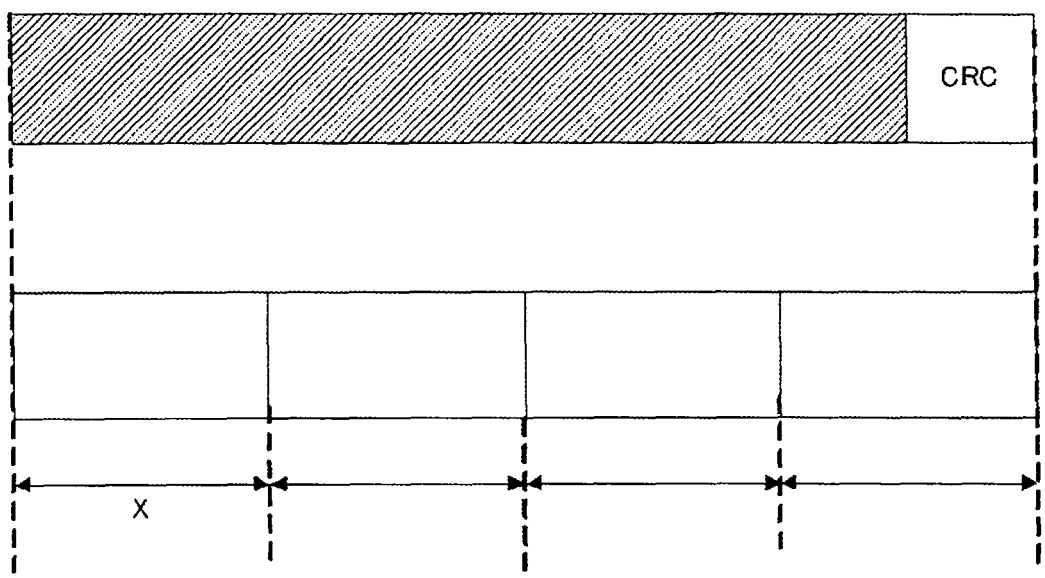
FIG. 38 is an explanatory drawing showing an example of a method of adding a CRC to downlink control information in accordance with Embodiment 8.

Next, an example of a method of adding a CRC to downlink control information will be shown in FIG. 38. FIG. 38 is an explanatory drawing showing an example of the method of adding a CRC to downlink control information in accordance with Embodiment 8. In FIG. 38, a hatched portion shows L1/L2 control information and a reference character x denotes one CCE. The base station adds a CRC to L1/L2 control information, and, after that, divides this L1/L2 control information into parts each corresponding to a CCE and maps them onto CCEs. One or more pieces of L1/L2 control information can be destined for each mobile terminal. Furthermore, the mapping onto the CCEs with the amount of data to which a CRC is added is carried out in the example of FIG. 38, though this process is briefly described for the sake of simplicity, and an encoding process, a rate matching process, an MCS execution process, etc. can be carried out in the meantime.

In nonpatent reference 3, it is described that a mobile terminal monitors a candidate set (Candidate Set) of downlink control channels. As shown in Embodiment 1, each mobile terminal performs a blind detection on candidates included in the candidate set. Therefore, the number of times that each mobile terminal performs a blind detection increases with increase in the number of candidates included in the candidate set. As a result, there arises a problem of increase in the power consumption of each mobile terminal resulting from increase in the amount of processing carried out by each mobile terminal. Furthermore, the increase in the number of candidates means that the average time length required for each mobile terminal to detect L1/L2 control information destined for each mobile terminal itself increases, and this causes a problem of an increase in delay occurring in the processing carried out by the mobile communications system. In addition, each mobile terminal has to detect that the decoded result regarding each of all the candidates shows NG in order to determine that there exists no L1/L2 control information destined for each mobile terminal itself. Therefore, the length of time required for each mobile terminal to determine that there exists no L1/L2 control information destined for each mobile terminal itself increases with increase in the number of candidates. As a result, in a mobile terminal which is performing a DRX operation during active, the length of time required for the mobile terminal to make a transition to a DRX operation increases because the mobile terminal determines that there exists no downlink allocation destined for the mobile terminal itself, and therefore the time period during which the mobile terminal is performing a DRX operation becomes short. Therefore, there arises a problem of exerting a bad influence on reduction in the power consumption of each mobile terminal. For example, a case in which a mobile terminal selects one candidate whose aggregation number is "8" from the candidate set is considered. When the aggregation number is 8, there are 40,320 types of aggregations. Therefore, the mobile terminal has to carry out the detecting process 40, 320 times. Thus, the increase in the number of types of aggregations results in increase in the number of times that the mobile terminal carries out the detecting process, and, like in the case of the increase in the number of candidates included in the candidate set, there arises a problem of increase in the power consumption of the mobile terminal and a problem of an increase in delay occurring in the processing carried out in the mobile communications system, which result from increase in the amount of processing carried out by the mobile terminal. Embodiment 8 is aimed at disclosing a method for solving the above-mentioned problems.

Figure 39:
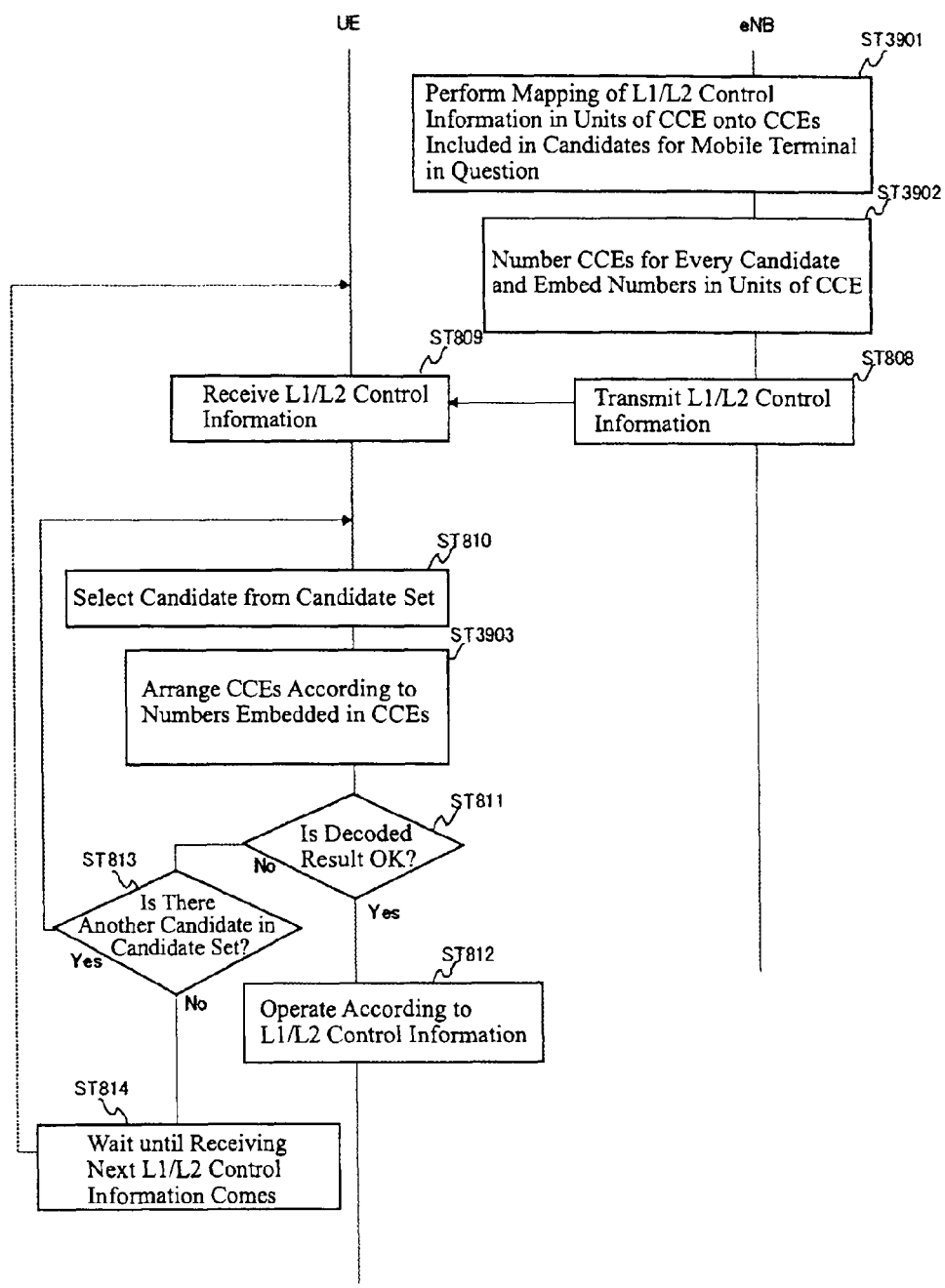
FIG. 39 is a flow chart showing a process of transmitting L1/L2 control information from a base station to a mobile terminal, and a process of determining a candidate set including L1/L2 control information which is carried out by the mobile terminal.

FIG. 39 is a flow chart showing a process of transmitting L1/L2 control information from the base station to each mobile terminal, and a process of determining a candidate set including L1/L2 control information which is carried out by each mobile terminal. In FIG. 39, because in the steps designated by the same reference characters as those shown in FIG. 8 the same processes or like processes are carried out, the explanation of these processes will be omitted hereafter. The base station, in ST3901, maps L1/L2 control information, which is divided into parts each corresponding to a CCE, onto the CCEs included in the candidates for each mobile terminal in question. In ST3902, the base station assigns numbers to the CCEs included in each candidate, and embeds pieces of information about the numbers in the CCEs. Currently, the aggregation number can be considered to be "1", "2", "4", or "8". Therefore, 1 to 8 are required as the numbers. Therefore, each number information requires three bits. The base station, in ST808, transmits the L1/L2 control information to the mobile terminals being served thereby. Each mobile terminal, in ST809, receives the L1/L2 control information from the base station. Each mobile terminal, in ST810, selects one candidate from the candidate set of L1/L2 control information. Each mobile terminal, in step ST3903, rearranges the CCEs included in the selected candidate according to their numbers embedded in the CCEs. Each mobile terminal then, in ST811 to ST813, performs a blind detection.

The use of Embodiment 8 can provide the following advantages. By assigning numbers to CCEs by using Embodiment 8 when carrying out an aggregation of CCEs, the number of types of aggregations on which each mobile terminal actually performs a decoding process can be reduced to one. As a result, any increase in the number of times that each mobile terminal performs a blind detection does not occur with increase in the aggregation number, and there can be provided an advantage of being able to suppress increase in the power consumption of each mobile terminal. Furthermore, there can be provided an advantage of being able to suppress any increase in delay occurring in the processing which is carried out by the mobile communications system until each mobile terminal detects L1/L2 control information destined for each mobile terminal itself. In addition, because the length of time required for each mobile terminal to determine that there exists no L1/L2 control information destined for each mobile terminal itself does not increase with increase in the number of candidates, there can be provided an advantage of being able to prevent the length of time required for a mobile terminal which is performing a DRX operation during active (Active) to make a transition to a DRX operation from increasing because the mobile terminal determines that there exists no downlink allocation destined for the mobile terminal itself, and prevent the time period during which the mobile terminal is performing a DRX operation from becoming short, thereby preventing a bad influence from being exerted on reduction in the power consumption of each mobile terminal.

Furthermore, there can be considered a case in which when the CCEs included in the candidate for each mobile terminal which is selected in ST3903 are rearranged according to the numbers embedded in the CCEs, the rearrangement cannot be carried out properly. As an example, there can be considered a case in which each mobile terminal in question selects, as a candidate whose aggregation number is "8", CCEs including L1/L2 control information destined for four other mobile terminals and having an aggregation number of "2". In the above-mentioned example, four CCEs to which a number "1" is assigned and four CCEs to which a number "2" is assigned are selected. That is, there exist no CCEs numbered "3", "4", "5", "6", "7", and "8". Thus, when each mobile terminal cannot rearrange the CCEs included in the candidate selected in ST3903 according to the numbers embedded in the CCEs, each mobile terminal can advance to ST813 so as to select the next candidate without performing a decoding process on them. As a result, each mobile terminal can select the next candidate without performing a decoding process on the CCEs even if they are candidates included in the candidate set. Accordingly, the number of times that each mobile terminal carries out the decoding process can be reduced while the number of the candidates is maintained, and therefore there can be provided an advantage of being able to reduce the power consumption of each mobile terminal. Furthermore, there can be provided an advantage of being able to decrease the delay occurring in the processing which is carried out by the mobile communications system until each mobile terminal detects L1/L2 control information destined for each mobile terminal itself. In addition, because the length of time required for each mobile terminal to determine that there exists no L1/L2 control information destined for each mobile terminal itself can be reduced while the number of the candidates is maintained, there can be provided an advantage of being able to reduce the length of time required for a mobile terminal which is performing a DRX operation during active to make a transition to a DRX operation because the mobile terminal determines that there exists no downlink allocation destined for the mobile terminal itself, and increase the time period during which the mobile terminal is performing a DRX operation, thereby establishing low power consumption in each mobile terminal.

Figure 40:
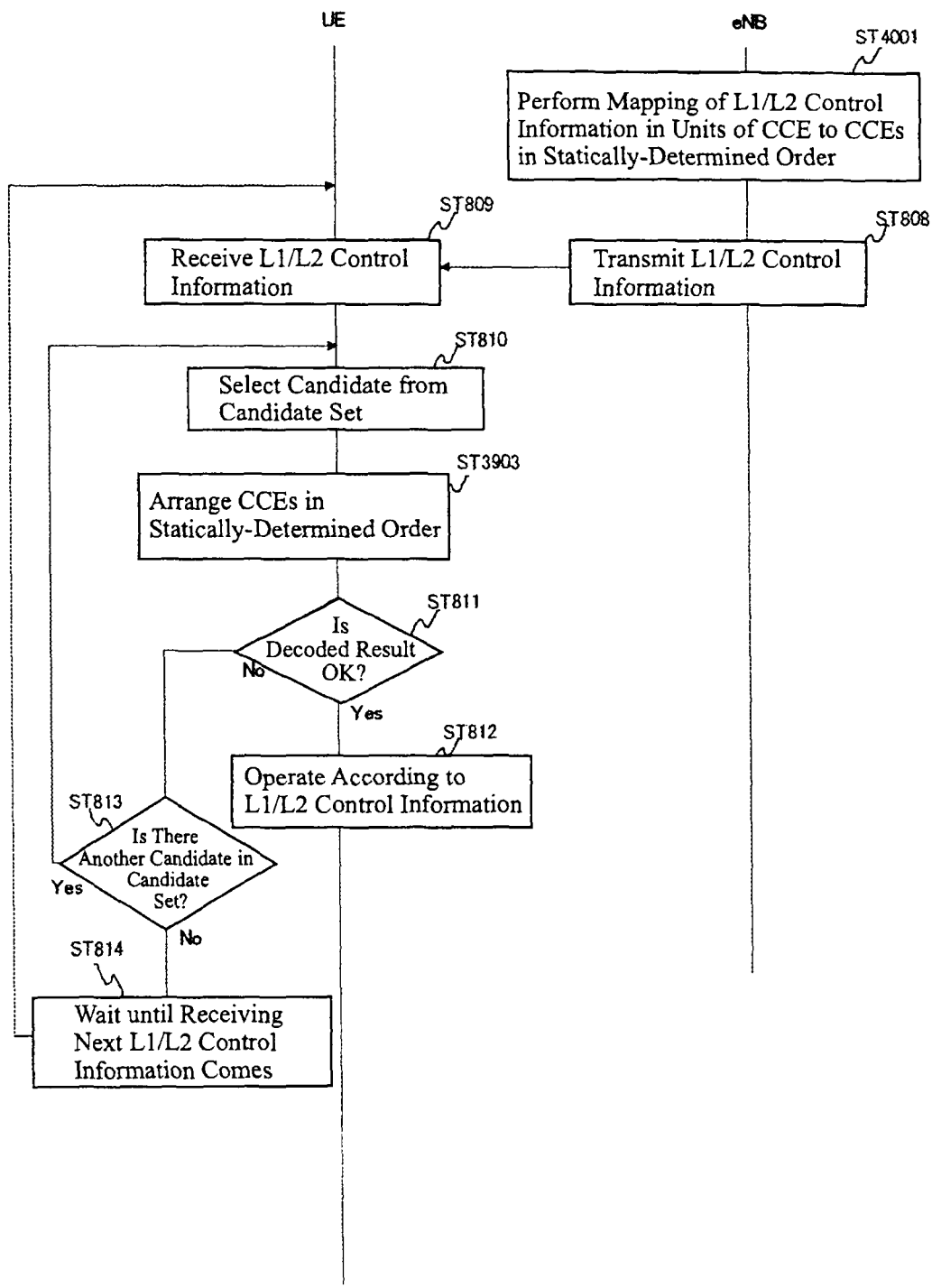
FIG. 40 is a flow chart showing a process of transmitting L1/L2 control information from a base station to a mobile terminal, and a process of determining a candidate set including L1/L2 control information which is carried out by the mobile terminal.

FIG. 40 is a flow chart showing a process of transmitting L1/L2 control information from the base station to each mobile terminal, and a process of determining a candidate set including the L1/L2 control information which is carried out by each mobile terminal. FIG. 40 shows an example of processes according to a first variant of Embodiment 8. In FIG. 40, because in the steps designated by the same reference characters as those shown in FIG. 39 the same processes or like processes are carried out, the explanation of these processes will be omitted hereafter. The base station, in ST4001, maps L1/L2 control information, which is divided into parts each corresponding to a CCE, onto the CCEs included in the candidates for each mobile terminal in question according to order which is statically determined in the mobile communications system. As an example of the order which is statically determined in the mobile communications system, there can be considered a case in which the base station maps L1/L2 control information, which is divided into parts each corresponding to a CCE, in either descending order or ascending order in frequency onto the CCEs starting from the first-numbered CCE. As an alternative, the order can be semi-statically determined in the mobile communications system. As an example, the order can be changed for each base station (cell). In this case, the time at which the order is changed can be the time of location registration, the time of hand-over (the time of changing a serving cell), or the like. Furthermore, as a method of notifying the order, there can be a notification of the order by using broadcast information, a method of notifying the order from the base station to each mobile terminal by using an L3 control signal, and so on. The base station, in ST808, transmits the L1/L2 control information to the mobile terminals being served thereby. Each mobile terminal, in ST809, receives the L1/L2 control information from the base station. Each mobile terminal, in ST810, selects one candidate from the candidate set of L1/L2 control information. Each mobile terminal, in ST4002, rearranges the CCEs according to the order which is statically or semi-statically determined in the mobile communications system. Each mobile terminal then, in ST811 to ST813, performs a blind detection.

By using variant 1 of Embodiment 8, there can be provided the following advantage in addition to the advantages provided by Embodiment 8. Because the necessity to embed number information in the CCEs is eliminated, radio resources can be used more effectively compared with Embodiment 1.

Figure 41:
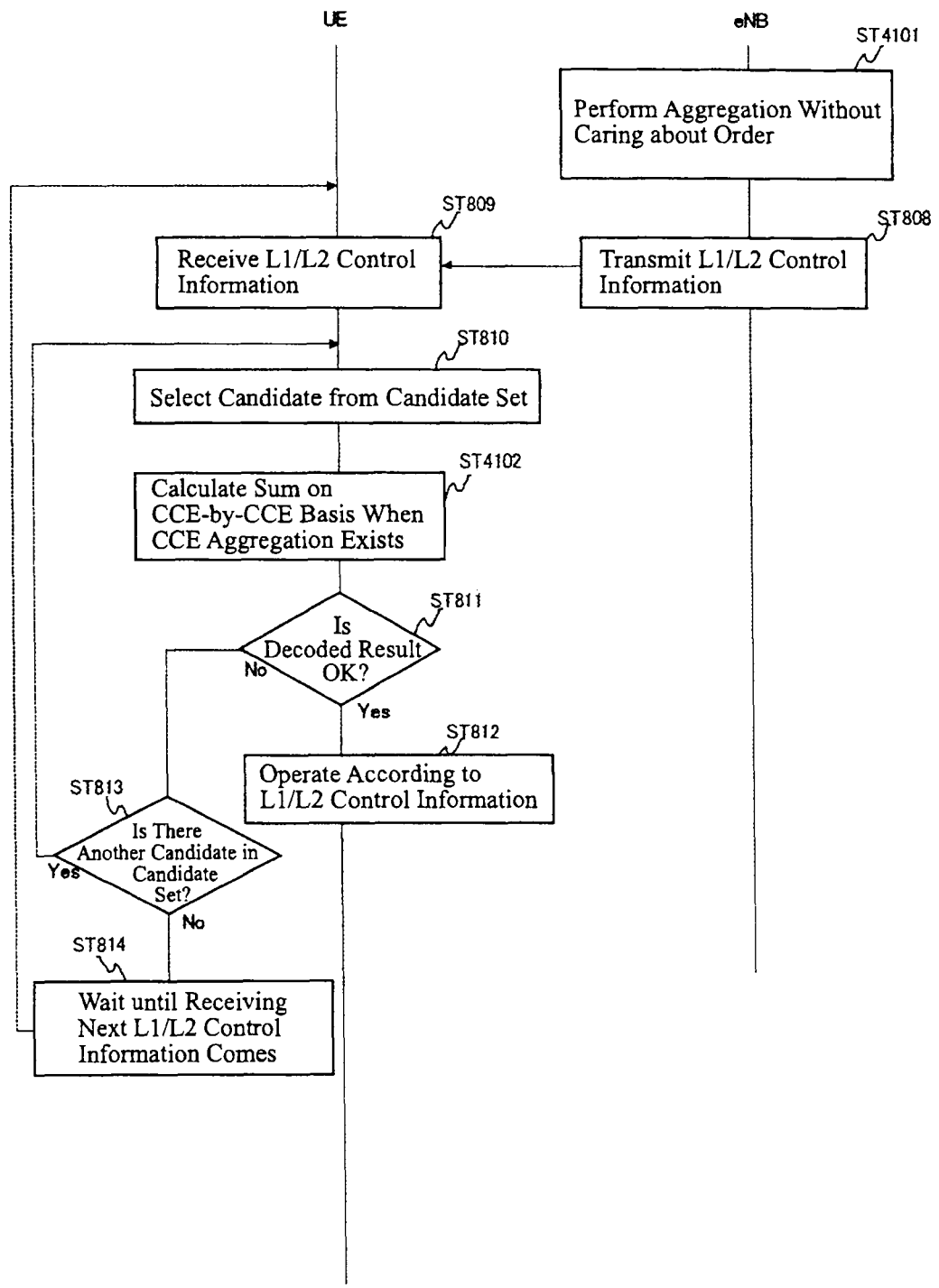
FIG. 41 is a flow chart showing a process of transmitting L1/L2 control information from a base station to a mobile terminal, and a process of determining a candidate set including L1/L2 control information which is carried out by the mobile terminal.

Next, a second variant will be explained. FIG. 41 is a flow chart showing a process of transmitting L1/L2 control information from the base station to each mobile terminal, and a process of determining a candidate set including the L1/L2 control information which is carried out by each mobile terminal. FIG. 41 shows an example of processes according to the second variant of Embodiment 8. In FIG. 41, because in the steps designated by the same reference characters as those shown in FIG. 40 the same processes or like processes are carried out, the explanation of these processes will be omitted hereafter. In the mobile communications system, the amount of information of L1/L2 control information, the encoding method, the rate matching method, and so on are adjusted, and an aggregation of CCEs is performed on only repetitions (Repetition) in units of CCEs. That is, it can be considered that an aggregation is carried out according to MCS. As an example, the number of repetitions is increased when the radio environment is bad, whereas the number of repetitions is decreased when the radio environment is good. Therefore, the base station, in step ST4101, can carry out an aggregation without caring about the order of L1/L2 control information which is divided into parts each corresponding to a CCE. Each mobile terminal, in ST4102, calculates a sum without caring about the order of the CCEs. As an example, each mobile terminal calculates a sum of the powers.

The use of variant 2 of Embodiment 8 can provide an advantage of reducing the processing load on the base station and that on each mobile terminal because the necessity to care about the order of the CCEs is eliminated, in addition to the advantages provided by Embodiment 8 and variant 1 of Embodiment 8.

Figure 42:
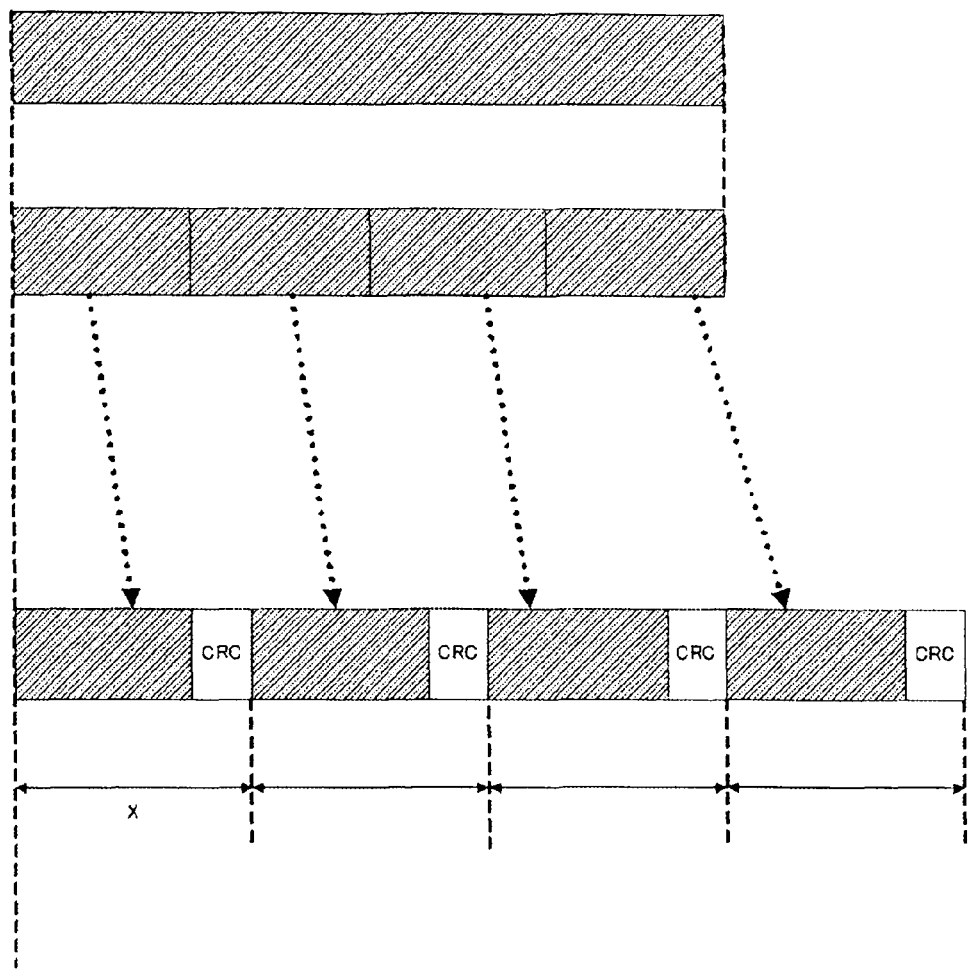
FIG. 42 is an explanatory drawing showing an example of a method of adding a CRC to downlink control information in accordance with variant 3 of Embodiment 8.

Next, a third variant will be explained. An example of a method of adding a CRC to downlink control information, which is different from that shown in FIG. 38, is shown in FIG. 42. The method includes the steps of dividing L1/L2 control information (a hatched portion shown in FIG. 42) into parts each corresponding to a CCE (a reference character x shown in FIG. 42), and, after that, adding CRCs to them, and mapping them onto CCEs. One or more pieces of L1/L2 control information can be destined for each mobile terminal. Because CRCs are added to the parts each corresponding to a CCE, the number of times that each mobile terminal performs a blind detection does not increase with increase in the number of types of the mapping method of mapping L1/L2 control information if each mobile terminal performs a blind detection on each CCE, in other words, each mobile terminal determines whether or not the L1/L2 control information is the one destined for each mobile terminal itself for every CCE. A problem is however that it is unclear how the CCEs on which a blind detection has been performed are combined to be able to form the L1/L2 control information destined for each mobile terminal itself.

As a solution of the problem, one of the methods shown in above-mentioned Embodiment 8, above-mentioned variant 1 of Embodiment 8, and above-mentioned variant 2 of Embodiment 8 can be used. Accordingly, the problem that it is unclear how the CCEs on which a blind detection has been performed are combined to be able to form the L1/L2 control information destined for each mobile terminal itself can be solved.

Either of Embodiment 8, variant 1 of Embodiment 8, variant 2 of Embodiment 8, and variant 3 of Embodiment 8 can be applied to any of above-mentioned Embodiment 2, Embodiment 3, Embodiment 4, Embodiment 5, and Embodiment 6. In each group shown in one of Embodiment 2, Embodiment 3, Embodiment 4, Embodiment 5, and Embodiment 6, L1/L2 control information which is divided into parts each corresponding to a CCE can be mapped onto CCEs by using either of the different methods shown in Embodiment 8, variant 1 of Embodiment 8, variant 2 of Embodiment 8, and variant 3 of Embodiment 8.

Embodiment 9

In nonpatent reference 3, it is described that a mobile terminal monitors a candidate set (Candidate Set) of downlink control channels. However, because in a case in which the base station carries out signaling of a candidate set to be monitored to each mobile terminal being served thereby, many radio resources are consumed, it is preferable that the base station does not carry out signaling of the candidate set to each mobile terminal, and the base station and mobile terminal determine the candidate set. In the 3GPP, a candidate set is also called a search space (Search space). Nonpatent reference 4 discloses a method which does not use signaling. Concretely, nonpatent reference 4 discloses that the identifier (UE-ID) of each mobile terminal or the Cat.0 value is defined as a variable, and a mobile terminal and a base station determine a candidate set of downlink control channels by using a random function. However, nonpatent reference 4 does not take into consideration a case in which allocation of radio resources is carries out at certain time intervals, like a case of persistent scheduling. Nonpatent reference 4 does not disclose at all a problem of occurrence of a case in which radio resources to which the candidates included in the candidate set are allocated at certain time intervals become the same.

Figure 43:
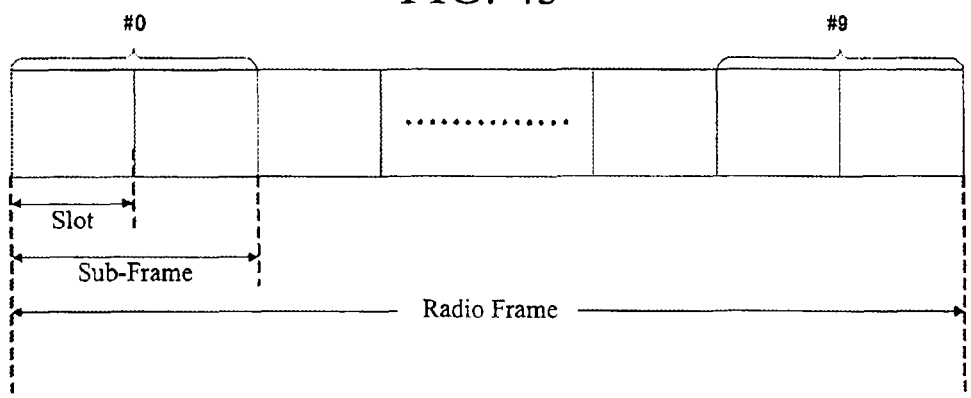
FIG. 43 is an explanatory drawing showing the structure of a radio frame for use in a communications system using an LTE method.

It can be considered that the periodicity parameter of persistent scheduling which is scheduled to be introduced in LTE is specified in units of milliseconds. This is because in voice communications in which persistent scheduling is used, when, for example, AMR is used for compression encoding, data are updated and transmitted and received every 20 milliseconds during a talk spurt. On the other hand, in the 3GPP, in a frame structure in an LTE system, one radio frame (Radio frame) is determined to be 10 ms in length. The currently-determined matters relating to the frame structure in the 3GPP are described in nonpatent reference 10 (Chapter 5). FIG. 43 is an explanatory drawing showing the structure of a radio frame for use in a communications system using an LTE method. In FIG. 43, one radio frame (Radio frame) is 10 milliseconds in length. Each radio frame is divided into ten equal-sized sub-frames (Sub-frames). Each sub-frame is divided into two equal-sized slots (Slots). Therefore, definition of the length of a cycle of persistent scheduling on the basis of radio frames can be considered for an update of data in every 20 milliseconds in a case in which, for example, voice communications are carried out, and, in a case in which radio resources to which the candidates included in the candidate set are allocated in the persistent cycle become the same, there arises a problem as mentioned above.

This Embodiment 9 is aimed at solving the above-mentioned sixth problem, and discloses a method of using a radio frame when the base station and mobile terminal determine a candidate set of downlink control channels.

Figure 44:
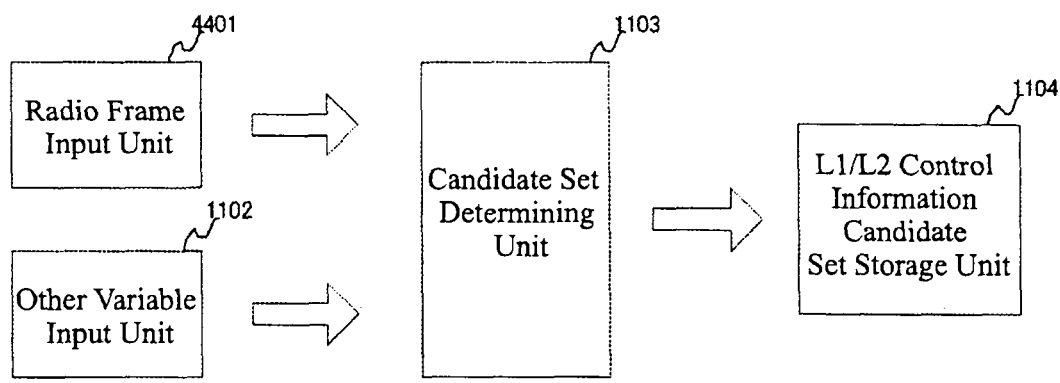
FIG. 44 is a functional block diagram explaining a function of determining a candidate set including L1/L2 control information, which is used in Embodiment 9.

FIG. 44 is a functional block diagram explaining a function of determining a candidate set including L1/L2 control information. In the case of each mobile terminal, the functional blocks shown in FIG. 44 can be mounted in the control unit 15 of FIG. 4, while in the case of the base station, the functional blocks shown in FIG. 44 can be mounted in the control unit 26 of FIG. 5. In FIG. 44, a radio frame is inputted from a radio frame input unit 4401 to a candidate set determining unit 1103. As an example of a parameter for the radio frame inputted, a radio frame number (SFN (System Frame Number)) or the like can be considered. Furthermore, when the persistent cycle length is defined in units of radio frames, (SFN div persistent cycle length) can be considered as an example of the parameter for the radio frame. As a result, there can be provided an advantage of reducing a maximum value of the parameter for the radio frame.

Furthermore, another variable regarding the determination of a candidate set, other than the radio frame, are inputted to the candidate set determining unit 1103 from an other variable input unit 1102. The other variable inputted to the candidate set determining unit 1103 from the other variable input unit 1102 can be, for example, the identifier (UE-ID) of a mobile terminal, a Cat.0 value, or a parameter specifying a "CCE group".

The candidate set determining unit 1103 determines an L1/L2 control information candidate set by using the inputted radio frame and the other variable. Although the candidate set determining unit can use a random function as an example of a determining method of determining an L1/L2 control information candidate set, the candidate set determining unit can alternatively use another method. A candidate set determined by the candidate set determining unit 1103 is stored in an L1/L2 control information candidate set storage unit 1104, and decoding of an L1/L2 control signal is carried out within the candidates.

Figure 45:
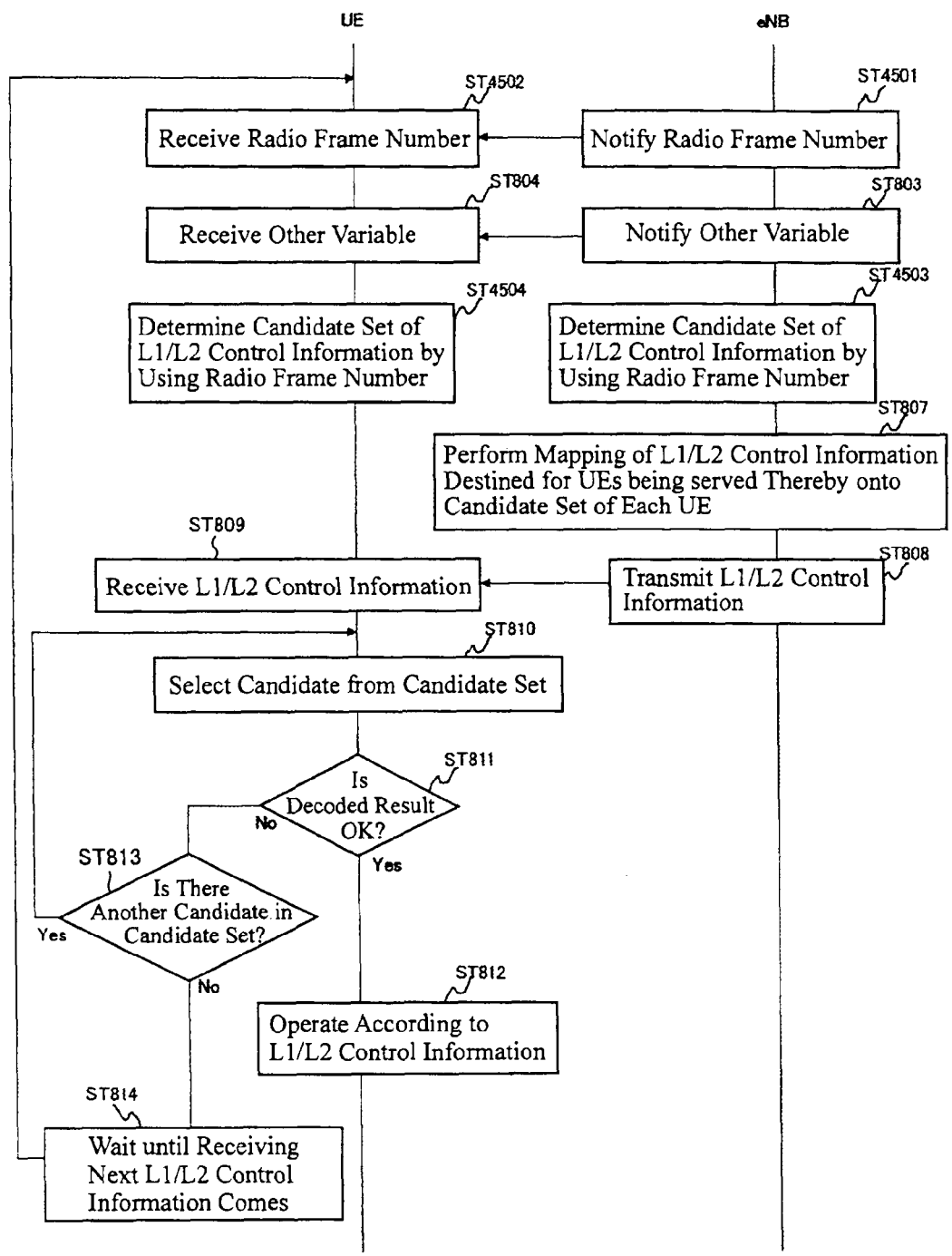
FIG. 45 is a flow chart showing a process of transmitting L1/L2 control information from a base station to a mobile terminal, and a process of determining a candidate set including L1/L2 control information which is carried out by the mobile terminal, the processes being used in Embodiment 9.

FIG. 45 is a flow chart showing a process of determining a candidate set including L1/L2 control information which is used in Embodiment 9. Because FIG. 45 is similar to FIG. 8, only changed steps will be explained hereafter. In FIG. 45, a radio frame number is broadcast from the base station to each mobile terminal (ST4501), and each mobile terminal receives the radio frame number from the base station (ST4502). As an example, it can be considered that the radio frame number is carried on a BCCH (Broadcast Control Channel) as broadcast information, and mapping onto a BCH (Broadcast Channel) is carried out. Furthermore, it can be considered that the radio frame number is notified as SFN. In addition, the "other variable" other than the radio frame is notified from the base station to each mobile terminal (ST803), and each mobile terminal receives the "other variable" notified from the base station (ST804). The base station and mobile terminal determine a radio frame number showing a radio frame with which they transmit and receive L1/L2 control information by using the radio frame number transmitted and received in ST4501 and ST4502 respectively, and then determine a candidate set (Candidate Set) of L1/L2 control information from both the radio frame number and the other variable regarding the determination of a candidate set other than the radio frame (ST4503 and ST4504) respectively. Methods of determining a candidate set of L1/L2 control information which is performed respectively by the base station and mobile terminal are the same.

Either or both of the persistent cycle length and the radio frame number can be broadcast in ST4501, and can be received in ST4502. The base station and mobile terminal have only to derive the radio frame number by using the persistent cycle length.

The base station and mobile terminal can determine a candidate set when a variable for determining a candidate set, such as the radio frame number, varies. Because the radio frame number varies every radio frame, the base station and mobile terminal determine a candidate set every radio frame. Instead of determining a candidate set when a variable for determining a candidate set, such as the radio frame number, varies, as previously explained, the base station and mobile terminal can determine a candidate set at fixed time intervals. Furthermore, a candidate set can be alternatively determined when a "trigger" for determining a candidate set is exchanged between the base station and mobile terminal. Furthermore, in a case in which allocation of radio resources (e.g. persistent scheduling) is carried out in a certain cycle, each mobile terminal can actually determine a candidate set every time when the mobile terminal needs to receive an L1/L2 control signal, concretely, in a persistent cycle. In the case in which persistent scheduling is carried out, by determining a candidate set in a persistent cycle, the base station and mobile terminal do not have to carry out the process of determining a candidate set at the time when they do not have to transmit and receive L1/L2 control information actually, and therefore there can be provided an advantage of reducing the processing load on the base station and that on each mobile terminal. As examples of the above-mentioned case in which persistent scheduling is carried out, the following cases can be considered. (1) A case in which a persistent cycle length is set to each mobile terminal in question by the base station. (2) A case in which persistent scheduling for each mobile terminal in question is activated.

Each mobile terminal, in ST814, waits until receiving the next L1/L2 control information, and, after that, returns to ST4502. As an example, a mobile terminal which has been dynamic-scheduled waits until it receives the first one OFDM symbol, the first two OFDM symbols, or the first three OFDM symbols of the first slot of the next sub-frame. A mobile terminal which is carrying out a DRX operation during active (Active) waits until a receiving operation time interval (on-duration: on-duration) during which the mobile terminal receives L1/L2 control information comes after the next DRX cycle. The DRX operation (DRX in RRC_CONNECTED) during active is a state which is provided newly in order to support low power consumption of a mobile terminal in LTE (E-UTRAN). When the mobile terminal determines that any allocation for the mobile terminal itself is not made during the receiving operation time interval during which the mobile terminal receives L1/L2 control information, the mobile terminal makes a transition to a DRX operation during active again. In contrast, when the mobile terminal determines that allocation for the mobile terminal itself is made during the receiving operation period during which the mobile terminal receives L1/L2 control information, the mobile terminal does not perform the DRX operation during active and follows an instruction shown by the L1/L2 control information. A mobile terminal in which persistent scheduling is activated waits until the receiving operation time of receiving L1/L2 control information comes after one persistent cycle has elapsed.

Furthermore, in the case in which allocation of radio resources is carried out in a certain cycle, this embodiment can also be applied to a case in which the cycle length is defined in units of subframes. For example, in a case in which the cycle length is 10*a subframes (a is a positive integer), allocation to the same sub-frame is performed every a radio frames, and the definition becomes substantially the same as that based on units of radio frames. In such a case, there arise the same problem and issue as those mentioned above. This embodiment can also be applied to such a case, and the same advantages can be provided. As an example, after broadcasting and receiving a radio frame number in ST4501 and ST4502 of FIG. 45, the base station and mobile terminal derive the radio frame number of the radio frame, with which transmission and reception of L1/L2 control information is carried out, by using the persistent cycle length defined in units of subframes which is broadcast from the base station to each mobile station by using RRC. The base station and mobile terminal have only to convert the persistent cycle length defined in units of subframes into that in units of radio frames (in the above-mentioned example, 10*a subframes/10=a radio frames), and derive the radio frame number from the radio frames. Furthermore, as an example of the derivation of the radio frame number from the radio frames, (SFN div persistent cycle length)=(SFN div a) as disclosed above can be used. The derived radio frame number has only to be inputted to the radio frame input unit 4401 shown in FIG. 44. The radio frame number and/or the persistent cycle length defined in units of subframes can be broadcast in ST4501, and can be received in ST4502. The base station and mobile terminal have only to derive the radio frame number by using the persistent cycle length defined in units of subframes.

With Embodiment 9, a radio frame serves as a variable regarding the determination of a candidate set. Therefore, a different candidate set can be determined every radio frame (every 10 ms). Therefore, even if the radio environment of each mobile terminal for which allocation of radio resources (e.g. persistent scheduling) is carried out in a certain cycle gets worse, the candidate set can be changed at the time of allocation after the next cycle has elapsed (e.g. after one persistent cycle has elapsed (which can be assumed to be tens of milliseconds later). Therefore, there can be provided an advantage of being able to configure a mobile communications system in which an L1/L2 control signal destined for each mobile terminal in question can be notified from the base station to the mobile terminal with a candidate providing good radio environment.

Figure 46:
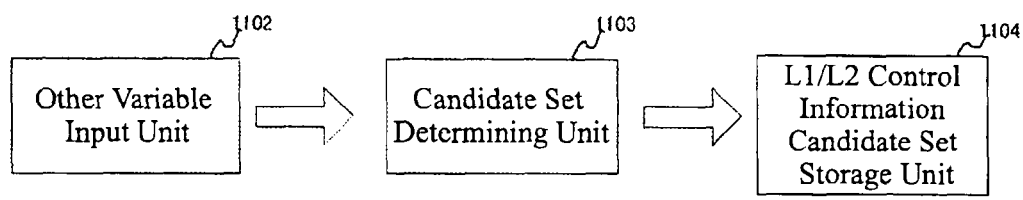
FIG. 46 is a functional block diagram explaining a function of determining a candidate set including L1/L2 control information, which is used in variant 1 of Embodiment 9.

Next, variant 1 of Embodiment 9 will be explained. In this variant 1, a method of, instead of using, as a single variable to be inputted to the candidate set determining unit, a radio frame, inputting the radio frame included in another variable to the candidate set determining unit is disclosed. FIG. 46 is a functional block diagram explaining a function of determining a candidate set including L1/L2 control information. Because FIG. 46 is similar to FIG. 44, only changed parts will be explained hereafter. In the case of each mobile terminal, the functional blocks shown in FIG. 46 can be mounted in the control unit 15 of FIG. 4, while in the case of the base station, the functional blocks shown in FIG. 46 can be mounted in the control unit 26 of FIG. 5. In FIG. 46, the radio frame input unit does not have it independently, and it is inputted to the candidate set determining unit together with the other variable. As an example, a case in which a sub-frame is defined as the other variable is considered. A sub-frame number which is a function of SFN is inputted to the candidate set determining unit from the other variable input unit. As an example, (sub-frame+SFN mod K) (K is a positive integer) is inputted into the candidate set determining unit. As another example, (sub-frame+SFN div persistent cycle length) is inputted into the candidate set determining unit. Because a flow chart for explaining processing carried out in variant 1 is the same as that shown in FIG. 45, the explanation of the processing will be omitted hereafter. Also in this variant 1, there can be provided the same advantages as those provided by Embodiment 9.

Either of Embodiment 9 and variant 1 of Embodiment 9 can be used in combination with Embodiment 1.

Embodiment 10

This Embodiment 10 is aimed at solving the above-mentioned sixth problem, and discloses a method of enabling the base station and the mobile terminal to use the presence or absence of persistent scheduling when determining a candidate set of downlink control channels.

Figure 47:
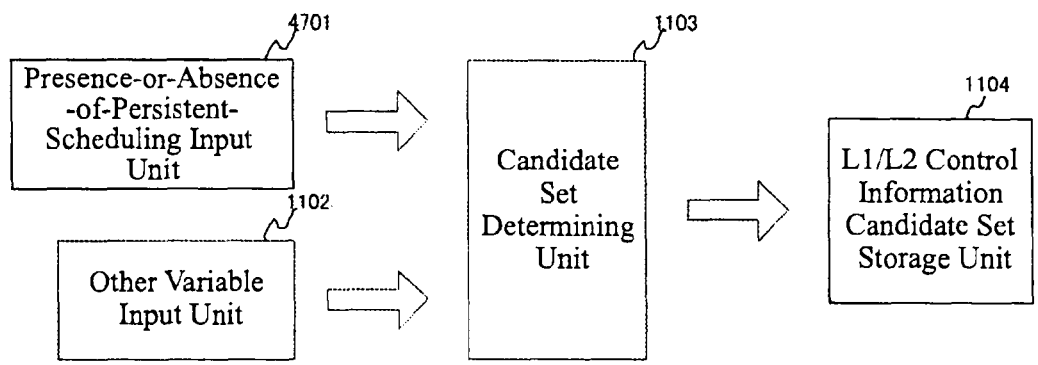
FIG. 47 is a functional block diagram explaining a function of determining a candidate set including L1/L2 control information, which is used in Embodiment 10.

FIG. 47 is a functional block diagram explaining a function of determining a candidate set including L1/L2 control information. Because FIG. 47 is similar to FIG. 44, only changed parts will be explained hereafter. In FIG. 47, information showing the presence or absence of persistent scheduling is inputted from a presence-or-absence-of-persistent-scheduling input unit 4701 to a candidate set determining unit 1103. There can be considered an example of the parameter showing the presence or absence of persistent scheduling in which the parameter has a value "1" in a case in which there is persistent scheduling, and has a value "0" otherwise. In order to set up the parameter showing the presence or absence of persistent scheduling, the base station and mobile terminal determine the presence or absence of persistent scheduling. As examples of the determination of the presence or absence of persistent scheduling, there can be considered the following cases. (1) When a persistent cycle length is set to each mobile terminal in question from the base station, they determine that there is persistent scheduling. In contrast, when any persistent cycle length has not been set to each corresponding mobile terminal, they determine that there is no persistent scheduling. (2) When persistent scheduling for each mobile terminal in question is activated, they determine that there is persistent scheduling. In contrast, when persistent scheduling for each mobile terminal in question is inactivated, they determine that there is no persistent scheduling.

Figure 48:
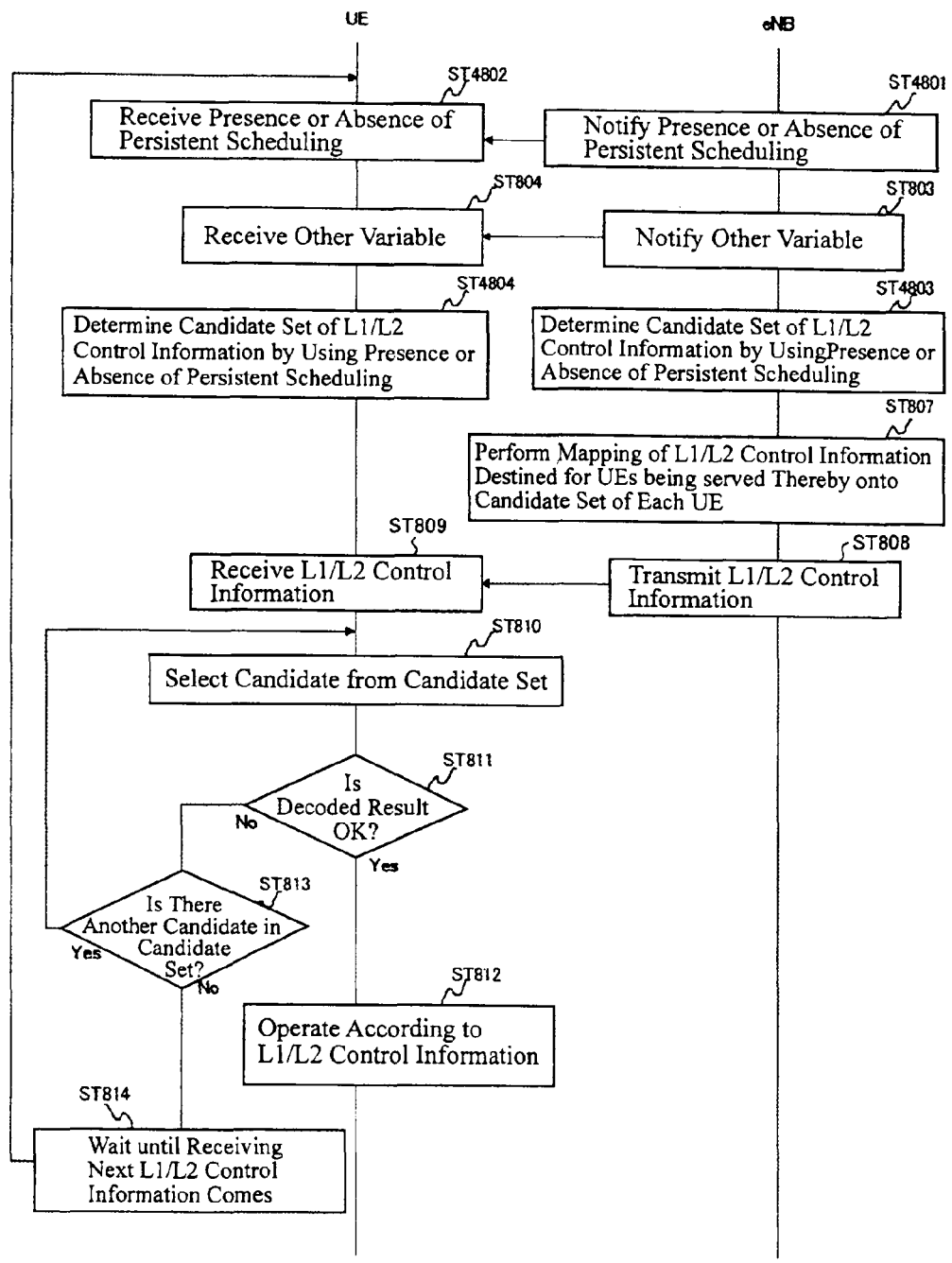
FIG. 48 is a flow chart showing a process of transmitting L1/L2 control information from a base station to a mobile terminal, and a process of determining a candidate set including L1/L2 control information which is carried out by the mobile terminal, the processes being used in Embodiment 10.

FIG. 48 is a flow chart showing a process of determining a candidate set including L1/L2 control information which is used in Embodiment 10. Because FIG. 48 is similar to FIG. 8, only changed steps will be explained hereafter. In FIG. 48, the information showing the presence or absence of persistent scheduling is notified from the base station to each mobile terminal (ST4801), and each mobile terminal receives the information showing the presence or absence of persistent scheduling from the base station (ST4802). As an example, in the case in which the presence or absence of persistent scheduling is determined according to whether or not a persistent cycle length is set up (in the above-mentioned case (1)), there can be considered a notification of the persistent cycle length from the base station to each mobile terminal by using the RRC protocol. The presence or absence of persistent scheduling can be notified by a notification of the persistent cycle length. Furthermore, in the case in which the presence or absence of persistent scheduling is determined by determining whether or not persistent scheduling is activated (in the above-mentioned case (2)), there can be considered a notification of whether or not persistent scheduling is activated from the base station to each mobile terminal by using L1/L2 control information. The presence or absence of persistent scheduling can be notified by a notification of whether or not persistent scheduling is activated. "Another variable" other than the information showing the presence or absence of persistent scheduling is notified from the base station to each mobile terminal (ST803), and each mobile terminal receives the "other variable" notified from the base station (ST804). The base station and mobile terminal determine a candidate set (Candidate Set) of L1/L2 control information from both the information showing the presence or absence of persistent scheduling, and the other variable regarding the determination of the candidate set (ST4803 and ST4804) respectively. Methods of determining a candidate set of L1/L2 control information which is performed respectively by the base station and mobile terminal are the same.

The base station and mobile terminal can determine a candidate set when a variable for determining a candidate set, such as the information showing the presence or absence of persistent scheduling, varies. Instead of determining a candidate set when a variable for determining the candidate set, such as the information showing the presence or absence of persistent scheduling, varies, as previously explained, the base station and mobile terminal can determine a candidate set at fixed time intervals. Furthermore, a candidate set can be alternatively determined when a "trigger" for determining a candidate set is exchanged between the base station and each mobile terminal. Furthermore, in a case in which allocation of radio resources (e.g. persistent scheduling) is carried out, each mobile terminal can actually determine a candidate set every time when the mobile terminal needs to receive an L1/L2 control signal, concretely, in a persistent cycle. In the case in which persistent scheduling is carried out, by determining a candidate set in a persistent cycle, the base station and mobile terminal do not have to carry out the process of determining a candidate set at the time when they do not have to transmit and receive L1/L2 control information actually, and therefore there can be provided an advantage of reducing the processing load on the base station and that on each mobile terminal. As examples of the above-mentioned case in which persistent scheduling is carried out, the following cases can be considered. (1) A case in which a persistent cycle length is set to each mobile terminal in question by the base station. (2) A case in which persistent scheduling for each mobile terminal in question is activated.

Each mobile terminal, in ST814, waits until receiving the next L1/L2 control information, and, after that, returns to ST4802. As an example, a mobile terminal which has been dynamic-scheduled waits until it receives the first one OFDM symbol, the first two OFDM symbols, or the first three OFDM symbols of the first slot of the next sub-frame. A mobile terminal which is carrying out a DRX operation during active (Active) waits until a receiving operation period (on-duration: on-duration) during which the mobile terminal receives L1/L2 control information comes after the next DRX cycle. The DRX operation (DRX in RRC_CONNECTED) during active is a state which is provided newly in order to support low power consumption of a mobile terminal in LTE (E-UTRAN). When the mobile terminal determines that any allocation for the mobile terminal itself is not made during the receiving operation time interval during which the mobile terminal receives L1/L2 control information, the mobile terminal makes a transition to a DRX operation during active again. In contrast, when the mobile terminal determines that allocation for the mobile terminal itself is made during the receiving operation time interval during which the mobile terminal receives L1/L2 control information, the mobile terminal does not perform the DRX operation during active and follows an instruction shown by the L1/L2 control information. A mobile terminal in which persistent scheduling is activated waits until the receiving operation time of receiving L1/L2 control information comes after the persistent cycle has elapsed.

In Embodiment 10, the presence or absence of persistent scheduling is defined as a variable regarding the determination of a candidate set. Therefore, in a case in which there is persistent scheduling, a candidate set suitable for persistent scheduling can be determined. Therefore, for a mobile terminal for which persistent scheduling is being performed, the candidate set can be, for example, changed in allocation after the next persistent cycle has elapsed. As a result, there can be provided an advantage of being able to configure a mobile communications system in which, even when the radio environment of each mobile terminal in question gets worse, an L1/L2 control signal destined for the mobile terminal can be notified from the base station to the mobile terminal with a candidate providing a good radio environment.

Next, variant 1 of Embodiment 10 will be explained. In this variant 1, a method of defining the presence or absence of persistent scheduling as a variable, and determining a candidate set by using this variable will be disclosed. In FIG. 47, a method of inputting information showing the presence or absence of persistent scheduling from the presence-or-absence-of-persistent-scheduling input unit 4701 to the candidate set determining unit 1103 is disclosed. Furthermore, as an example of the parameter showing the presence or absence of persistent scheduling, a method of setting the parameter to "1" in a case in which there is persistent scheduling, and setting the parameter to "0" otherwise is disclosed. The parameter showing the presence or absence of persistent scheduling is expressed as PS, and the determination of a candidate set is carried out by using the variable PS. As an example, a case in which a sub-frame number is defined as another variable is considered. The candidate set determining unit 1103 redetermines the variable on sub-frame by using the variable showing the presence or absence of persistent scheduling. As an example, the candidate set determining unit uses the following equation: sub-frame=(sub-frame+(n−1)*PS). where n is a positive integer, and shows the number of times that, when persistent scheduling is carried out, allocation is performed continuously in a persistent cycle. More specifically, n=1 when first persistent allocation is performed, n=2 when second allocation is performed after one persistent cycle has elapsed, n=3 when third allocation is performed after a further persistent cycle has elapsed, . . . , and n=n when n-th allocation is performed after a further persistent cycle has elapsed. n is incremented by 1 according to the number of times that allocation is performed continuously. In a case in which there is no persistent scheduling, the above-mentioned equation becomes sub-frame=sub-frame because PS=0, and a sub-frame inputted as the other variable remains as it was inputted. Because the determining method is configured as mentioned above, the variable on sub-frame can be prevented from having the same value continuously in a persistent cycle in the case in which there is persistent scheduling. Therefore, the determined candidate set can be prevented from being the same continuously in a persistent cycle. Because a flow chart explaining the processing carried out in variant 1 is the same as that of FIG. 45, the explanation of the processing will be omitted hereafter.

In the above-mentioned example, n shows the number of times that allocation is performed continuously in a persistent cycle. n can be, instead of the number of times that allocation is performed continuously in a persistent cycle, the number of times that allocation is performed after persistent scheduling has been started. Furthermore, in the above-mentioned example, the method of redetermining the variable on sub-frame by using the variable showing the presence or absence of persistent scheduling is disclosed, though this variant is not limited to this method. A method of redetermining another variable by using the variable showing the presence or absence of persistent scheduling can be alternatively used. In addition, as a concrete example, there can be provided a method of redetermining another variable by using either the number of times that allocation is performed continuously in a persistent cycle or the number of times that allocation is performed after persistent scheduling has been started. Furthermore, in this variant, the presence or absence of persistent scheduling is defined as the variable, though this method can be applied to not only a case in which persistent scheduling is performed, but also a case in which allocation of radio resources is performed in a certain cycle. In this case, what is necessary is to define, as a variable, whether or not allocation of radio resources is performed in a certain cycle. By using the method according to this variant 1, there can be provided the same advantages as those provided by Embodiment 10. In addition, because the same determining method can be used with the presence or absence of persistent scheduling, the amount of processing of the candidate set determining unit can be reduced, and the power consumption of each mobile terminal can be reduced and a time delay occurring in the processing time of each mobile terminal can be reduced. In addition, because in the case in which there is persistent scheduling, the simple process of incrementing n by 1 (the increment is not limited to 1, and has only to be k (an integer)) can be carried out according to the number of times that allocation is performed, the amount of processing of the candidate set determining unit can be reduced. Embodiment 10 can be used in combination with Embodiment 9 and Embodiment 1.

Embodiment 11

This Embodiment 11 is aimed at solving the above-mentioned sixth problem, and discloses a method of switching between determining methods of determining a candidate set of downlink control channels by using the presence or absence of persistent scheduling.

Figure 49:
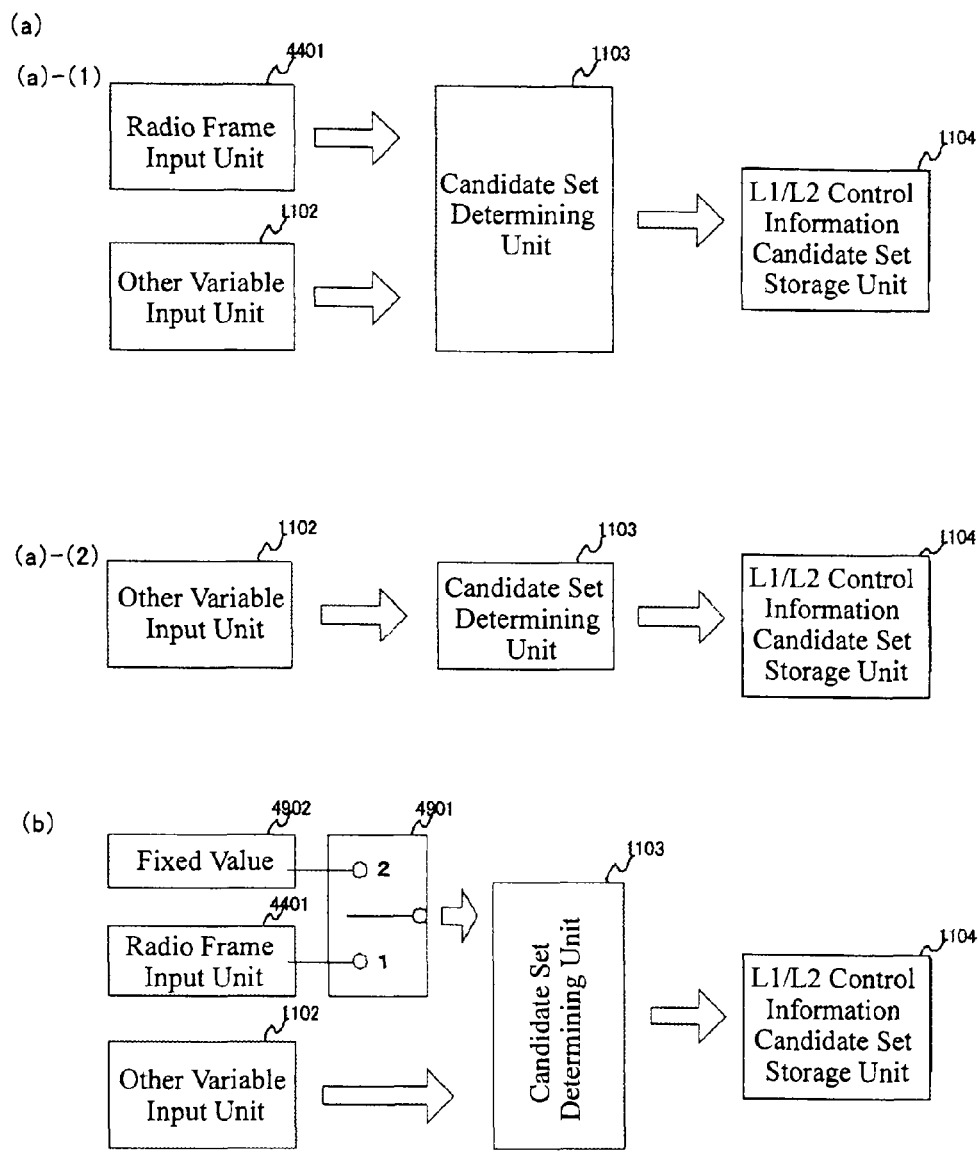
FIG. 49 is a functional block diagram explaining a function of determining a candidate set including L1/L2 control information, which is used in Embodiment 11.

FIG. 49 is a functional block diagram explaining a function of determining a candidate set including L1/L2 control information. Because FIG. 49 is similar to FIG. 44, only changed parts will be explained hereafter. In Embodiment 11, switching between determining methods of determining a candidate set of downlink control channels by using the presence or absence of persistent scheduling is carried out. In FIG. 49, two examples of the switching: a pattern (a) and a pattern (b) will be explained. The pattern (a) will be explained first. In a case in which there is persistent scheduling, a determining method of determining a candidate set suitable for persistent scheduling is used. As an example, a candidate set determining method of determining a candidate set in such a way as to prevent the same radio resources from being used in a persistent cycle is used. In addition, as an example, the candidate set determining method includes the step of inputting a variable for determining a candidate set in such a way as to prevent the same radio resources from being used in a persistent cycle to the candidate set determining unit. Furthermore, as an example, the candidate set determining method includes the step of inputting a radio frame to the candidate set determining unit (refer to FIG. 49(*a*)-(1)). As an alternative, the candidate set determining method can include the step of defining, as a variable, the presence or absence of persistent scheduling, and then inputting a radio frame and/or the variable showing the presence or absence of persistent scheduling to the candidate set determining unit.

In the case in which there is no persistent scheduling, a determining method of determining a candidate set without taking into consideration persistent scheduling (it can also be said that the determining method is suitable for dynamic scheduling) is used. As an example, a determining method of not inputting the variable for determining a candidate set in such a way as to prevent the same radio resources from being used in a persistent cycle to the candidate set determining unit. Furthermore, as an example, the candidate set determining method includes the step of not inputting a radio frame to the candidate set determining unit (refer to FIGS. 49(*a*)-(2)). As an alternative, the candidate set determining method can include the step of defining, as a variable, the presence or absence of persistent scheduling, and then not inputting a radio frame and/or the variable showing the presence or absence of persistent scheduling to the candidate set determining unit. As an example of a criterion by which to determine the above-mentioned presence or absence of persistent scheduling, there can be considered the following cases. (1) When a persistent cycle length is set to each mobile terminal in question from the base station, they determine that there is persistent scheduling. In contrast, when no persistent cycle length has been set to each mobile terminal in question from the base station, they determine that there is no persistent scheduling. (2) When persistent scheduling for each mobile terminal in question is activated, they determine that there is persistent scheduling. In contrast, when persistent scheduling for each mobile terminal in question is inactivated, they determine that there is no persistent scheduling.

The pattern (b) will be explained. In the case in which there is persistent scheduling, a switch 4901 is flipped to side 1. In contrast, in the case in which there is no persistent scheduling, the switch is flipped to side 2. As an example of the criterion by which to determine the presence or absence of persistent scheduling, which is used for determination of whether to perform switching, there can be considered the following cases. (1) When a persistent cycle length is set to each mobile terminal in question from the base station, they determine that there is persistent scheduling. In contrast, when no persistent cycle length has been set to each mobile terminal in question from the base station, they determine that there is no persistent scheduling. (2) When persistent scheduling for each mobile terminal in question is activated, they determine that there is persistent scheduling. In contrast, when persistent scheduling for each mobile terminal in question is inactivated, they determine that there is no persistent scheduling. The case in which there is persistent scheduling will be explained. The switch 4901 is flipped to side 1. Therefore, a radio frame is inputted from the radio frame input unit 4401 to the candidate set determining unit 1103. In this case, if the radio frame input unit 4401 is a variable input unit that accepts a variable for determining a candidate set in such a way as to prevent the same radio resources from being used in a persistent cycle, the method is not limited to the above-mentioned one. As an example of the variable which is a substitute for a radio frame, a persistent cycle length or the like can be considered. By flipping the switch 4901 to side 1 and inputting a radio frame from the radio frame input unit 4401 to the candidate set determining unit 1103, the candidate set determining method can be configured to determine a candidate set in such a way as to prevent the same radio resources from being used in a persistent cycle. As a result, the determining method of determining a candidate set suitable for persistent scheduling can be used.

The case in which there is no persistent scheduling will be explained. The switch 4902 is flipped to side 2. Therefore, a fixed value is inputted from the fixed value input unit 4902 to the candidate set determining unit 1103. The fixed value can be predefined, can be broadcast, as broadcast information, from the base station to each mobile terminal, or can be notified from the base station to each mobile terminal by using the RRC protocol.

Figure 50:
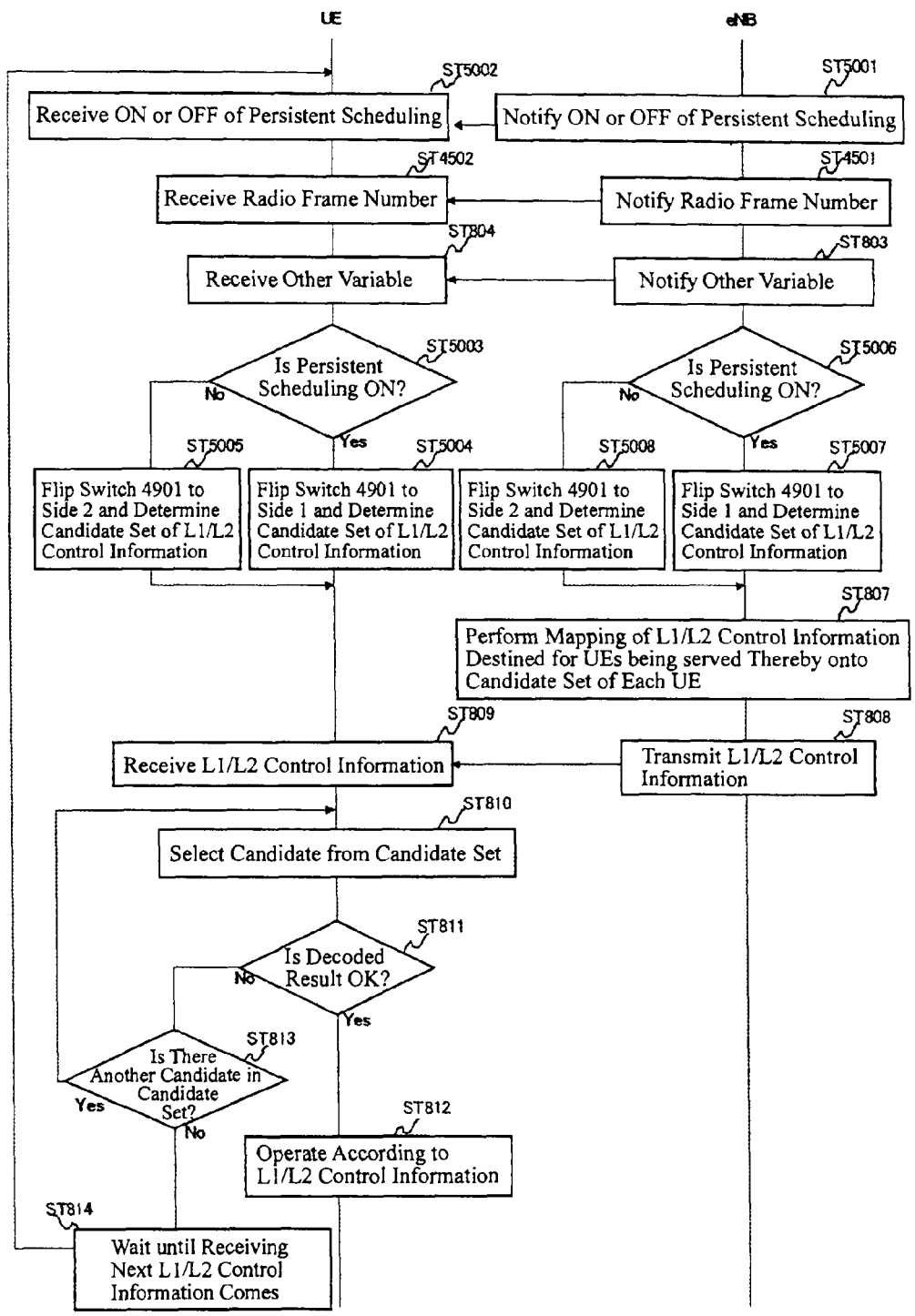
FIG. 50 is a flow chart showing a process of transmitting L1/L2 control information from a base station to a mobile terminal, and a process of determining a candidate set including L1/L2 control information which is carried out by the mobile terminal, the processes being used in Embodiment 11.

FIG. 50 is a flow chart showing a process of determining a candidate set including L1/L2 control information which is used in Embodiment 11. Because FIG. 50 is similar to FIG. 8, only changed steps will be explained hereafter. The information showing the presence or absence of persistent scheduling is notified from the base station to each mobile terminal (ST5001), and each mobile terminal receives the information showing the presence or absence of persistent scheduling from the base station (ST5002). As an example, in the case in which the presence or absence of persistent scheduling is determined according to whether or not a persistent cycle length is set up (in the above-mentioned case (1)), there can be considered a notification of the persistent cycle length from the base station to each mobile terminal by using the RRC protocol. The presence or absence of persistent scheduling can be notified by the notification of a persistent cycle length. Furthermore, in the case in which the presence or absence of persistent scheduling is determined by determining whether or not persistent scheduling is activated (in the above-mentioned case (2)), there can be considered a notification of whether or not persistent scheduling is activated from the base station to each mobile terminal by using L1/L2 control information. The presence or absence of persistent scheduling can be notified by the notification of whether or not persistent scheduling is activated. A radio frame number is broadcast from the base station to each mobile terminal (ST4501), and each mobile terminal receives the radio frame number from the base station (ST4502). As an example, it can be considered that the radio frame number is carried on a BCCH (Broadcast Control Channel) as broadcast information, and mapping onto a BCH (Broadcast Channel) is carried out. Furthermore, it can be considered that the radio frame number is notified as SFN. In addition, "another variable" other than a radio frame is notified from the base station to each mobile terminal (ST803), and each mobile terminal receives the "other variable" notified from the base station (ST804).

Each mobile terminal determines whether or not persistent scheduling is turned on by using the information showing the presence or absence on persistent scheduling received in step ST5002 (ST5003). The criterion by which to determine whether or not persistent scheduling is turned on is as shown above. When persistent scheduling is turned on, each mobile terminal makes a transition to step ST5004. Each mobile terminal, in step ST5004, flips the switch 4901 to side 1 to determine a candidate set (Candidate Set) of L1/L2 control information from the radio frame number and the other variable, other than the radio frame, regarding the determination of a candidate set. When, in step ST5003, determining that persistent scheduling is not turned on, each mobile terminal makes a transition to step ST5005. Each mobile terminal, in step ST5005, flips the switch 4901 to side 2 to determine a candidate set (Candidate Set) of L1/L2 control information from the fixed value and the other variable, other than a radio frame, regarding the determination of a candidate set. The base station similarly carries out processes (ST5006, ST5007, and ST5008).

In addition to the advantages provided by Embodiment 9 and Embodiment 10, Embodiment 11 can provide further advantages which will be mentioned below. Embodiment 11 implements the determination of a candidate set suitable for persistent scheduling, and can reduce the variables used for the determination of a candidate set when carrying out the determination when persistent scheduling is not being performed. As a result, there can be provided an advantage of reducing the processing load on the base station and that on each mobile terminal.

Embodiment 11 can be used in combination with Embodiment 9, Embodiment 10 and Embodiment 1.

The invention claimed is:

1. A communications method which is implemented by a communications system including a base station that transmits data by using an OFDM (Orthogonal Frequency Division Multiplexing) method as a downlink access method and a mobile terminal that transmits data by using an SC-FDMA (Single Career Frequency Division Multiple Access) method as an uplink access method, said base station and said mobile terminal transmitting and receiving data by using a plurality of frequency bands, said communications method comprising:

a process of determining, at said mobile terminal, a candidate set including CCEs (Control Channel Elements), each of which is one of regions to which one frequency bandwidth is divided, for delivery of an L1/L2 control signal which is control information transmitted and received between said base station and said mobile terminal, said process of determining, which is performed at said mobile terminal, determining said candidate set based on said frequency bandwidth; and a process of extracting said L1/L2 control signal from the candidate set determined in said process of determining.

2. A communications method which is implemented by a communications system including a base station that transmits data by using an OFDM (Orthogonal Frequency Division Multiplexing) method as a downlink access method and a mobile terminal that transmits data by using an SC-FDMA (Single Career Frequency Division Multiple Access) method as an uplink access method, said base station and said mobile terminal transmitting and receiving data by using a plurality of frequency bands, said communications method comprising:

a process of determining, at said mobile terminal, a candidate set including CCEs (Control Channel Elements), each of which is one of regions to which one frequency bandwidth is divided, for delivery of an L1/L2 control signal which is control information transmitted and received between said base station and said mobile terminal, said process of determining, which is performed at said mobile terminal, determining said candidate set based on said frequency bandwidth.

3. A mobile terminal that constructs a communications system which transmits data by using an OFDM (Orthogonal Frequency Division Multiplexing) method as a downlink access method, and also transmits data by using an SC-FDMA (Single Career Frequency Division Multiple Access) method as an uplink access method, said mobile terminal comprising:

a processor that determines a candidate set including CCEs (Control Channel Elements), each of which is one of regions to which one frequency bandwidth is divided, for delivery of an L1/L2 control signal which is control information transmitted and received between a base station and said mobile terminal, said processor, which is at said mobile terminal, determining said candidate set based on said frequency bandwidth.

4. The communications method according to claim 1, further comprising:

receiving from said base station said frequency bandwidth, wherein said process of determining determines said candidate set based on said frequency bandwidth received by said receiving, a candidate set being different for each different frequency bandwidth.

5. The communications method according to claim 1, further comprising:

receiving from said base station said frequency bandwidth, wherein said process of determining determines said candidate set based on said frequency bandwidth received by said receiving by referring to a table, the table including a plurality of frequency bandwidths each associated with a different candidate set.

6. The communications method according to claim 1, wherein said process of determining is performed at both said mobile terminal and said base station.

\* \* \* \* \*